United States Patent
Yachi et al.

(10) Patent No.: US 10,541,417 B2
(45) Date of Patent: Jan. 21, 2020

(54) ULTRA-FINE FIBROUS CARBON FOR NON-AQUEOUS ELECTROLYTE SECONDARY BATTERY, ULTRA-FINE FIBROUS CARBON AGGREGATE, COMPOSITE, AND ELECTRODE ACTIVE MATERIAL LAYER

(71) Applicant: TEIJIN LIMITED, Osaka-shi, Osaka (JP)

(72) Inventors: Kazuki Yachi, Tokyo (JP); Shinya Komura, Iwakuni (JP); Asami Kanematsu, Iwakuni (JP); Takahiro Daido, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 562 days.

(21) Appl. No.: 14/763,373

(22) PCT Filed: Jan. 24, 2014

(86) PCT No.: PCT/JP2014/051572
§ 371 (c)(1),
(2) Date: Jul. 24, 2015

(87) PCT Pub. No.: WO2014/115852
PCT Pub. Date: Jul. 31, 2014

(65) Prior Publication Data
US 2015/0372309 A1   Dec. 24, 2015

(30) Foreign Application Priority Data

Jan. 25, 2013 (JP) .................................. 2013-012667
Mar. 29, 2013 (JP) .................................. 2013-074845

(Continued)

(51) Int. Cl.
H01M 4/62       (2006.01)
H01M 10/05      (2010.01)
H01M 10/0525    (2010.01)

(52) U.S. Cl.
CPC ........ *H01M 4/625* (2013.01); *H01M 10/0525* (2013.01); *H01M 2220/20* (2013.01); *H01M 2220/30* (2013.01)

(58) Field of Classification Search
None
See application file for complete search history.

(56) References Cited

U.S. PATENT DOCUMENTS 6,589,694 B1      7/2003  Gosho et al.
2005/0150620 A1*  7/2005  Hamada ............... D21H 13/50
                                                         162/152

(Continued)

FOREIGN PATENT DOCUMENTS

CN      1957122 A     5/2007
CN    102057086 A     5/2011

(Continued)

OTHER PUBLICATIONS

International Search Report of PCT/JP2014/051572, dated Apr. 28, 2014. [PCT/ISA/210].

(Continued)

*Primary Examiner* — Jonathan Crepeau
*Assistant Examiner* — Angela J Martin
(74) *Attorney, Agent, or Firm* — Sughrue Mion, PLLC

(57) ABSTRACT

The purpose of the present invention is to provide an electrode active material layer exhibiting excellent mechanical strength. This electrode material for a non-aqueous electrolyte secondary battery includes at least an electrode active material, a carbon-based conductive auxiliary agent, and a binder. The carbon-based conductive auxiliary agent (Continued)

has a linear structure, and includes ultra-fine fibrous carbon having an average fibre diameter of more than 200 nm but not more than 900 nm. The electrode material configures an electrode active material layer in which the maximum tensile strength ($\sigma_M$) in a planar direction and the tensile strength ($\sigma_T$) in an in-plane direction orthogonal to the maximum tensile strength ($\sigma_M$) satisfy relational expression (a), namely $\sigma_M/\sigma_T \leq 1.6$.

10 Claims, 32 Drawing Sheets

(30) Foreign Application Priority Data

May 10, 2013 (JP) ................................. 2013-100755
May 10, 2013 (JP) ................................. 2013-100757

(56) References Cited

U.S. PATENT DOCUMENTS

| | | |
|---|---|---|
| 2007/0184348 A1 | 8/2007 | Sakurai et al. |
| 2008/0096098 A1* | 4/2008 | Shirakata ............ H01M 4/5825 |
| | | 429/94 |
| 2008/0193845 A1* | 8/2008 | Muraoka ................ H01M 2/16 |
| | | 429/223 |
| 2009/0123850 A1 | 5/2009 | Takeuchi et al. |
| 2009/0233081 A1* | 9/2009 | Morikawa ............. B22D 41/54 |
| | | 428/315.5 |
| 2010/0075229 A1 | 3/2010 | Atsuki et al. |
| 2011/0033705 A1* | 2/2011 | Komura ................... D01F 6/44 |
| | | 428/401 |
| 2011/0111294 A1* | 5/2011 | Lopez ................... H01M 4/134 |
| | | 429/217 |
| 2012/0171566 A1 | 7/2012 | Yoshitake et al. |
| 2014/0308585 A1* | 10/2014 | Han ....................... H01M 4/362 |
| | | 429/231.8 |

FOREIGN PATENT DOCUMENTS

| | | | | |
|---|---|---|---|---|
| EP | 2034541 A1 | 3/2009 | | |
| JP | 1-266223 A | 10/1989 | | |
| JP | 7-29566 A | 1/1995 | | |
| JP | 8-287913 A | 11/1996 | | |
| JP | 11-176446 | * 7/1999 | ............. | H01M 4/62 |
| JP | 11-176446 A | 7/1999 | | |
| JP | 2000-021406 A | 1/2000 | | |
| JP | 2000133267 A | 5/2000 | | |
| JP | 2001-68093 A | 3/2001 | | |
| JP | 2001-283878 A | 10/2001 | | |
| JP | 2006-86116 A | 3/2006 | | |
| JP | 200742620 A | 2/2007 | | |
| JP | 2008-270204 A | 11/2008 | | |
| JP | 2008-280222 A | 11/2008 | | |
| JP | 2009-272041 | * 11/2009 | ............. | H01M 4/36 |
| JP | 2009-272041 A | 11/2009 | | |
| JP | 2010013742 A | 1/2010 | | |
| JP | 2010031439 A | 2/2010 | | |
| JP | 2010-238575 A | 10/2010 | | |
| JP | 2012003985 A | 1/2012 | | |
| JP | 2012036520 A | 2/2012 | | |

OTHER PUBLICATIONS

Abstract and translation of JP H11-176446 A (of record).
Abstract and translation of JP H07-029566 A (of record).
Abstract and translation of JP H08-287913 A (of record).
Abstract and translation of JP 2009-272041 A (of record).

* cited by examiner (a)

(b)

(a)

(b)

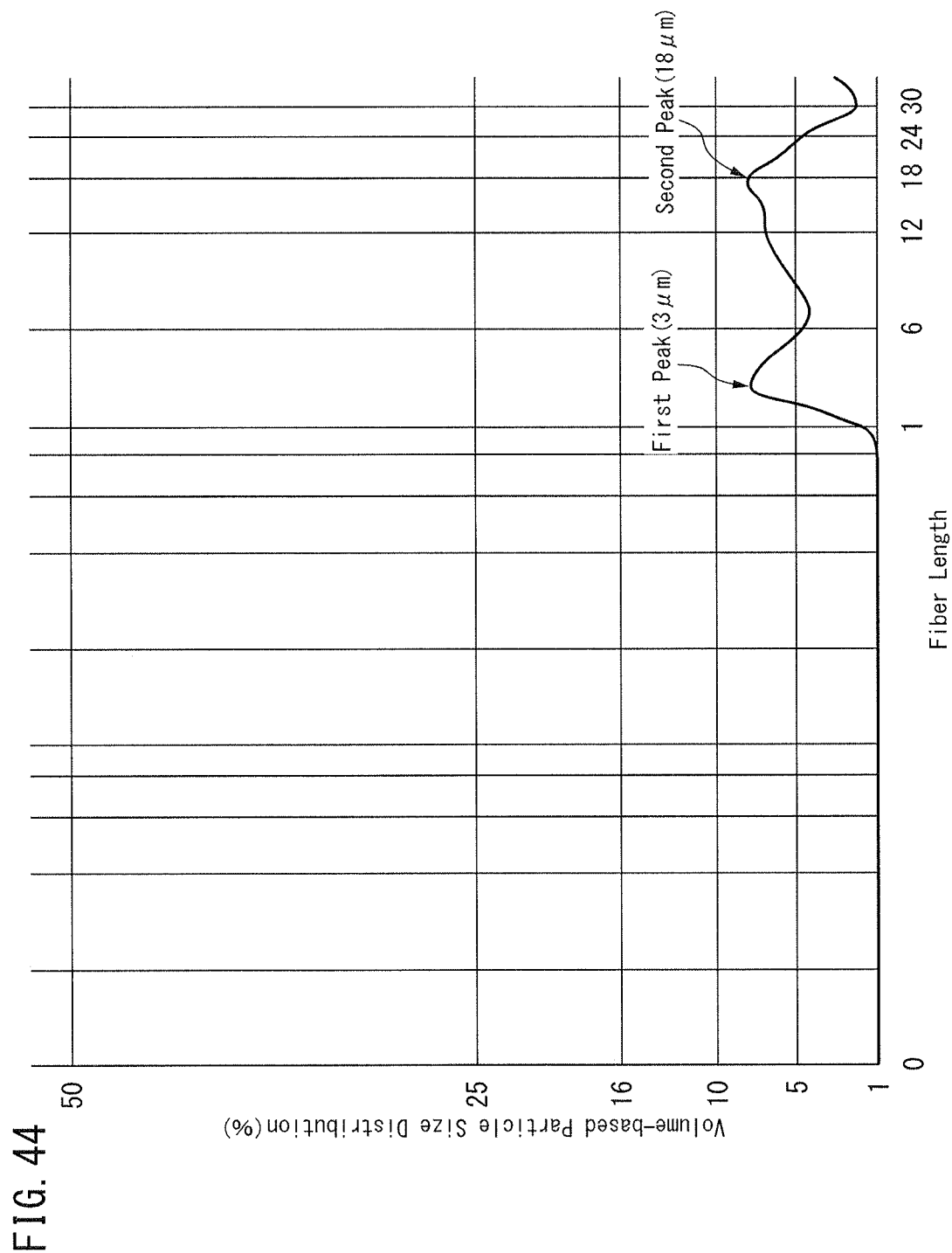

ULTRA-FINE FIBROUS CARBON FOR NON-AQUEOUS ELECTROLYTE SECONDARY BATTERY, ULTRA-FINE FIBROUS CARBON AGGREGATE, COMPOSITE, AND ELECTRODE ACTIVE MATERIAL LAYER

CROSS REFERENCE TO RELATED APPLICATIONS

This application is a National Stage of International Application No. PCT/JP2014/051572 filed Jan. 24, 2014 (claiming priority based on Japanese Patent Application Nos. 2013-012667, filed Jan. 25, 2013, 2013-074845, filed Mar. 29, 2013, 2013-100755, filed May 10, 2013 and 2013-100757, filed May 10, 2013), the contents of which are incorporated herein by reference in their entirety.

TECHNICAL FIELD

The present invention relates to ultrafine fibrous carbons for a non-aqueous electrolyte secondary battery, particularly, for a lithium ion secondary battery, ultrafine-fibrous-carbon aggregates, and a composite, and further relates to a carbon-based electroconductive agent, an electrode active material layer, an electrode material, and an electrode each using the same. In addition, the present invention relates to a non-aqueous secondary battery, particularly, a lithium ion secondary battery, using the electrode.

BACKGROUND ART

<Background Art of First and Second Aspects of the Present Invention>

A lithium ion secondary battery as a kind of non-aqueous electrolyte secondary battery is a secondary battery where lithium ion in an electrolyte is responsible for electrical conduction, and a secondary battery using a lithium metal oxide for the positive electrode and a carbon material such as graphite for the negative electrode is predominating. The lithium secondary battery is characterized by having, among secondary batteries, a high energy density and is expanding its application range from small equipment such as cellular phone to large equipment such as electric car.

One of the challenges for the lithium ion secondary battery is to prevent reduction (deterioration) in the battery capacity resulting from repetition of charging and discharging (enhancement of cycle characteristics). The cause of reduction in the cycle characteristics is considered to be, for example, a change (deterioration) of the electrode active material, electrolyte, electrolytic solution, etc., or an increase in the electrode resistance due to separation between an electrode foil and an electrode active material, and among others, one greatest cause includes expansion/contraction of the active material itself. As one improvement method therefor, it has been proposed to enhance the cycle characteristics by adding a fibrous carbon material into an electrode (see Patent Document 1).

In addition, since the carbon material added cannot sufficiently utilize its characteristics when aggregated in the electrode, it has been proposed to enhance the cycle characteristics by using a fibrous carbon material improved in the dispersibility in an electrode (see Patent Document 2).

<Background Art of Third and Fourth Aspects of the Present Invention>

As described in the background art of the first and second aspects of the present invention, one of the challenges for the lithium ion secondary battery is to prevent reduction (deterioration) in the battery capacity resulting from repetition of charging and discharging (enhancement of cycle characteristics).

For example, Patent Document 1 has proposed a negative electrode for a lithium secondary battery, wherein the negative electrode for a lithium secondary battery contains a negative electrode active material capable of storing/releasing lithium, an electrically conductive carbon material and a binder, the negative electrode active material is a graphitic material using natural or artificial graphite in which the interplanar spacing d(002) of (002) plane of the graphite structure as measured by powder X-ray diffraction is from 0.335 to 0.337 nm, the electrically conductive carbon material is a vapor grown carbon fiber in which the average fiber diameter is from 1 to 200 nm and the fiber has a hollow structure inside and has a structure of graphene sheets being laminated in a direction perpendicular to the length direction of the fiber and in which the interplanar spacing d(002) of (002) plane of the graphite structure as measured by powder X-ray diffraction is from 0.336 to 0.345 nm, and the vapor grown carbon fiber is contained in an amount of 0.1 to 10 mass % relative to the entire negative electrode without forming an agglomerate of 10 μm or more. In addition, for example, Patent Document 3 has proposed a negative electrode active material ingredient for a lithium secondary battery, containing at least either one graphite material of flake graphite or spherical graphite and a fibrous carbon forming a secondary particle having an average particle diameter of 10 to 30 μm.

RELATED ART

Patent Document

Patent Document 1: JP2007-42620A
Patent Document 2: JP2012-003985A
Patent Document 3: JP2000-133267A

SUMMARY OF THE INVENTION

Problems to be Solved by the Invention

<Challenge for First Aspect of the Present Invention>

An object of the present invention is to provide an electrode active material layer excellent in mechanical strength, a non-aqueous electrolyte secondary battery containing the electrode active material layer, and a carbon-based electroconductive agent contained in the electrode active material layer. Another object of the present invention is to provide a non-aqueous electrolyte secondary battery, particularly, a lithium ion secondary battery, with excellent cycle characteristics by increasing the mechanical strength of an electrode active material layer.

<Challenge for Second Aspect of the Present Invention>

An object of the present invention is to provide a composite having high electrical conductivity and excellent mechanical strength, a carbon-based electroconductive agent containing the composite, an electrode material for a non-aqueous electrolyte secondary battery, containing the electroconductive agent, and an electrode for a non-aqueous electrolyte secondary battery, containing the electrode material. Another object of the present invention is to provide a non-aqueous electrolyte secondary battery, particularly, a lithium ion secondary battery, with excellent rate characteristics by increasing the electrical conductivity and mechanical strength of each of a composite, a carbon-based electroconductive agent containing the composite, an electrode active material layer containing the composite, and an electrode for a non-aqueous electrolyte secondary battery, containing the electrode active material layer.

<Challenge for Third Aspect of the Present Invention>

In the invention described in Patent Document 1, a fibrous carbon material is added in an electrode with an attempt to enhance the cycle characteristics, but since a vapor grown carbon fiber is used as the fibrous carbon material and the vapor grown carbon fiber has a branching structure, dispersibility in an electrode can be hardly increased and the fibrous carbon material may aggregate, giving rise to a problem that the cycle characteristics are not sufficiently enhanced. The invention described in Patent Document 3 is characterized by adding from 0.5 to 22.5 parts by mass of a vapor grown carbon fiber so as to contain, in an electrode, a secondary particle composed of a vapor grown carbon fiber having an average particle diameter of 12 to 48 μm and thereby enhance the cycle characteristics, but when a vapor grown carbon fiber is localized, this is expected to allow focusing of a current on a secondary particle of the carbon fiber and intensively deteriorate only the focused portion, giving rise to a problem that the cycle characteristics are not sufficiently enhanced.

As a result of intensive studies by taking into account the above-described problems, the present inventors have found that when water dispersibility of ultrafine fibrous carbons and ultrafine-fibrous-carbon aggregates each for a non-aqueous electrolyte secondary battery is improved, the cycle characteristics of a non-aqueous electrolyte secondary battery, particularly, a lithium ion secondary battery, can be enhanced and moreover, high capacity can be achieved.

An object of the present invention is to provide ultrafine fibrous carbons and ultrafine-fibrous-carbon aggregates each having excellent water dispersibility. Another object of the present invention is to provide a carbon-based electroconductive agent, an electrode material for a non-aqueous electrolyte secondary battery, and an electrode for a non-aqueous electrolyte secondary battery, each having high electrical conductivity, by improving water dispersibility of ultrafine fibrous carbons and/or ultrafine-fibrous-carbon aggregates. Still another object of the present invention is to provide a non-aqueous electrolyte secondary battery, particularly, a lithium ion secondary battery, with excellent cycle characteristics and high capacity by improving water dispersibility of ultrafine fibrous carbons and/or ultrafine-fibrous-carbon aggregates.

<Challenge for Fourth Aspect of the Present Invention>

As a result of intensive studies by taking into account the problems described in Challenge for Third Aspect of the Present Invention, the present inventors have found that when water dispersibility of ultrafine-fibrous-carbon aggregates for a non-aqueous electrolyte secondary battery is improved, the cycle characteristics of a non-aqueous electrolyte secondary battery, particularly, a lithium ion secondary battery, can be enhanced and moreover, high capacity can be achieved.

An object of the present invention is to provide ultrafine-fibrous-carbon aggregates having excellent water dispersibility and excellent mechanical strength. Another object of the present invention is to provide a carbon-based electroconductive agent, an electrode material for a non-aqueous electrolyte secondary battery, and an electrode for a non-aqueous electrolyte secondary battery, each having high electrical conductivity and excellent mechanical strength, by improving water dispersibility and mechanical strength of ultrafine-fibrous-carbon aggregates. Still another object of the present invention is to provide a non-aqueous electrolyte secondary battery, particularly, a lithium ion secondary battery, with excellent cycle characteristics and high capacity by improving water dispersibility and mechanical strength of ultrafine-fibrous-carbon aggregates.

Means to Solve the Problems

<First Aspect of the Present Invention>

In order to attain the above-described objects, the present inventors have repeated intensive studies by taking into account those conventional techniques, as a result, the present invention has been accomplished. That is, the present invention is an electrode active material layer containing at least an electrode active material, a carbon-based electroconductive agent and a binder, wherein the carbon-based electroconductive agent contains ultrafine fibrous carbons having a linear structure and an average fiber diameter of more than 200 nm to 900 nm and the in-plane maximum tensile strength $\sigma_M$ of the electrode active material layer and the in-plane tensile strength $\sigma_T$ in the direction perpendicular to the direction of the maximum tensile strength $\sigma_M$ satisfy the following relationship (a):

$$\sigma_M/\sigma_T \leq 1.6 \qquad (a)$$

<Second Aspect of the Present Invention>

In order to attain the above-described objects, the present inventors have repeated intensive studies by taking into account those conventional techniques, as a result, the present invention has been accomplished. That is, the present invention is a composite containing ultrafine fibrous carbons and a spherical carbon, wherein the ultrafine fibrous carbons have a linear structure, and the ultrafine fibrous carbons and the spherical carbon are integrally attached to each other and uniformly mixed with each other.

<Third Aspect of the Present Invention>

In order to attain the above-described objects, the present invention provides ultrafine fibrous carbons having a linear structure, wherein at least a part of the surface of the ultrafine fibrous carbons is modified with a surfactant and/or at least a part of the surface of the ultrafine fibrous carbons is oxidatively treated, and also provides ultrafine-fibrous-carbon aggregates obtained by aggregating the ultrafine fibrous carbon.

<Fourth Aspect of the Present Invention>

In order to attain the above-described objects, the present invention provides ultrafine-fibrous-carbon aggregates obtained by aggregating ultrafine fibrous carbons having a linear structure, wherein at least a part of the surface of the ultrafine fibrous carbons in at least a part of the ultrafine-fibrous-carbon aggregates is modified with a surfactant and/or at least a part of the surface of the ultrafine fibrous carbons in at least a part of the ultrafine-fibrous-carbon aggregates is oxidatively treated, and, in the volume-based particle size fiber length distribution of the ultrafine-fibrous-carbon-aggregate, which is obtained by measuring the volume-based particle size distribution, a first peak exists at a fiber length of 15 μm or less and a second peak exists at a fiber length of more than 15 μm, and the ratio of the volume-based particle size distribution (%) of the first peak to the volume-based particle size distribution (%) of the second peak is 3/1 or more.

Effects of the Invention

<Effects of First Aspect of the Present Invention>

According to the present invention, an electrode active material layer excellent in mechanical strength, a non-aqueous electrolyte secondary battery containing the electrode active material layer, and a carbon-based electroconductive agent contained in the electrode active material layer are provided. In addition, according to the present invention, a non-aqueous electrolyte secondary battery, particularly, a lithium ion secondary battery, with excellent cycle characteristics is provided.

<Effects of Second Aspect of the Present Invention>

According to the present invention, a composite having high electrical conductivity and excellent mechanical strength, a carbon-based electroconductive agent containing the composite, an electrode active material layer containing the composite, and an electrode for a non-aqueous electrolyte secondary battery, containing the electrode active material layer, are provided. In addition, according to the present invention, a non-aqueous electrolyte secondary battery, particularly, a lithium ion secondary battery, having excellent cycle characteristics and high capacity is provided by increasing the electrical conductivity and mechanical strength of each of a composite, a carbon-based electroconductive agent containing the composite, an electrode active material layer containing the composite, and an electrode for a non-aqueous electrolyte secondary battery, containing the electrode active material layer.

<Effects of Third Aspect of the Present Invention>

According to the present invention, ultrafine fibrous carbons and ultrafine-fibrous-carbon aggregates each having excellent water dispersibility are provided. In addition, according to the present invention, a carbon-based electroconductive agent, an electrode material for a non-aqueous electrolyte secondary battery, and an electrode for a non-aqueous electrolyte secondary battery, each having high electrical conductivity are provided by improving water dispersibility of ultrafine fibrous carbons and/or ultrafine-fibrous-carbon aggregates. Furthermore, according to the present invention, a non-aqueous electrolyte secondary battery, particularly, a lithium ion secondary battery, having excellent cycle characteristics and high capacity is provided by improving water dispersibility of ultrafine fibrous carbons and/or ultrafine-fibrous-carbon aggregates.

<Effects of Fourth Aspect of the Present Invention>

According to the present invention, ultrafine-fibrous-carbon aggregates having excellent water dispersibility and excellent mechanical strength is provided. In addition, according to the present invention, a carbon-based electroconductive agent, an electrode material for a non-aqueous electrolyte secondary battery, and an electrode for a non-aqueous electrolyte secondary battery, each having high electrical conductivity and excellent mechanical strength, are provided by improving water dispersibility and mechanical strength of ultrafine-fibrous-carbon aggregates. Furthermore, according to the present invention, a non-aqueous electrolyte secondary battery, particularly, a lithium ion secondary battery, having excellent cycle characteristics and high capacity is provided by improving water dispersibility and mechanical strength of ultrafine-fibrous-carbon aggregates.

BRIEF DESCRIPTION OF THE DRAWINGS

FIG. 44 is a view showing the results of the fiber length distribution of the ultrafine-fibrous-carbon aggregates obtained in Comparative Example D2.

MODE FOR CARRYING OUT THE INVENTION

<First Aspect of the Present Invention>

Figure 1:
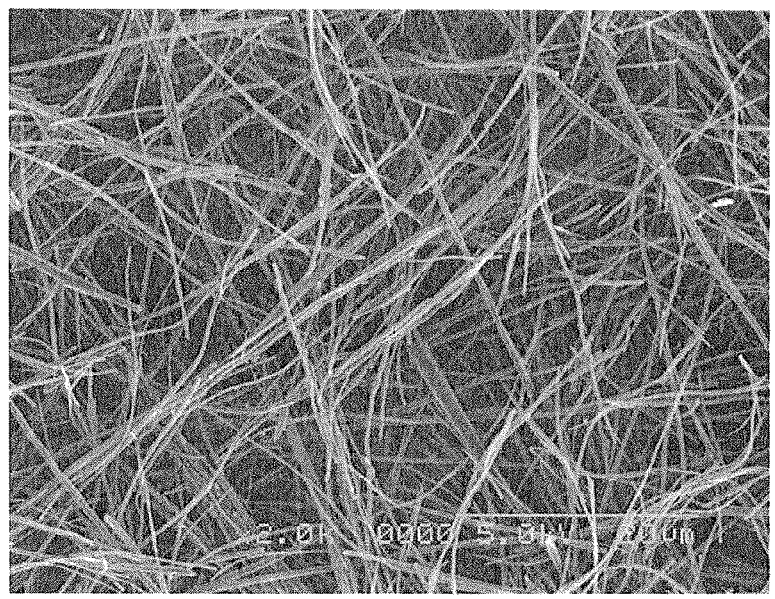
FIG. 1 is a scanning electron microscope image (2,000 times magnification) of ultrafine fibrous carbons.

The electrode active material layer according to the present invention contains at least an electrode active material, a carbon-based electroconductive agent and a binder, the carbon-based electroconductive agent contains ultrafine fibrous carbons having a linear structure and an average fiber diameter of more than 200 nm to 900 nm, and the in-plane maximum tensile strength $\sigma_M$ of the electrode active material layer and the in-plane tensile strength $\sigma_T$ in the direction perpendicular to the direction of the maximum tensile strength $\sigma_M$ satisfy the following relationship (a) (embodiment 1):

$$\sigma_M/\sigma_T \leq 1.6 \qquad (a)$$

According to embodiment 1, the maximum tensile strength $\sigma_M$ and the tensile strength $\sigma_T$ in the in-plane perpendicular direction are equivalent, and therefore even when the electrode active material is expanded/contracted at the time of charging/discharging, cracking of the electrode active material layer or separation of the electrode active material layer from the collector can be suppressed, so that the effect of excellent cycle characteristics can be provided.

In embodiment 1, the carbon-based electroconductive agent is preferably contained in an amount of 10 mass % or less, based on the total mass of the electrode active material layer (embodiment 2). According to embodiment 2, the mechanical strength in the coating direction for coating the electrode material (MD direction) and/or the in-plane direction perpendicular to the coating direction (TD direction) is large, and an excellent reinforcement effect is provided.

In embodiment 1 or 2, the binder is preferably contained in an amount of 1 to 25 mass %, based on the total mass of the electrode active material layer (embodiment 3). According to embodiment 3, the mechanical strength in the coating direction for coating the electrode material (MD direction) and/or the in-plane direction perpendicular to the coating direction (TD direction) is large, and an excellent reinforcement effect is provided.

In any one embodiment of embodiments 1 to 3, the average fiber length of the ultrafine fibrous carbons is preferably from 1 to 15 µm (embodiment 4). According to embodiment 4, the mechanical strength in the coating direction for coating the electrode material (MD direction) and/or the in-plane direction perpendicular to the coating direction (TD direction) is large, and an excellent reinforcement effect is provided.

In any one embodiment of embodiments 1 to 4, the ultrafine fibrous carbons preferably contains ultrafine fibrous carbons having an average fiber length of 1 to 15 µm and ultrafine fibrous carbons having an average fiber length of more than 15 µm to 50 µm (embodiment 5). According to embodiment 5, the mechanical strength in the coating direction for coating the electrode material (MD direction) and/or the in-plane direction perpendicular to the coating direction (TD direction) is large, and an excellent reinforcement effect is provided.

In the electrode active material layer according to the present invention, two or more embodiments out of embodiments 1 to 5 can be combined.

In addition, the electrode active material layer according to the present invention preferably contains at least two kinds of ultrafine fibrous carbons differing in the average fiber length of the ultrafine fibrous carbon, and it is more preferred that the average fiber length of at least one kind of ultrafine fibrous carbons out of at least two kinds of ultrafine fibrous carbons is from 1 to 15 μm. Here, the ultrafine fibrous carbons is sometimes referred to as CNF, and the ultrafine fibrous carbons having a short average fiber length, for example, ultrafine fibrous carbons having an average fiber length of 1 to 15 μm, is sometimes referred to as S-CNF.

Furthermore, the electrode active material layer according to the present invention preferably contains ultrafine fibrous carbons and at least one kind of a carbon-based material other than ultrafine fibrous carbons, more preferably contains at least two kinds of ultrafine fibrous carbons differing in the average fiber length of the ultrafine fibrous carbons and at least one kind of a carbon-based material other than ultrafine fibrous carbons. The at least one kind of a carbon-based material other than ultrafine fibrous carbons includes, for example, carbon black, acetylene black, and graphite.

The non-aqueous electrolyte secondary battery according to the present invention is a non-aqueous electrolyte secondary battery containing the electrode active material layer according to embodiments 1 to 5 (embodiment 6). The electrode for the non-aqueous electrolyte secondary battery using the electrode active material layer according to embodiments 1 to 5 can be increased in the mechanical strength, and therefore even when the active material is expanded/contracted at the time of charging/discharging, the non-aqueous electrolyte secondary battery of embodiment 6 can maintain an electrical conduction path, so that the effect of excellent cycle characteristics can be provided.

The carbon-based electroconductive agent according to the present invention contains ultrafine fibrous carbons having a linear structure and an average fiber diameter of more than 200 nm to 900 nm, and the average fiber length of the ultrafine fibrous carbons is from 1 to 15 μm (embodiment 7). Alternatively, the carbon-based electroconductive agent according to the present invention contains ultrafine fibrous carbons having a linear structure and an average fiber diameter of more than 200 nm to 900 nm, and the ultrafine fibrous carbons contains ultrafine fibrous carbons having an average fiber length of 1 to 15 μm and ultrafine fibrous carbons having an average fiber length of more than 15 μm to 50 μm (embodiment 8). The electrode active material layer containing the carbon-based electroconductive agent of embodiments 7 and 8 has a large mechanical strength in the coating direction for coating the electrode material (MD direction) and the in-plane direction perpendicular to the coating direction (TD direction), and an excellent reinforcement effect is provided.

In addition, the carbon-based electroconductive agent according to the present invention preferably contains at least two kinds of ultrafine fibrous carbons differing in the average fiber length of the ultrafine fibrous carbon, and it is more preferred that the average fiber length of at least one kind of ultrafine fibrous carbons out of at least two kinds of ultrafine fibrous carbons is from 1 to 15 μm.

Furthermore, the electrode active material layer according to the present invention preferably contains ultrafine fibrous carbons and at least one kind of a carbon-based material other than ultrafine fibrous carbons, more preferably contains at least two kinds of ultrafine fibrous carbons differing in the average fiber length of the ultrafine fibrous carbons and at least one kind of a carbon-based material other than ultrafine fibrous carbons. The at least one kind of a carbon-based material other than ultrafine fibrous carbons includes, for example, carbon black, acetylene black, and graphite.

First, the ultrafine fibrous carbons contained in a carbon-based electroconductive agent that is contained in the electrode active material layer of the present invention, is described in detail.

[Ultrafine Fibrous Carbon]

Easily-Graphitizable Carbon

The ultrafine fibrous carbons contained in the electrode material for a non-aqueous electrolyte secondary battery according to the present invention is preferably easily-graphitizable carbon. The easily-graphitizable carbon is a raw carbon material in which a graphite structure having a three-dimensional lamination regularity is readily produced by heat treatment at a high temperature of 2,500° C. or more, and is also called soft carbon, etc. The easily-graphitizable carbon includes petroleum coke, coal pitch coke, polyvinyl chloride, 3,5-dimethylphenolformaldehyde resin, etc.

Above all, a compound capable of forming an optically anisotropic phase (liquid crystal phase) in a molten state, which is called a mesophase pitch, or a mixture thereof is preferred, because high crystallinity and high electrical conductivity are expected. The mesophase pitch includes, for example, a petroleum-based mesophase pitch obtained from a petroleum residue oil by a method based on hydrogenation and heat treatment or by a method based on hydrogenation, heat treatment and solvent extraction; a coal-based mesophase pitch obtained from a coal tar pitch by a method based on hydrogenation and heat treatment or by a method based on hydrogenation, heat treatment and solvent extraction; and a synthetic liquid crystal pitch obtained by polycondensation in the presence of a super strong acid (e.g., HF, BF3) by using, as a raw material, an aromatic hydrocarbon such as naphthalene, alkylnaphthalene and anthracene. Among these, a synthetic liquid crystal pitch is preferred in view of not containing impurities.

Average Fiber Diameter

The average fiber diameter of the ultrafine fibrous carbons for use in the present invention is from more than 200 nm to 900 nm. This average fiber diameter is a value measured from a photographic view taken at a magnification of 2,000 times by a field emission scanning electron microscope. The average fiber diameter of the ultrafine fibrous carbons is preferably from more than 230 nm to 600 nm, more preferably from more than 250 nm to 500 nm, still more preferably from more than 250 nm to 400 nm.

The ultrafine fibrous carbons for use in the present invention have a linear structure. The linear structure as used herein means that the branching degree is 0.01 branch/μm or less. The branching indicates a granular part formed by bonding of ultrafine fibrous carbons to the other ultrafine fibrous carbons at a position other than the terminal part, and indicates that the primary axis of the ultrafine fibrous carbons is diverged in midstream and the primary axis of the ultrafine fibrous carbons has a branching secondary axis.

Average Fiber Length

The average fiber length of the ultrafine fibrous carbons for use in the present invention is preferably from 1 to 100 μm, more preferably from 1 to 50 μm. As the average fiber length of the ultrafine fibrous carbons is longer, the electrical conductivity in the electrode for a non-aqueous electrolyte secondary battery, the strength of the electrode, and the electrolytic solution retentivity are advantageously increased, but if it is too long, there arises a problem that the fiber dispersibility in the electrode is impaired. For this reason, the average fiber length of the ultrafine fibrous carbons for use in the present invention is preferably in the range above.

Average Interplanar Spacing

In the ultrafine fibrous carbons for use in the present invention, it is more preferred that the average interplanar spacing d(002) of (002) plane as measured by an X-ray diffraction method is from 0.335 to 0.340 nm.

Here, FIG. 1 shows a scanning electron micrograph (2,000 times magnification) of a representative ultrafine fibrous carbons for use in the present invention. As evident from FIG. 1, it is confirmed that the ultrafine fibrous carbons for use in the present invention has a linear structure and the average fiber length is from 1 to 100 μm.

Next, the electrode active material (positive electrode active material, negative electrode active material) contained in the electrode material for a non-aqueous electrolyte secondary battery according to the present invention is described in detail.

[Positive Electrode Active Material]

As the positive electrode active material contained in the electrode material for a non-aqueous electrolyte secondary battery of the present invention, arbitrary one member or two or more members appropriately selected from the materials conventionally known as the positive electrode active material in a non-aqueous electrolyte secondary battery may be used. For example, in the case of a lithium ion secondary battery, a lithium-containing metal oxide capable of storing/releasing lithium ion is suitable. The lithium-containing metal oxide includes a composite oxide containing lithium and at least one element selected from the group consisting of Co, Mg, Mn, Ni, Fe, Al, Mo, V, W, Ti, etc.

Specifically, the composite oxide includes at least one member selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ (wherein x=from 0.02 to 1.2, a=from 0.1 to 0.9, b=from 0.8 to 0.98, c=from 1.6 to 1.96, and z=from 2.01 to 2.3), etc. Preferable lithium-containing metal oxides include at least one member selected from the group consisting of $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (where x, a, b and z are the same as above). Incidentally, the value of x is a value before start of charging/discharging and is increased/decreased by charging/discharging.

As for the positive electrode active material above, one material may be used alone, or two or more materials may be used in combination. The average particle diameter of the positive electrode active material is 10 μm or less. If the average particle diameter exceeds 10 μm, the efficiency of charge/discharge reaction decreases under a large current. The average particle diameter is preferably from 0.05 μm (50 nm) to 7 μm, more preferably from 1 to 7 μm.

[Negative Electrode Active Material]

As the negative electrode active material contained in the electrode material for a non-aqueous electrolyte secondary battery of the present invention, one member or two or more members selected from the materials conventionally known as the negative electrode active material in a non-aqueous electrolyte secondary battery may be used. For example, in the case of a lithium ion secondary battery, a carbon material capable of storing/releasing lithium ion, either Si or Sn, an alloy or oxide containing at least either one thereof, etc. may be used. Among these, a carbon material is preferred.

Representative examples of the carbon material include natural graphite, artificial graphite produced by heat-treating petroleum-based and coal-based cokes, hard carbon in which a resin is carbonized, and a mesophase pitch-based carbon material. In the case of using natural graphite or artificial graphite, from the standpoint of increasing the battery capacity, those having a graphite structure in which the interplanar spacing d(002) of (002) plane is from 0.335 to 0.337 nm as measured by powder X-ray diffraction are preferred.

The natural graphite means a graphitic material naturally produced as an ore. The natural graphite is classified, by its appearance and nature, into two types, i.e., scaly graphite having a high degree of crystallization and amorphous graphite having a low degree of crystallization. The scaly graphite is further classified into flaky graphite taking on a leaf-like appearance and scaly graphite taking on a block-like appearance. The natural graphite working out to a graphitic material is not particularly limited in its locality, nature, and kind. In addition, natural graphite or a particle produced using natural graphite as a raw material may be heat-treated before use.

The artificial graphite means graphite produced by a wide range of artificial techniques or a graphitic material close to a perfect graphite crystal. Representative examples thereof include those produced through a calcination step at approximately from 500 to 1,000° C. and a graphitization step at 2,000° C. or more by using, as a raw material, tar or coke obtained from a residue, etc. after coal carbonization or crude oil distillation. In addition, Kish graphite obtained by reprecipitating carbon from molten iron is also a kind of artificial graphite.

Other than the carbon material, when an alloy containing at least either one of Si and Sn is used as the negative electrode active material, this is effective in that the electric capacity can be reduced, compared with a case of using Si or Sn as an elemental substance or using an oxide thereof. Particularly an Si-based alloy is preferred.

The Si-based alloy includes, for example, an alloy of Si and at least one element selected from the group consisting of B, Mg, Ca, Ti, Fe, Co, Mo, Cr, V, W, Ni, Mn, Zn, Cu, etc. Specifically, the alloy includes at least one member selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu5Si$, $FeSi_2$, $MnSi_2$, $VSi_2$, $WSi_2$, $ZnSi_2$, etc.

In the present invention, as the negative electrode active material, one of the above-described materials may be used alone, or two or more thereof may be used in combination. The average particle diameter of the negative electrode active material is 10 μm or less. If the average particle diameter exceeds 10 μm, the efficiency of charge/discharge reaction decreases under a large current. The average particle diameter is preferably from 0.1 to 10 μm, more preferably from 1 to 7 μm.

The binder contained in the electrode material for a non-aqueous electrolyte secondary battery of the present invention is described in detail below.

[Binder]

As for the binder contained in the non-aqueous electrolyte secondary battery of the present invention, a binder enabling electrode molding and having sufficient electrochemical stability can be suitably used. As such a binder, one or more members selected from the group consisting of polyvinyl alcohol, polyacrylic acid, carboxymethyl cellulose, polytetrafluoroethylene (PTFE), polyvinylidene fluoride (PVDF), synthetic butadiene rubber (SBR), a fluoroolefin copolymer crosslinked polymer, polyimide, petroleum pitch, coal pitch, a phenol resin, etc. are preferably used, and polyvinylidene fluoride (PVDF) is more preferred.

The form at the time of use as a binder is not particularly limited and may be a solid form or a liquid form (e.g., emulsion form), and the form can be appropriately selected by taking into account, for example, the production method (in particular, whether dry kneading or wet kneading) of electrode and the solubility in electrolytic solution.

The solvent for dissolving the binder is not particularly limited as long as it dissolves the binder. Specifically, the solvent includes, for example, one or more kinds of solvents selected from the group consisting of N-methylpyrrolidone (NMP), dimethylacetamide (DMAc), dimethylformamide (DMF), dimethylsulfoxide (DMSO), etc. Particularly NMP or DMAc is preferred.

The electrode for a non-aqueous electrolyte secondary battery of the present invention is described below. The electrode for a non-aqueous electrolyte secondary battery of the present invention is an electrode for a non-aqueous electrolyte secondary battery, having a collector and an active material layer on the collector, wherein the active material layer is composed of the electrode material for a non-aqueous electrolyte secondary battery of the present invention.

(Electrode for Non-Aqueous Electrolyte Secondary Battery)

As the method for manufacturing an electrode of a non-aqueous electrolyte secondary battery, the following two techniques are employed in general. One method is a method where an electrode active material, an electroconductive agent and a binder are mixed/kneaded and shaped into a film by extrusion molding, and the obtained film is rolled, stretched and then laminated together with a collector. Another method is a method where an electrode active material, an electroconductive agent, a binder and a solvent for dissolving the binder are mixed to prepare a slurry and the slurry is coated on a substrate and after removing the solvent, pressed.

In the present invention, either method may be used, but since the latter method is preferred, the latter method is described in detail below.

In the manufacture of the electrode of the present invention, the ratio of the electroconductive agent added in the slurry is 10 mass % or less relative to the electrode material composed of the electrode active material, the electroconductive agent and the binder. The adding ratio is preferably 7 mass % or less, more preferably 5 mass % or less. If the ratio of the electroconductive agent added exceeds 10 mass %, when fabricating a cell having any capacity, the amount of the active material in the electrode is reduced, leading to difficulty of application to power source usage where high importance is attached to the energy density.

In the present invention, the ratio of the binder added is from 1 to 25 mass % relative to the electrode material composed of the electrode active material, the electroconductive agent and the binder. The adding ratio is preferably from 3 to 20 mass %, more preferably from 5 to 20 mass %. If the amount of the binder is less than 1 mass %, generation of cracking or separation of the electrode from the collector may occur. If the amount of the binder exceeds 25 mass %, when fabricating a cell having any capacity, the amount of the active material in the electrode is reduced, leading to difficulty of application to power source usage where high importance is attached to the energy density.

At the time of manufacture of the electrode, because of poor dispersion state in the slurry, it is sometimes difficult to ensure fluidity suitable for coating. In such a case, a slurrying aid may be used. The slurrying aid includes, for example, one or more members selected from the group consisting of polyvinylpyrrolidone, carboxymethyl cellulose, polyvinyl acetate, polyvinyl alcohol, etc. Particularly use of polyvinylpyrrolidone is preferred. By adding the above-described slurrying aid, sufficient fluidity can be ensured even with a relatively small amount of a solvent, and the dispersibility of pulverized active carbon is also dramatically enhanced. In addition, generation of cracking after the removal of solvent can be reduced. The amount of the slurrying aid added is preferably 10 mass % or less, more preferably from 0.5 to 10 mass %, still more preferably from 0.5 to 8 mass %, based on the total of components in the slurry other than the solvent. If the amount of the slurrying agent added exceeds 10 mass %, conversely, the slurry viscosity may decrease rapidly to cause a dispersion failure, making it difficult to manufacture a suitable slurry. If the value above is less than 0.5 mass %, the effect of the slurrying aid is not brought out.

The solid content concentration in the slurry (the ratio of the total weight of the slurry components other than the solvent to the total mass of the slurry) is preferably from 10 to 50 mass %, more preferably from 15 to 40 mass %. If the solid content concentration exceeds 50 mass %, it may be difficult to manufacture a uniform slurry. If this value is less than 10 mass %, the slurry viscosity may be decreased too much, resulting in uneven thickness of the electrode.

For coating the slurry, for example, an appropriate coating method such as doctor blade may be employed. After the coating, the solvent is removed by a treatment, for example, at 60 to 150° C., preferably from 75 to 85° C., for preferably from 60 to 180 minutes. Thereafter, the coated material after the removal of solvent is pressed, whereby an active material layer can be produced.

In the electrode for a non-aqueous electrolyte secondary battery of the present invention, the thickness of the active material layer is suitably from 5 to 300 µm. If the thickness of the active material layer is less than 5 µm, when fabricating a cell having any capacity, a separator or a collector needs to be used in a large amount, leading to a decrease in the volume occupancy of the active material layer in the cell, and not only this is disadvantageous in view of energy density but also the usage is considerably limited. In particular, although output characteristics (including low-temperature characteristics) are important, application to power source usage where high importance is attached to energy density becomes difficult.

On the other hand, production of an electrode where the electrode thickness exceeds 300 µm is relatively difficult due to problem of crack generation. Therefore, the electrode thickness is in general preferably 300 µm or less in view of stable production of the electrode. In order to more stably produce the electrode, the electrode thickness is more preferably 200 µm or less and for the purpose of elevating the productivity of electrode or the output characteristics of capacitor, the electrode thickness is still more preferably from 10 to 100 µm.

The electrode for a non-aqueous electrolyte secondary battery according to the present invention, which is manufactured as above, preferably has no anisotropy of electrode strength. In the electrode having no anisotropy of electrode strength, from which the collector is removed, i.e., in the electrode material according to the present invention, the ratio $\sigma_M/\sigma_T$ between the tensile strength $\sigma_M$ in the coating direction for coating the electrode material and the in-plane tensile strength $\sigma_T$ in the direction perpendicular to the direction of the coating direction is preferably 1.6 or less. The ratio $\sigma_M/\sigma_T$ is more preferably 1.2 or less, still more preferably from 0.9 to 1.1.

The electrode for a non-aqueous electrolyte secondary battery according to the present invention, which is manufactured as above, preferably has anisotropy of electrode strength. In the electrode having anisotropy of electrode strength, from which the collector is removed, i.e., in the electrode material according to the present invention, the ratio $\sigma_M/\sigma_T$ between the tensile strength $\sigma_M$ in the coating direction for coating the electrode material and the in-plane tensile strength $\sigma_T$ in the direction perpendicular to the direction of the coating direction is preferably more than 1.6. The ratio $\sigma_M/\sigma_T$ is more preferably 1.7 or more, still more preferably 1.8 or more.

The collector of the electrode for a non-aqueous electrolyte secondary battery according to the present invention may be formed of any electrically conductive material. Accordingly, the collector can be formed of, for example, a metal material such as aluminum, nickel, iron, stainless steel, titanium and copper, particularly aluminum, stainless steel or copper.

The non-aqueous electrolyte secondary battery of the present invention is described below. The non-aqueous electrolyte secondary battery of the present invention is a battery containing the electrode active material layer of the present invention.

(Non-Aqueous Electrolyte Secondary Battery)

The non-aqueous electrolyte secondary battery according to the present invention includes, for example, a lithium ion secondary battery, a lithium battery, and a lithium ion polymer battery but is preferably a lithium ion secondary battery. In the non-aqueous electrolyte secondary battery of the present invention, a positive electrode obtained by forming a positive electrode active material layer on a surface of a collector, an electrolyte layer containing an electrolyte, and the negative electrode for a non-aqueous electrolyte secondary battery of the present invention may be stacked such that the positive electrode material layer and the negative electrode active material layer of the negative electrode according to the present invention face each other and the electrolyte layer is inserted between the positive electrode active material layer and the negative electrode active material layer according to the present invention.

Alternatively, in the non-aqueous electrolyte secondary battery of the present invention, the positive electrode for a non-aqueous electrolyte secondary battery of the present invention, an electrolyte layer containing an electrolyte, and a negative electrode obtained by forming a negative electrode active material layer on a surface of a collector may be stacked such that the positive electrode active material layer of the positive electrode according to the present invention and the negative electrode active material layer of the negative electrode face each other and the electrolyte layer is inserted between the positive electrode active material layer of the positive electrode according to the present invention and the negative electrode active material layer. Furthermore, in the non-aqueous electrolyte secondary battery of the present invention, the positive electrode for a non-aqueous electrolyte secondary battery of the present invention, an electrolyte layer containing an electrolyte, and the negative electrode for a non-aqueous electrolyte secondary battery of the present invention may be stacked such that the positive electrode active material layer of the positive electrode according to the present invention and the negative electrode active material layer of the negative electrode according to the present invention face each other and the electrolyte layer is inserted between the positive electrode active material layer of the positive electrode according to the present invention and the negative electrode active material layer of the negative electrode according to the present invention.

The electrolyte layer for the non-aqueous electrolyte secondary battery of the present invention is not limited as long as the object and effects of the present invention are not impaired. Accordingly, as the electrolyte layer, for example, a liquid electrolyte, i.e., a solution prepared, for example, by dissolving a lithium salt in an organic solvent, may be used. However, in the case of using such a liquid electrolyte, a separator composed of a porous layer is preferably used in general so as to prevent direct contact between the positive electrode active material layer and the negative electrode active material layer.

As the organic solvent for the liquid electrolyte, for example, ethylene carbonate (EC), diethyl carbonate (DEC), propylene carbonate (PC), dimethyl carbonate (DMC), and ethyl methyl carbonate (EMC) may be used. One of these organic solvents may be used alone, or two or more thereof may be used in combination. As the lithium salt for the liquid electrolyte, for example, $LiPF_6$, $LiClO_4$, $LiN(CF_3SO_2)_2$, and $LiBF_4$ can be used. One of these lithium salts may be used alone, or two or more thereof may be used in combination.

Incidentally, a solid electrolyte may also be used for the electrolyte layer and in this case, a separate spacer can be omitted.

(Carbon-Based Electroconductive Agent)

The carbon-based electroconductive agent according to the present invention contains ultrafine fibrous carbons having a linear structure and an average fiber diameter of more than 200 nm to 900 nm, and the average fiber length of the ultrafine fibrous carbons is from 1 to 15 μm. Detailed description of the ultrafine fibrous carbons is as given above.

<Second Aspect of the Present Invention>

The present invention is described below.

The composite of the present invention is a composite containing ultrafine fibrous carbons and a spherical carbon, wherein the ultrafine fibrous carbons has a linear structure and the ultrafine fibrous carbons and the spherical carbon are integrally attached to each other and uniformly mixed with each other (embodiment 1).

In embodiment 1, the composite of the present invention is obtained by dry compounding of the ultrafine fibrous carbons and the spherical carbon (embodiment 2).

In embodiment 1 or 2, assuming that the density of the composite and the density of the ultrafine fibrous carbons are substantially identical, the composite of the present invention has a volume resistivity ranging from nearly the same as that of the ultrafine fibrous carbons to 1.5 times (embodiment 3).

In any one embodiment of embodiments 1 to 3, assuming that the density of the composite of the present invention and the density of the spherical carbon are substantially identical, the composite of the present invention has a volume resistivity ranging from nearly the same as that of the spherical carbon to 1/100 times (embodiment 4).

In the composite according to any one embodiment of embodiments 1 to 4, the mass ratio between the ultrafine fibrous carbons and the spherical carbon is from 1:9 to 5:5 (embodiment 5).

In the composite according to any one embodiment of embodiments 1 to 5, the average fiber length of the ultrafine fibrous carbons is from more than 10 μm to 50 μm (embodiment 6).

In the composite according to any one embodiment of embodiments 1 to 5, the average fiber length of the ultrafine fibrous carbons is from 1 to 10 μm (embodiment 7).

In the composite according to any one embodiment of embodiments 1 to 7, the spherical carbon is carbon black (embodiment 8).

The carbon-based electroconductive agent of the present invention is a carbon-based electroconductive agent containing the composite according to any one embodiment of embodiments 1 to 7 (embodiment 9).

The electrode active material layer of the present invention is the electrode active material layer according to any one embodiment of embodiments 1 to 5 in the first aspect of the present invention, containing at least the composite according to embodiments 1 to 8, an electrode active material, and a binder (embodiment 10).

The non-aqueous electrolyte secondary battery of the present invention is a non-aqueous electrolyte secondary battery containing the electrode active material layer of embodiment 10 (embodiment 11).

In the composite of the present invention, two or more embodiments out of embodiments 1 to 8 can be arbitrarily combined. The carbon-based electroconductive agent of the present invention can contain the composite of the present invention in which two or more embodiments are arbitrarily combined; the electrode active material of the present invention can contain this composite; the electrode for a non-aqueous electrolyte secondary battery of the present invention can contain this electrode active material layer; and the non-aqueous electrolyte secondary battery of the present invention can contain this electrode for a non-aqueous electrolyte secondary battery.

The present invention is described in more detail below.

[Composite]

The composite of the present invention is a composite containing ultrafine fibrous carbons and a spherical carbon, wherein the ultrafine fibrous carbons has a linear structure and the ultrafine fibrous carbons and the spherical carbon are integrally attached to each other and uniformly mixed with each other. Due to the configuration where the ultrafine fibrous carbons and the spherical carbon are integrally attached to each other and uniformly mixed with each other, the composite of the present invention has high electrical conductivity and excellent mechanical strength.

The "attached" as used herein may be chemical bonding but mainly means physical bonding, for example, means physical boding such as adhesion. Whether or not those carbons are integrally attached to each other and uniformly mixed can be easily judged by observing the mixing degree of ultrafine fibrous carbons and spherical carbon contained in the composite by means of a scanning electron microscope, etc. Whether or not those carbons are integrally attached to each other and uniformly mixed can also be judged by measuring the porosity of the composite. For judging that the carbons are uniformly mixed, the porosity of the composite can be selected from, for example, 50% or less, 40% or less, and 30% or less, and may be 10% or more.

In order to achieve the configuration where ultrafine fibrous carbons and a spherical carbon in the composite of the present invention are integrally attached to each other and uniformly mixed with each other, the composite of the present invention is preferably produced and obtained by dry compounding or wet compounding of the superfine fibrous carbon and the spherical carbon.

In particular, the composite of the present invention is more preferably produced by dry compounding of the superfine fibrous carbon and the spherical carbon. By applying dry compounding, the composite of the present invention can have both high electrical conductivity and excellent mechanical strength. Dry compounding means that the superfine fibrous carbon and the spherical carbon are pulverized, dispersed and thereby compounded by means of a dry mill, etc.

Wet compounding means that the superfine fibrous carbon and the spherical carbon are pulverized, dispersed, and thereby compounded in an organic solvent, etc. by means of a wet mill, etc.

Assuming that the density of the composite of the present invention and the density of the ultrafine fibrous carbons are substantially identical, the composite of the present invention preferably has a volume resistivity ranging from nearly the same as that of the ultrafine fibrous carbons to 50 times, and more preferably has a volume resistivity of 30 times or less, still more preferably 10 times or less. The volume resistivity (unit: $\Omega \cdot cm$) as used herein means the resistance per unit area and is used as a measure of electrical conductivity. That is, a lower value of the volume resistivity (unit: $\Omega \cdot cm$) indicates better electrical conductivity.

Assuming that the density of the composite of the present invention and the density of the spherical carbon are substantially identical, the composite of the present invention preferably has a volume resistivity ranging from nearly the same as that of the spherical carbon to $1/100$ times.

In composite of the present invention, the mass ratio between the ultrafine fibrous carbons and the spherical carbon is preferably from 1:9 to 5:5. In the composite of the present invention, when the mass ratio of the ultrafine fibrous carbons is decreased, the volume resistivity of the composite of the present invention approaches the volume resistivity of the spherical carbon, and therefore the mass ratio between the ultrafine fibrous carbons and the spherical carbon is more preferably from 4:6 to 5:5, still more preferably 5:5.

The ultrafine fibrous carbons contained in the composite of the present invention is not particularly limited as long as the object of the present invention is achieved and furthermore, the effects of the present invention are produced, but the ultrafine fibrous carbons is preferably easily-graphitizable carbon. The easily-graphitizable carbon is a raw carbon material in which a graphite structure having a three-dimensional lamination regularity is readily produced by heat treatment at a high temperature of 2,500° C. or more, and is also called soft carbon, etc. The easily-graphitizable carbon includes petroleum coke, coal pitch coke, polyvinyl chloride, 3,5-dimethylphenolformaldehyde resin, etc.

Above all, a compound capable of forming an optically anisotropic phase (liquid crystal phase) in a molten state, which is called a mesophase pitch, or a mixture thereof is preferred, because high crystallinity and high electrical conductivity are expected. The mesophase pitch includes, for example, a petroleum-based mesophase pitch obtained from a petroleum residue oil by a method based on hydrogenation and heat treatment or by a method based on hydrogenation, heat treatment and solvent extraction; a coal-based mesophase pitch obtained from a coal tar pitch by a method based on hydrogenation and heat treatment or by a method based on hydrogenation, heat treatment and solvent extraction; and a synthetic liquid crystal pitch obtained by polycondensation in the presence of a super strong acid (e.g., HF, BF3) by using, as a raw material, an aromatic hydrocarbon such as naphthalene, alkylnaphthalene and anthracene. Among these, a synthetic liquid crystal pitch is preferred in view of not containing impurities.

(Average Fiber Diameter)

The average fiber diameter of the ultrafine fibrous carbons for use in the present invention is from more than 200 nm to 900 nm. This average fiber diameter is a value measured from a photographic view taken at a magnification of 2,000 times by a field emission scanning electron microscope. The average fiber diameter of the ultrafine fibrous carbons is preferably from more than 230 nm to 600 nm, more preferably from more than 250 nm to 500 nm, still more preferably from more than 250 nm to 400 nm.

The ultrafine fibrous carbons for use in the present invention have a linear structure. The linear structure as used herein means that the branching degree is 0.01 branch/μm or less. The branching indicates a granular part formed by bonding of ultrafine fibrous carbons to another ultrafine fibrous carbons at a position other than the terminal part and indicates that the primary axis of the ultrafine fibrous carbons is diverged in midstream and the primary axis of the ultrafine fibrous carbons has a branching secondary axis.
(Average Fiber Length)

The average fiber length of the ultrafine fibrous carbons for use in the present invention may be from 1 to 100 μm. In the composite of the present invention, in view of electrical conductivity, mechanical strength and dispersibility, the average fiber length of the ultrafine fibrous carbons is preferably from more than 10 μm to 50 μm or from 1 to 10 μm. This is because, if the average fiber length of the ultrafine fibrous carbons for use in the present invention exceeds 100 μm, dispersibility of the ultrafine fibrous carbons may be impaired. In the description of the present invention, the ultrafine fibrous carbons is sometimes referred to as CNF, and the ultrafine fibrous carbons having a short average fiber length, for example, ultrafine fibrous carbons having an average fiber length of 1 to 15 μm, is sometimes referred to as S-CNF.
(Average Interplanar Spacing)

In the ultrafine fibrous carbons for use in the present invention, it is more preferred that the average interplanar spacing d(002) of (002) plane as measured by an X-ray diffraction method is from 0.335 to 0.340 nm.

Figure 15:
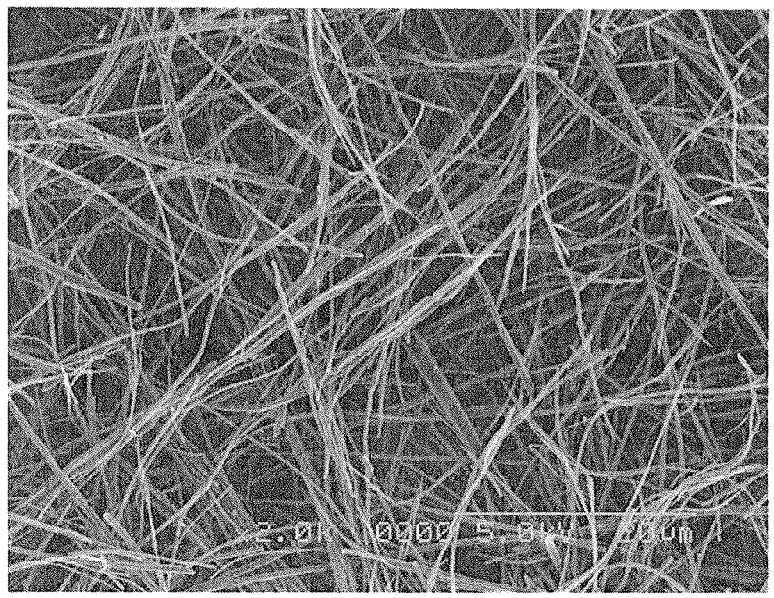
FIG. 15 is a scanning electron microscope image (2,000 times magnification) of ultrafine fibrous carbons.

Here, FIG. 15 shows a scanning electron micrograph (2,000 times magnification) of a representative ultrafine fibrous carbons for use in the present invention. As evident from FIG. 15, it is confirmed that the ultrafine fibrous carbons for use in the present invention has a linear structure and the average fiber length is from 1 to 100 μm.

The ultrafine fibrous carbons (CNF or S-CNF) for use in the present invention is produced by a known production method. For example, the ultrafine fibrous carbons (CNF or S-CNF) can be produced by the production method described in JP2010-13742A or JP2010-31439A.

The spherical carbon for use in the present invention is preferably carbon black. The carbon black includes, for example, acetylene black, furnace black, channel black, and thermal black and is preferably acetylene black.
[Electroconductive Agent]

The carbon-based electroconductive agent of the present invention is a carbon-based electroconductive agent containing the composite of the present invention. The carbon-based electroconductive agent of the present invention contains the composite of the present invention and may further contain a material other than the composite of the present invention, for example, a carbon-based material, as long as the electrical conductivity of the electrode active material can be enhanced.
[Electrode Active Material Layer]

The electrode active material layer of the present invention is composed of the later-described electrode material for a non-aqueous electrolyte secondary battery.

The electrode material for a non-aqueous electrolyte secondary battery, which is used for forming the electrode active material layer of the present invention, is an electrode material for a non-aqueous electrolyte secondary battery, containing at least the carbon-based electroconductive agent of the present invention, an electrode active material, and a binder.

The electrode active material (positive electrode active material, negative electrode active material) contained in the electrode material for a non-aqueous electrolyte secondary battery according to the present invention is described below.
(Positive Electrode Active Material)

As the positive electrode active material contained in the electrode material for a non-aqueous electrolyte secondary battery of the present invention, any one member or two or more members appropriately selected from the materials conventionally known as the positive electrode active material in a non-aqueous electrolyte secondary battery may be used. For example, in the case of a lithium ion secondary battery, a lithium-containing metal oxide capable of storing/releasing lithium ion is suitable. The lithium-containing metal oxide includes a composite oxide containing lithium and at least one element selected from the group consisting of Co, Mg, Mn, Ni, Fe, Al, Mo, V, W, Ti, etc.

Specifically, the composite oxide includes at least one member selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ (wherein x=from 0.02 to 1.2, a=from 0.1 to 0.9, b=from 0.8 to 0.98, c=from 1.6 to 1.96, and z=from 2.01 to 2.3), etc. Preferable lithium-containing metal oxides include at least one member selected from the group consisting of $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (where x, a, b and z are the same as above). Incidentally, the value of x is a value before start of charging/discharging and is increased/decreased by charging/discharging.

As for the positive electrode active material above, one material may be used alone, or two or more materials may be used in combination. The average particle diameter of the positive electrode active material is 10 μm or less. If the average particle diameter exceeds 10 μm, the efficiency of charge/discharge reaction decreases under a large current. The average particle diameter is preferably from 0.05 μm (50 nm) to 7 μm, more preferably from 1 to 7 μm.
(Negative Electrode Active Material)

As the negative electrode active material contained in the electrode material for a non-aqueous electrolyte secondary battery of the present invention, one member or two or more members selected from the materials conventionally known as the negative electrode active material in a non-aqueous electrolyte secondary battery may be used. For example, in the case of a lithium ion secondary battery, a carbon material capable of storing/releasing lithium ion, either Si or Sn, an alloy or oxide containing at least either one thereof, etc. may be used. Among these, a carbon material is preferred.

Representative examples of the carbon material include natural graphite, artificial graphite produced by heat-treating petroleum-based and coal-based cokes, hard carbon in which a resin is carbonized, and a mesophase pitch-based carbon material. In the case of using natural graphite or artificial graphite, from the standpoint of increasing the battery capacity, those having a graphite structure in which the interplanar spacing d(002) of (002) plane is from 0.335 to 0.337 nm as measured by powder X-ray diffraction are preferred.

The natural graphite means a graphitic material naturally produced as an ore. The natural graphite is classified, by its appearance and nature, into two types, i.e., scaly graphite having a high degree of crystallization and amorphous graphite having a low degree of crystallization. The scaly graphite is further classified into flaky graphite taking on a leaf-like appearance and scaly graphite taking on a block-like appearance. The natural graphite working out to a graphitic material is not particularly limited in its locality, nature, and kind. In addition, natural graphite or a particle produced using natural graphite as a raw material may be heat-treated before use.

The artificial graphite means graphite produced by a wide range of artificial techniques or a graphitic material close to a perfect graphite crystal. Representative examples thereof include those produced through a calcination step at approximately from 500 to 1,000° C. and a graphitization step at 2,000° C. or more by using, as a raw material, tar or coke obtained from a residue, etc. after coal carbonization or crude oil distillation. In addition, Kish graphite obtained by reprecipitating carbon from molten iron is also a kind of artificial graphite.

Other than the carbon material, when an alloy containing at least either one of Si and Sn is used as the negative electrode active material, this is effective in that the electric capacity can be reduced, compared with a case of using Si or Sn as an elemental substance or using an oxide thereof. Particularly an Si-based alloy is preferred.

The Si-based alloy includes, for example, an alloy of Si and at least one element selected from the group consisting of B, Mg, Ca, Ti, Fe, Co, Mo, Cr, V, W, Ni, Mn, Zn, Cu, etc. Specifically, the alloy includes at least one member selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$, $ZnSi_2$, etc.

In the present invention, as the negative electrode active material, one of the above-described materials may be used alone, or two or more thereof may be used in combination. The average particle diameter of the negative electrode active material is 10 μm or less. If the average particle diameter exceeds 10 μm, the efficiency of charge/discharge reaction decreases under a large current. The average particle diameter is preferably from 0.1 to 10 μm, more preferably from 1 to 7 μm.

(Binder)

As for the binder contained in the non-aqueous electrolyte secondary battery of the present invention, a binder enabling electrode molding and having sufficient electrochemical stability can be suitably used. As such a binder, one or more members selected from the group consisting of polyvinyl alcohol, polyacrylic acid, carboxymethyl cellulose, polytetrafluoroethylene (PTFE), polyvinylidene fluoride (PVDF), synthetic butadiene rubber (SBR), a fluoroolefin copolymer crosslinked polymer, polyimide, petroleum pitch, coal pitch, a phenol resin, etc. are preferably used, and polyvinylidene fluoride (PVDF) is more preferred.

The form at the time of use as a binder is not particularly limited and may be a solid form or a liquid form (e.g., emulsion form), and the form can be appropriately selected by taking into account, for example, the production method (in particular, whether dry kneading or wet kneading) of electrode and the solubility in electrolytic solution.

The solvent for dissolving the binder is not particularly limited as long as it dissolves the binder. Specifically, the solvent includes, for example, one or more kinds of solvents selected from the group consisting of N-methylpyrrolidone (NMP), dimethylacetamide (DMAc), dimethylformamide (DMF), dimethylsulfoxide (DMSO), etc. Particularly NMP or DMAc is preferred.

[Electrode for Non-Aqueous Electrolyte Secondary Battery]

The electrode for a non-aqueous electrolyte secondary battery of the present invention is an electrode for a non-aqueous electrolyte secondary battery, having a collector and an active material layer on the collector, wherein the active material layer is composed of the electrode material for a non-aqueous electrolyte secondary battery of the present invention.

As the method for manufacturing an electrode of a non-aqueous electrolyte secondary battery, the following two techniques are employed in general. One method is a method where an electrode active material, an electroconductive agent and a binder are mixed/kneaded and shaped into a film by extrusion molding and the film is rolled, stretched and then laminated together with a collector. Another method is a method where an electrode active material, an electroconductive agent, a binder and a solvent for dissolving the binder are mixed to prepare a slurry and the slurry is coated on a substrate and after removing the solvent, pressed.

In the present invention, either method may be used, but since the latter method is preferred, the latter method is described in detail below.

In the manufacture of the electrode of the present invention, the ratio of the electroconductive agent added in the slurry is 10 mass % or less relative to the electrode material composed of the electrode active material, the electroconductive agent and the binder. The adding ratio is preferably 7 mass % or less, more preferably 5 mass % or less. If the ratio of the electroconductive agent added exceeds 10 mass %, when fabricating a cell having any capacity, the amount of the active material in the electrode is reduced, leading to difficulty of application to power source usage where high importance is attached to the energy density.

In the present invention, the ratio of the binder added is from 1 to 25 mass % relative to the electrode material composed of the electrode active material, the electroconductive agent and the binder. The adding ratio is preferably from 3 to 20 mass %, more preferably from 5 to 20 mass %. If the amount of the binder is less than 1 mass %, generation of cracking or separation of the electrode from the collector may occur. If the amount of the binder exceeds 25 mass %, when fabricating a cell having any capacity, the amount of the active material in the electrode is reduced, leading to difficulty of application to power source usage where high importance is attached to the energy density.

At the time of manufacture of the electrode, because of poor dispersion state in the slurry, it is sometimes difficult to ensure fluidity suitable for coating. In such a case, a slurrying aid may be used. The slurrying aid includes, for example, one or more members selected from the group consisting of polyvinylpyrrolidone, carboxymethyl cellulose, polyvinyl acetate, polyvinyl alcohol, etc. Particularly use of polyvinylpyrrolidone is preferred. By adding the above-described slurrying aid, sufficient fluidity can be ensured even with a relatively small amount of a solvent, and the dispersibility of pulverized active carbon is also dramatically enhanced. In addition, generation of cracking after the removal of solvent can be reduced. The amount of the slurrying aid added is preferably 10 mass % or less, more preferably from 0.5 to 10 mass %, still more preferably from 0.5 to 8 mass %, based on the total of components in the slurry other than the solvent. If the amount of the slurrying agent added exceeds 10 mass %, conversely, the slurry viscosity may decrease rapidly to cause a dispersion failure, making it difficult to manufacture a suitable slurry. If the value above is less than 0.5 mass %, the effect of the slurrying aid is not brought out.

The solid content concentration in the slurry (the ratio of the total weight of the slurry components other than the solvent to the total mass of the slurry) is preferably from 10 to 50 mass %, more preferably from 15 to 40 mass %. If the solid content concentration exceeds 50 mass %, it may be difficult to manufacture a uniform slurry. If this value is less than 10 mass %, the slurry viscosity may be decreased too much, resulting in uneven thickness of the electrode.

For coating the slurry, for example, an appropriate coating method such as doctor blade may be employed. After the coating, the solvent is removed by a treatment, for example, at 60 to 150° C., preferably from 75 to 85° C., for preferably from 60 to 180 minutes. Thereafter, the coated material after the removal of solvent is pressed, whereby an active material layer can be produced.

In the electrode for a non-aqueous electrolyte secondary battery of the present invention, the thickness of the active material layer is suitably from 5 to 300 µm. If the thickness of the active material layer is less than 5 µm, when fabricating a cell having any capacity, a separator or a collector needs to be used in a large amount, leading to a decrease in the volume occupancy of the active material layer in the cell, and not only this is disadvantageous in view of energy density but also the usage is considerably limited. In particular, although output characteristics (including low-temperature characteristics) are important, application to power source usage where high importance is attached to energy density becomes difficult.

On the other hand, production of an electrode where the electrode thickness exceeds 300 µm is relatively difficult due to problem of crack generation. Therefore, the electrode thickness is in general preferably 300 µm or less in view of stable production of the electrode. In order to more stably produce the electrode, the electrode thickness is more preferably 200 µm or less and for the purpose of elevating the productivity of electrode or the output characteristics of capacitor, the electrode thickness is still more preferably from 10 to 100 µm.

The electrode for a non-aqueous electrolyte secondary battery according to the present invention, which is manufactured as above, preferably has no anisotropy of electrode strength. In the electrode having no anisotropy of electrode strength, from which the collector is removed, i.e., in the electrode material according to the present invention, the ratio $\sigma M/\sigma T$ between the tensile strength $\sigma M$ in the coating direction for coating the electrode material and the in-plane tensile strength $\sigma_T$ in the direction perpendicular to the direction of the coating direction is preferably 1.6 or less. The ratio $\sigma M/\sigma T$ is more preferably 1.2 or less, still more preferably from 0.9 to 1.1.

The electrode for a non-aqueous electrolyte secondary battery according to the present invention, which is manufactured as above, preferably has anisotropy of electrode strength. In the electrode having anisotropy of electrode strength, from which the collector is removed, i.e., in the electrode material according to the present invention, the ratio $\sigma M/\sigma T$ between the tensile strength $\sigma M$ in the coating direction for coating the electrode material and the in-plane tensile strength $\sigma_T$ in the direction perpendicular to the direction of the coating direction is preferably more than 1.6. The ratio $\sigma M/\sigma T$ is more preferably 1.7 or more, still more preferably 1.8 or more.

The collector of the electrode for a non-aqueous electrolyte secondary battery according to the present invention may be formed of any electrically conductive material. Accordingly, the collector can be formed of, for example, a metal material such as aluminum, nickel, iron, stainless steel, titanium and copper, particularly aluminum, stainless steel or copper.

[Non-Aqueous Electrolyte Secondary Battery]

The non-aqueous electrolyte secondary battery of the present invention is a non-aqueous secondary battery containing the electrode for a non-aqueous electrolyte secondary battery of the present invention.

The non-aqueous electrolyte secondary battery according to the present invention includes, for example, a lithium ion secondary battery, a lithium battery, and a lithium ion polymer battery but is preferably a lithium ion secondary battery. In the non-aqueous electrolyte secondary battery of the present invention, a positive electrode obtained by forming a positive electrode material layer on a surface of a collector, an electrolyte layer containing an electrolyte, and the negative electrode for a non-aqueous electrolyte secondary battery of the present invention may be stacked such that the positive electrode material layer and the negative electrode material layer of the negative electrode according to the present invention face each other and the electrolyte layer is inserted between the positive electrode material layer and the negative electrode material layer according to the present invention.

Alternatively, in the non-aqueous electrolyte secondary battery of the present invention, the positive electrode for a non-aqueous electrolyte secondary battery of the present invention, an electrolyte layer containing an electrolyte, and a negative electrode obtained by forming a negative electrode material layer on a surface of a collector may be stacked such that the positive electrode material layer of the positive electrode according to the present invention and the negative electrode material layer of the negative electrode face each other and the electrolyte layer is inserted between the positive electrode material layer of the positive electrode according to the present invention and the negative electrode material layer of the negative electrode. Furthermore, in the non-aqueous electrolyte secondary battery of the present invention, the positive electrode for a non-aqueous electrolyte secondary battery of the present invention, an electrolyte layer containing an electrolyte, and the negative electrode for a non-aqueous electrolyte secondary battery of the present invention may be stacked such that the positive electrode material layer of the positive electrode according to the present invention and the negative electrode material layer of the negative electrode according to the present invention face each other and the electrolyte layer is inserted between the positive electrode material layer of the positive electrode according to the present invention and the negative electrode material layer of the negative electrode according to the present invention.

The electrolyte layer for the non-aqueous electrolyte secondary battery of the present invention is not limited as long as the object and effects of the present invention are not impaired. Accordingly, as the electrolyte layer, for example, a liquid electrolyte, i.e., a solution prepared, for example, by dissolving a lithium salt in an organic solvent, may be used. However, in the case of using such a liquid electrolyte, a separator composed of a porous layer is preferably used in general so as to prevent direct contact between the positive electrode active material layer and the negative electrode active material layer.

As the organic solvent for the liquid electrolyte, for example, ethylene carbonate (EC), diethyl carbonate (DEC), propylene carbonate (PC), dimethyl carbonate (DMC), and ethyl methyl carbonate (EMC) may be used. One of these organic solvents may be used alone, or two or more thereof may be used in combination. As the lithium salt for the liquid electrolyte, for example, $LiPF_6$, $LiClO_4$, $LiN(CF_3SO_2)_2$, and $LiBF_4$ can be used. One of these lithium salts may be used alone, or two or more thereof may be used in combination.

Incidentally, a solid electrolyte may also be used for the electrolyte layer and in this case, a separate spacer can be omitted.

<Third Aspect of the Present Invention>

The present invention is described below.

The ultrafine fibrous carbons of the present invention is ultrafine fibrous carbons having a linear structure, wherein at least a part of the surface of the ultrafine fibrous carbons is modified with a surfactant and/or at least a part of the surface of the ultrafine fibrous carbons is oxidatively treated (embodiment 1). The ultrafine fibrous carbons of the present invention has excellent water dispersibility due to a configuration where at least a part of the surface of the ultrafine fibrous carbons is modified with a surfactant, at least a part of the surface of the ultrafine fibrous carbons is oxidatively treated, or at least a part of the surface of the ultrafine fibrous carbons is modified with a surfactant and oxidatively treated.

In embodiment 1, the ultrafine fibrous carbons of the present invention is ultrafine fibrous carbons that is disintegrated (embodiment 2). According to embodiment 2, the ultrafine fibrous carbons of the present invention is disintegrated, whereby the water dispersibility of the ultrafine fibrous carbons is more enhanced.

In embodiment 2, the ultrafine fibrous carbons of the present invention is ultrafine fibrous carbons that is disintegrated by a dry pulverizer and/or a wet pulverizer (embodiment 3). According to embodiment 3, the ultrafine fibrous carbons of the present invention is disintegrated by a dry pulverizer and/or a wet pulverizer, whereby the water dispersibility of the ultrafine fibrous carbons is more enhanced.

In any one embodiment of embodiments 1 to 3, the ultrafine fibrous carbons of the present invention is ultrafine fibrous carbons where the aspect ratio is from 1 to 1,000 (embodiment 4).

The ultrafine-fibrous-carbon aggregates of the present invention is ultrafine-fibrous-carbon aggregates obtained by aggregating the ultrafine fibrous carbons according to any one embodiment of embodiments 1 to 4 (embodiment 5). According to embodiment 5, the ultrafine-fibrous-carbon aggregates of the present invention has excellent water dispersibility.

The carbon-based electroconductive agent of the present invention is a carbon-based electroconductive agent containing the ultrafine fibrous carbons according to any one embodiment of embodiments 1 to 4 and/or the ultrafine-fibrous-carbon aggregates according to embodiment 5 (embodiment 6). According to embodiment 6, the carbon-based electroconductive agent of the present invention has excellent electrical conductivity, i.e., high electrical conductivity.

The electrode material for a non-aqueous electrolyte secondary battery of the present invention is an electrode material for a non-aqueous electrolyte secondary battery, containing at least the carbon-based electroconductive agent according to embodiment 6, an electrode active material, and a binder (embodiment 7). According to embodiment 7, the electrode material for a non-aqueous electrolyte secondary battery of the present invention has high electrical conductivity.

In embodiment 7, the electrode material for a non-aqueous electrolyte secondary battery of the present invention is an electrode material for a non-aqueous electrolyte secondary battery, which further contains water as a solvent (embodiment 8). According to embodiment 8, the water dispersibility of the ultrafine fibrous carbons and/or ultrafine-fibrous-carbon aggregates is further improved, and the electrode material for a non-aqueous electrolyte secondary battery of the present invention has higher electrical conductivity.

The electrode for a non-aqueous electrolyte secondary battery of the present invention is an electrode for a non-aqueous electrolyte secondary battery, having a collector and an active material layer on the collector, wherein the active material layer is composed of the electrode material for a non-aqueous electrolyte secondary battery according to embodiment 7 or 8 (embodiment 9). According to embodiment 9, the electrode for a non-aqueous electrolyte secondary battery of the present invention has high electrical conductivity.

The non-aqueous electrolyte secondary battery of the present invention is a non-aqueous electrolyte secondary battery containing the electrode for a non-aqueous electrolyte secondary battery according to embodiment 9 (embodiment 10). The water dispersibility of the ultrafine fibrous carbons and/or ultrafine-fibrous-carbon aggregates is improved, whereby the non-aqueous electrolyte secondary battery of the present invention has excellent cycle characteristics and high capacity.

The ultrafine fibrous carbons of the present invention may be ultrafine fibrous carbons where at least two embodiments out of embodiments 1 to 4 are arbitrarily combined. The ultrafine-fibrous-carbon aggregates of the present invention may be ultrafine-fibrous-carbon aggregates obtained by aggregating ultrafine fibrous carbons where at least two embodiments out of embodiments 1 to 4 are arbitrarily combined. The carbon-based electroconductive agent of the present invention may contain this ultrafine fibrous carbons and/or ultrafine-fibrous-carbon aggregate, the electrode material for a non-aqueous electrolyte secondary battery of the present invention may contain this carbon electroconductive agent, the electrode for a non-aqueous electrolyte secondary battery of the present invention may contain this electrode material for a non-aqueous electrolyte secondary battery, and the non-aqueous electrolyte secondary battery of the present invention may contain this electrode for a non-aqueous electrolyte secondary battery.

The present invention is described in more detail below.

[Ultrafine Fibrous Carbon]

The ultrafine fibrous carbons of the present invention is ultrafine fibrous carbons having a linear structure, wherein at least a part of the surface of the ultrafine fibrous carbons is modified with a surfactant and/or at least a part of the surface of the ultrafine fibrous carbons is oxidatively treated. The linear structure as used herein means that the branching degree is 0.01 branch/µm or less. The branching indicates a granular part formed by bonding of ultrafine fibrous carbons to another ultrafine fibrous carbons at a position other than the terminal part and indicates that the primary axis of the ultrafine fibrous carbons is diverged in midstream and the primary axis of the ultrafine fibrous carbons has a branching secondary axis.

The ultrafine fibrous carbons of the present invention has excellent water dispersibility due to a configuration where a part or the entirety of the surface of the ultrafine fibrous carbons is modified with a surfactant. In addition, the ultrafine fibrous carbons of the present invention has excellent water dispersibility due to a configuration where a part or the entirety of the surface of the ultrafine fibrous carbons is oxidatively treated. A part of the surface of the ultrafine fibrous carbons includes, for example, the surface at an edge of the ultrafine fibrous carbon. The water dispersibility means the degree of dispersion, i.e., dispersibility, of the ultrafine fibrous carbons in an aqueous solution or water (e.g., ion-exchanged water).

Modifying at least a part of the surface of the ultrafine fibrous carbons with a surfactant means to cause chemical modification, physical modification, or chemical modification and further physical modification, between the ultrafine fibrous carbons and a surfactant. Chemical modification means that the ultrafine fibrous carbons and a surfactant undergo a chemical reaction and are thereby chemically bonded, and means, for example, that a functional group of the ultrafine fibrous carbons and a functional group of the surfactant are covalently bonded. Physical modification means not chemical bonding but physical bonding and means, for example, that a surfactant is adsorbed or adhered to the ultrafine fibrous carbon.

The surfactant for modifying the ultrafine fibrous carbons of the present invention includes, for example, an anionic surfactant (e.g., sodium carboxymethyl cellulose (CMC-Na), sodium fatty acid, sodium alkylbenzenesulfonate), an cationic surfactant (e.g., alkyltrimethylammonium salt, dialkyldimethylammonium salt), an amphoteric surfactant (e.g., alkyldimethylamine oxide, alkylcarboxybetaine), and a nonionic surfactant (e.g., polyoxyethylene alkyl ether, fatty acid diethanolamide), with sodium carboxymethyl cellulose (CMC-Na) being preferred.

The mass ratio between the ultrafine fibrous carbons and the surfactant for modifying the ultrafine fibrous carbons is not particularly limited as long as the object of the present invention is achieved and furthermore, the effects of the present invention are produced, but the mass ratio is preferably 5:6.

The method for modifying at least a part of the surface of the ultrafine-fibrous-carbon fibers with a surfactant is not particularly limited, but preferable methods include a method of mixing the ultrafine-fibrous-carbon fibers and a surfactant in an "electrode-forming solution", and a method where the ultrafine fibrous carbons is dispersed in an organic solvent allowing for good dispersibility of the ultrafine fibrous carbon, a surfactant or a solution having dissolved therein a surfactant is added to the solution obtained above, and the solvent is then removed by heating, etc. Particularly the latter method is more preferred, because a surfactant can modify the ultrafine fibrous carbons in a dispersed state, and therefore surfactant-modified ultrafine-fibrous-carbon fibers that is less likely to cause agglomeration of the ultrafine fibrous carbons at the time of manufacture of the electrode is obtained.

The organic solvent allowing for good dispersibility of the ultrafine-fibrous-carbon fibers is not particularly limited as long as the ultrafine-fibrous-carbon fibers is successfully dispersed, but the organic solvent includes an organic solvent having high affinity for a carbon material. The organic solvent having high affinity for a carbon material includes alcohols, esters, amides, ethers, etc., and in view of high affinity, amides are preferred.

In the case of removing the solvent after the modification with a surfactant, the organic solvent allowing for good dispersibility of the ultrafine-fibrous-carbon fibers is preferably less volatile than the solvent for dissolving the surfactant, because at the time of heating and concentrating the solvent, the organic solvent allowing for good dispersibility of the ultrafine-fibrous-carbon fibers can be kept at a high concentration and the dispersibility of the ultrafine-fibrous-carbon fibers can be maintained.

The solvent for dissolving the surfactant is not particularly limited as long as it is a solvent capable of dissolving the surfactant and having compatibility with the "organic solvent allowing for good dispersibility of the ultrafine-fibrous-carbon fibers", but preferred examples thereof include an alcohol and water.

In the case where the solvent for dissolving the surfactant is water, for example, NMP or pyridine is preferably used as the organic solvent allowing for good dispersibility of the ultrafine-fibrous-carbon fibers, because at the time of heating and concentrating the solvent, the organic solvent allowing for good dispersibility of the ultrafine-fibrous-carbon fibers can be kept at a high concentration and the dispersibility of the ultrafine-fibrous-carbon fibers can be maintained.

Specific examples of the oxidative treatment applied to at least a part of the surface of the ultrafine fibrous carbons include an oxidative treatment with peroxide ($H_2O_2$), an oxidative treatment with ozone, an oxidative treatment by UV irradiation, an oxidative treatment in air, and an oxidative treatment with an acid such as mixed acid. From the standpoint that an ionic carboxyl group is produced on the surface of the ultrafine fibrous carbons of the present invention by an oxidative treatment with peroxide ($H_2O_2$) and the crystal structure of the ultrafine fibrous carbons is less damaged, an oxidative treatment with peroxide ($H_2O_2$) is preferred.

In view of enhancing water dispersibility, the ultrafine fibrous carbons of the present invention is preferably ultrafine fibrous carbons that is disintegrated, more preferably ultrafine fibrous carbons that is disintegrated by a dry pulverizer and/or a wet pulverizer, still more preferably ultrafine fibrous carbons that is disintegrated by a dry jet mill as one example of the dry pulverizer and/or a wet jet mill as one example of the wet pulverizer, because more improvement of the water dispersibility can be achieved. Furthermore, the ultrafine fibrous carbons of the present invention may be ultrafine fibrous carbons that is pulverized by a dry mill or a wet mill. The pulverization means that the ultrafine fibrous carbons is disintegrated and crushed (shortening of length of the ultrafine fibrous carbon).

The ultrafine fibrous carbons of the present invention is preferably ultrafine fibrous carbons where the aspect ratio is from 1 to 1,000, more preferably ultrafine fibrous carbons where the aspect ratio is from 5 to 500, still more preferably ultrafine fibrous carbons where the aspect ratio is from 10 to 100.

The ultrafine fibrous carbons of the present invention is not particularly limited as long as the object of the present invention is achieved and furthermore, the effects of the present invention are produced, but the ultrafine fibrous carbons is preferably easily-graphitizable carbon. The easily-graphitizable carbon is a raw carbon material in which a graphite structure having a three-dimensional lamination regularity is readily produced by heat treatment at a high temperature of 2,500° C. or more, and is also called soft carbon, etc. The easily-graphitizable carbon includes petroleum coke, coal pitch coke, polyvinyl chloride, 3,5-dimethylphenolformaldehyde resin, etc.

Above all, a compound capable of forming an optically anisotropic phase (liquid crystal phase) in a molten state, which is called a mesophase pitch, or a mixture thereof is preferred, because high crystallinity and high electrical conductivity are expected. The mesophase pitch includes, for example, a petroleum-based mesophase pitch obtained from a petroleum residue oil by a method based on hydrogenation and heat treatment or by a method based on hydrogenation, heat treatment and solvent extraction; a coal-based mesophase pitch obtained from a coal tar pitch by a method based on hydrogenation and heat treatment or by a method based on hydrogenation, heat treatment and solvent extraction; and a synthetic liquid crystal pitch obtained by polycondensation in the presence of a super strong acid (e.g., HF, $BF_3$) by using, as a raw material, an aromatic hydrocarbon such as naphthalene, alkylnaphthalene and anthracene. Among these, a synthetic liquid crystal pitch is preferred in view of not containing impurities.

(Average Fiber Diameter)

The average fiber diameter of the ultrafine fibrous carbons of the present invention is preferably from more than 200 nm to 900 nm. This average fiber diameter is a value measured from a photographic view taken at a magnification of 2,000 times by a field emission scanning electron microscope. The average fiber diameter of the ultrafine fibrous carbons is more preferably from more than 230 nm to 600 nm, still more preferably from more than 250 nm to 500 nm, yet still more preferably from more than 250 nm to 400 nm.

(Average Fiber Length)

The average fiber length of the ultrafine fibrous carbons of the present invention is preferably from 1 to 100 μm. In the ultrafine fibrous carbons of the present invention, in view of water dispersibility and electrical conductivity, the average fiber length of the ultrafine fibrous carbons is preferably from more than 10 μm to 50 μm or from 1 to 10 μm. In addition, ultrafine fibrous carbons having an average fiber length of 1 to 10 μm and ultrafine fibrous carbons having an average fiber length of more than 10 μm to 50 μm may be contained in any ratio in the ultrafine-fibrous-carbon aggregates of the present invention. Because if the average fiber length of the ultrafine fibrous carbons of the present invention exceeds 100 μm, water dispersibility of the ultrafine fibrous carbons or ultrafine-fibrous-carbon aggregates may be impaired. In the description of the present invention, the ultrafine fibrous carbons is sometimes referred to as CNF, and the ultrafine fibrous carbons having a short average fiber length, for example, ultrafine fibrous carbons having an average fiber length of 1 to 10 μm, is sometimes referred to as S-CNF.

(Average Interplanar Spacing)

The average interplanar spacing of the ultrafine fibrous carbons for use in the present invention is not particularly limited as long as the object of the present invention is achieved and furthermore, the effects of the present invention are produced, but the average interplanar spacing d(002) of (002) plane as measured by an X-ray diffraction method is preferably from 0.335 to 0.340 nm.

Figure 26:
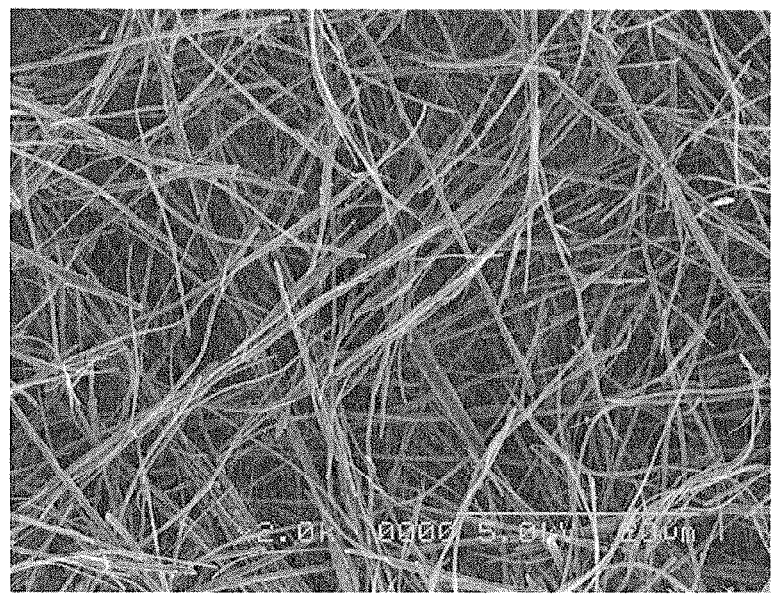
FIG. 26 is a scanning electron microscope image (2,000 times magnification) of ultrafine fibrous carbons.

Here, FIG. 26 shows a scanning electron micrograph (2,000 times magnification) of a representative ultrafine fibrous carbons of the present invention. As evident from FIG. 26, it is confirmed that the ultrafine fibrous carbons for use in the present invention has a linear structure and the average fiber length is from 1 to 100 μm.

The ultrafine fibrous carbons (CNF or S-CNF) of the present invention is produced by a known production method. For example, the ultrafine fibrous carbons (CNF or S-CNF) can be produced by the production method described in JP2010-13742A, JP2010-31439A, etc.

[Ultrafine-Fibrous-Carbon Aggregates]

The ultrafine-fibrous-carbon aggregates of the present invention are ultrafine-fibrous-carbon aggregates obtained by aggregating the ultrafine fibrous carbons of the present invention. The ultrafine-fibrous-carbon aggregates of the present invention are composed by aggregation of the ultrafine fibrous carbons of the present invention, and therefore have excellent water dispersibility.

[Electroconductive Agent]

The carbon-based electroconductive agent of the present invention is a carbon-based electroconductive agent containing the ultrafine fibrous carbons and/or ultrafine-fibrous-carbon aggregates of the present invention. The carbon-based electroconductive agent of the present invention has excellent electrical conductivity, i.e., high electrical conductivity, by virtue of containing the ultrafine fibrous carbons and/or ultrafine-fibrous-carbon aggregates of the present invention. The carbon-based electroconductive agent of the present invention contains the ultrafine fibrous carbons and/or ultrafine-fibrous-carbon aggregates of the present invention and as long as the electrical conductivity can be enhanced, may further contain a material other than the ultrafine fibrous carbons and/or ultrafine-fibrous-carbon aggregates of the present invention, for example, a carbon-based material.

[Electrode Material for Non-Aqueous Electrolyte Secondary Battery]

The electrode material for a non-aqueous electrolyte secondary battery of the present invention is an electrode material for a non-aqueous electrolyte secondary battery, containing at least the carbon-based electroconductive agent of the present invention, an electrode active material, and a binder. The electrode material for a non-aqueous electrolyte secondary battery of the present invention has excellent electrical conductivity, i.e., high electrical conductivity, by virtue of containing the carbon-based electroconductive agent of the present invention.

The electrode material for a non-aqueous electrolyte secondary battery of the present invention preferably further contains water as a solvent. Water as the solvent includes, for example, ion-exchanged water. By further containing water as a solvent, the water dispersibility of the ultrafine fibrous carbons and/or ultrafine-fibrous-carbon aggregates of the present invention is more improved, and the electrode material for a non-aqueous electrolyte secondary battery of the present invention has higher electrical conductivity.

The electrode active material (positive electrode active material, negative electrode active material) contained in the electrode material for a non-aqueous electrolyte secondary battery of the present invention is described below.

(Positive Electrode Active Material)

As the positive electrode active material contained in the electrode material for a non-aqueous electrolyte secondary battery of the present invention, any one member or two or more members appropriately selected from the materials conventionally known as the positive electrode active material in a non-aqueous electrolyte secondary battery may be used. For example, in the case of a lithium ion secondary battery, a lithium-containing metal oxide capable of storing/releasing lithium ion is suitable. The lithium-containing metal oxide includes a composite oxide containing lithium and at least one element selected from the group consisting of Co, Mg, Mn, Ni, Fe, Al, Mo, V, W, Ti, etc.

Specifically, the composite oxide includes at least one member selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ (wherein x=from 0.02 to 1.2, a=from 0.1 to 0.9, b=from 0.8 to 0.98, c=from 1.6 to 1.96, and z=from 2.01 to 2.3), etc. Preferable lithium-containing metal oxides include at least one member selected from the group consisting of $Li_xCoO_2$, $Li_xNiO_2$, $Li_xMnO_2$, $Li_x$-

$Co_aNi_{1-a}O_2$, $Li_xMn_2O_4$, and $Li_xCo_bV_{1-b}O_z$ (where x, a, b and z are the same as above). Incidentally, the value of x is a value before start of charging/discharging and is increased/decreased by charging/discharging.

As for the positive electrode active material above, one material may be used alone, or two or more materials may be used in combination. The average particle diameter of the positive electrode active material is 10 µm or less. If the average particle diameter exceeds 10 µm, the efficiency of charge/discharge reaction decreases under a large current. The average particle diameter is preferably from 0.05 µm (50 nm) to 7 µm, more preferably from 1 to 7 µm.

(Negative Electrode Active Material)

As the negative electrode active material contained in the electrode material for a non-aqueous electrolyte secondary battery of the present invention, one member or two or more members selected from the materials conventionally known as the negative electrode active material in a non-aqueous electrolyte secondary battery may be used. For example, in the case of a lithium ion secondary battery, a carbon material capable of storing/releasing lithium ion, either Si or Sn, an alloy or oxide containing at least either one thereof, etc. may be used. Among these, a carbon material is preferred.

Representative examples of the carbon material include natural graphite, artificial graphite produced by heat-treating petroleum-based and coal-based cokes, hard carbon in which a resin is carbonized, and a mesophase pitch-based carbon material. In the case of using natural graphite or artificial graphite, from the standpoint of increasing the battery capacity, those having a graphite structure in which the interplanar spacing d(002) of (002) plane is from 0.335 to 0.337 nm as measured by powder X-ray diffraction are preferred.

The natural graphite means a graphitic material naturally produced as an ore. The natural graphite is classified, by its appearance and nature, into two types, i.e., scaly graphite having a high degree of crystallization and amorphous graphite having a low degree of crystallization. The scaly graphite is further classified into flaky graphite taking on a leaf-like appearance and scaly graphite taking on a block-like appearance. The natural graphite working out to a graphitic material is not particularly limited in its locality, nature, and kind. In addition, natural graphite or a particle produced using natural graphite as a raw material may be heat-treated before use.

The artificial graphite means graphite produced by a wide range of artificial techniques or a graphitic material close to a perfect graphite crystal. Representative examples thereof include those produced through a calcination step at approximately from 500 to 1,000° C. and a graphitization step at 2,000° C. or more by using, as a raw material, tar or coke obtained from a residue, etc. after coal carbonization or crude oil distillation. In addition, Kish graphite obtained by reprecipitating carbon from molten iron is also a kind of artificial graphite.

Other than the carbon material, when an alloy containing at least either one of Si and Sn is used as the negative electrode active material, this is effective in that the electric capacity can be reduced, compared with a case of using Si or Sn as an elemental substance or using an oxide thereof. Particularly an Si-based alloy is preferred.

The Si-based alloy includes, for example, an alloy of Si and at least one element selected from the group consisting of B, Mg, Ca, Ti, Fe, Co, Mo, Cr, V, W, Ni, Mn, Zn, Cu, etc. Specifically, the alloy includes at least one member selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $VSi_2$, $WSi_2$, $ZnSi_2$, etc.

In the present invention, as the negative electrode active material, one of the above-described materials may be used alone, or two or more thereof may be used in combination. The average particle diameter of the negative electrode active material is 10 µm or less. If the average particle diameter exceeds 10 µm, the efficiency of charge/discharge reaction under a large current decreases. The average particle diameter is preferably from 0.1 to 10 µm, more preferably from 1 to 7 µm.

(Binder)

As for the binder contained in the non-aqueous electrolyte secondary battery of the present invention, a binder enabling electrode molding and having sufficient electrochemical stability can be suitably used. As such a binder, one or more members selected from the group consisting of polyvinyl alcohol, polyacrylic acid, carboxymethyl cellulose, polytetrafluoroethylene (PTFE), polyvinylidene fluoride (PVDF), synthetic butadiene rubber (SBR), a fluoroolefin copolymer crosslinked polymer, polyimide, petroleum pitch, coal pitch, a phenol resin, etc. are preferably used, and polyvinylidene fluoride (PVDF) is more preferred.

The form at the time of use as a binder is not particularly limited and may be a solid form or a liquid form (e.g., emulsion form), and the form can be appropriately selected by taking into account, for example, the production method (in particular, whether dry kneading or wet kneading) of electrode and the solubility in electrolytic solution.

The solvent for dissolving the binder is not particularly limited as long as it dissolves the binder. Specifically, the solvent includes, for example, one or more kinds of solvents selected from the group consisting of N-methylpyrrolidone (NMP), dimethylacetamide (DMAc), dimethylformamide (DMF), dimethylsulfoxide (DMSO), etc. Particularly NMP or DMAc is preferred.

[Electrode for Non-Aqueous Electrolyte Secondary Battery]

The electrode for a non-aqueous electrolyte secondary battery of the present invention is an electrode for a non-aqueous electrolyte secondary battery, having a collector and an active material layer on the collector, wherein the active material layer is composed of the electrode material for a non-aqueous electrolyte secondary battery of the present invention. The electrode for a non-aqueous electrolyte secondary battery of the present invention is a positive electrode when having a positive electrode active material layer on the collector, and is a negative electrode when having a negative electrode active material layer on the collector. The electrode for a non-aqueous electrolyte secondary battery of the present invention has excellent electrical conductivity, i.e., high electrical conductivity, and excellent mechanical strength by virtue of containing, as an active material layer, the electrode material for a non-aqueous electrolyte secondary battery of the present invention. The ultrafine fibrous carbons and ultrafine-fibrous-carbon aggregates of the present invention have excellent water dispersibility, and therefore the electrode material for a non-aqueous electrolyte secondary battery of the present invention is easily formed into a paste when slurried, so that the electrode for a non-aqueous electrolyte secondary battery of the present invention can be easily produced.

As the method for manufacturing the electrode of a non-aqueous electrolyte secondary battery of the present invention, the following two techniques are employed in general. One method is a method where an electrode active material, an electroconductive agent and a binder are mixed/kneaded and shaped into a film by extrusion molding and the film is rolled, stretched and then laminated together with a collector. Another method is a method where an electrode active material, an electroconductive agent, a binder and a solvent for dissolving the binder are mixed to prepare a slurry and the slurry is coated on a substrate and after removing the solvent, pressed.

In the present invention, either method may be used, but since the latter method is preferred, the latter method is described in detail below.

In the manufacture of the electrode for a non-aqueous electrolyte secondary battery of the present invention, the ratio of the electroconductive agent of the present invention added in the slurry is 10 mass % or less relative to the electrode material for a non-aqueous electrolyte secondary battery of the present invention, which is composed of the electrode active material, the electroconductive agent and the binder. The adding ratio is preferably 7 mass % or less, more preferably 5 mass % or less. If the ratio of the electroconductive agent added exceeds 10 mass %, when fabricating a cell having any capacity, the amount of the active material in the electrode is reduced, leading to difficulty of application to power source usage where high importance is attached to the energy density.

In the present invention, the ratio of the binder added is from 1 to 25 mass % relative to the electrode material composed of the electrode active material, the electroconductive agent and the binder. The adding ratio is preferably from 3 to 20 mass %, more preferably from 5 to 20 mass %. If the amount of the binder is less than 1 mass %, generation of cracking or separation of the electrode from the collector may occur. If the amount of the binder exceeds 25 mass %, when fabricating a cell having any capacity, the amount of the active material in the electrode is reduced, leading to difficulty of application to power source usage where high importance is attached to the energy density.

At the time of manufacture of the electrode, because of poor dispersion state in the slurry, it is sometimes difficult to ensure fluidity suitable for coating. In such a case, a slurrying aid may be used. The slurrying aid includes, for example, one or more members selected from the group consisting of polyvinylpyrrolidone, carboxymethyl cellulose, polyvinyl acetate, polyvinyl alcohol, etc. Particularly use of polyvinylpyrrolidone is preferred. By adding the above-described slurrying aid, sufficient fluidity can be ensured even with a relatively small amount of a solvent, and the dispersibility of pulverized active carbon is also dramatically enhanced. In addition, generation of cracking after the removal of solvent can be reduced.

The solid content concentration in the slurry (the ratio of the total weight of the slurry components other than the solvent to the total mass of the slurry) is preferably from 10 to 50 mass %, more preferably from 15 to 40 mass %. If the solid content concentration exceeds 50 mass %, it may be difficult to manufacture a uniform slurry. If this value is less than 10 mass %, the slurry viscosity may be decreased too much, resulting in uneven thickness of the electrode.

For coating the slurry, for example, an appropriate coating method such as doctor blade may be employed. After the coating, the solvent is removed by a treatment, for example, at 60 to 150° C., preferably from 75 to 85° C., for preferably from 60 to 180 minutes. Thereafter, the coated material after the removal of solvent is pressed, whereby an active material layer can be produced.

In the electrode for a non-aqueous electrolyte secondary battery of the present invention, the thickness of the active material layer is suitably from 5 to 300 μm. If the thickness of the active material layer is less than 5 μm, when fabricating a cell having any capacity, a separator or a collector needs to be used in a large amount, leading to a decrease in the volume occupancy of the active material layer in the cell, and not only this is disadvantageous in view of energy density but also the usage is considerably limited. In particular, although output characteristics (including low-temperature characteristics) are important, application to power source usage where high importance is attached to energy density becomes difficult.

On the other hand, production of an electrode where the electrode thickness exceeds 300 μm is relatively difficult due to problem of crack generation. Therefore, the electrode thickness is in general preferably 300 μm or less in view of stable production of the electrode. In order to more stably produce the electrode, the electrode thickness is more preferably 200 μm or less and for the purpose of elevating the productivity of electrode or the output characteristics of capacitor, the electrode thickness is still more preferably from 10 to 100 μm.

The electrode for a non-aqueous electrolyte secondary battery of the present invention, which is manufactured as above, preferably has no anisotropy of mechanical strength (electrode strength) in view of reinforcement effect. In the electrode having no anisotropy of mechanical strength (electrode strength), from which the collector is removed, i.e., in the electrode material for a non-aqueous electrolyte secondary battery of the present invention, the ratio $\sigma M/\sigma T$ between the tensile strength $\sigma M$ in the coating direction for coating the electrode material and the in-plane tensile strength $\sigma_T$ in the direction perpendicular to the direction of the coating direction is preferably 1.6 or less. The ratio $\sigma M/\sigma T$ is more preferably 1.2 or less, still more preferably from 0.9 to 1.1.

The electrode for a non-aqueous electrolyte secondary battery of the present invention, which is manufactured as above, preferably has anisotropy of mechanical strength (electrode strength) in view of reinforcement effect. In the electrode having anisotropy of mechanical strength (electrode strength), from which the collector is removed, i.e., in the electrode material for a non-aqueous electrolyte secondary battery of the present invention, the ratio $\sigma M/\sigma T$ between the tensile strength $\sigma M$ in the coating direction for coating the electrode material and the in-plane tensile strength $\sigma_T$ in the direction perpendicular to the direction of the coating direction is preferably more than 1.6. The ratio $\sigma M/\sigma T$ is more preferably 1.7 or more, still more preferably 1.8 or more.

The collector of the electrode for a non-aqueous electrolyte secondary battery of the present invention may be formed of any electrically conductive material. Accordingly, the collector can be formed of, for example, a metal material such as aluminum, nickel, iron, stainless steel, titanium and copper, particularly aluminum, stainless steel or copper.

[Non-Aqueous Electrolyte Secondary Battery]

The non-aqueous electrolyte secondary battery of the present invention is a non-aqueous secondary battery containing the electrode for a non-aqueous electrolyte secondary battery of the present invention. The non-aqueous electrolyte secondary battery of the present invention has excellent cycle characteristics and high capacity by virtue of containing the electrode for a non-aqueous electrolyte secondary battery of the present invention.

The non-aqueous electrolyte secondary battery of the present invention includes, for example, a lithium ion secondary battery, a lithium battery, and a lithium ion polymer battery but is preferably a lithium ion secondary battery. In the non-aqueous electrolyte secondary battery of the present invention, a positive electrode obtained by forming a positive electrode active material layer on a surface of a collector, an electrolyte layer containing an electrolyte, and the negative electrode for a non-aqueous electrolyte secondary battery of the present invention may be stacked such that the positive electrode active material layer and the negative electrode active material layer of the negative electrode of the present invention face each other and the electrolyte layer is inserted between the positive electrode active material layer and the negative electrode active material according to the present invention.

Alternatively, in the non-aqueous electrolyte secondary battery of the present invention, the positive electrode for a non-aqueous electrolyte secondary battery of the present invention, an electrolyte layer containing an electrolyte, and a negative electrode obtained by forming a negative electrode active material layer on a surface of a collector may be stacked such that the positive electrode active material layer of the positive electrode of the present invention and the negative electrode active material layer of the negative electrode face each other and the electrolyte layer is inserted between the positive electrode active material layer of the positive electrode of the present invention and the negative electrode active material layer. Furthermore, in the non-aqueous electrolyte secondary battery of the present invention, the positive electrode for a non-aqueous electrolyte secondary battery of the present invention, an electrolyte layer containing an electrolyte, and the negative electrode for a non-aqueous electrolyte secondary battery of the present invention may be stacked such that the positive electrode active material layer of the positive electrode of the present invention and the negative electrode active material layer of the negative electrode of the present invention face each other and the electrolyte layer is inserted between the positive electrode active material of the positive electrode of the present invention and the negative electrode active material layer of the negative electrode of the present invention.

The electrolyte layer for the non-aqueous electrolyte secondary battery of the present invention is not limited as long as the object and effects of the present invention are not impaired. Accordingly, as the electrolyte layer, for example, a liquid electrolyte, i.e., a solution prepared, for example, by dissolving a lithium salt in an organic solvent, may be used. However, in the case of using such a liquid electrolyte, a separator composed of a porous layer is preferably used in general so as to prevent direct contact between the positive electrode active material layer and the negative electrode active material layer.

As the organic solvent for the liquid electrolyte, for example, ethylene carbonate (EC), diethyl carbonate (DEC), propylene carbonate (PC), dimethyl carbonate (DMC), and ethyl methyl carbonate (EMC) may be used. One of these organic solvents may be used alone, or two or more thereof may be used in combination. As the lithium salt for the liquid electrolyte, for example, $LiPF_6$, $LiClO_4$, $LiN(CF_3SO_2)_2$, and $LiBF_4$ can be used. One of these lithium salts may be used alone, or two or more thereof may be used in combination.

Incidentally, a solid electrolyte may also be used for the electrolyte layer and in this case, a separate spacer can be omitted.

<Fourth Aspect of the Present Invention>

The present invention is described below.

The ultrafine-fibrous-carbon aggregates of the present invention is ultrafine-fibrous-carbon aggregates obtained by aggregating ultrafine fibrous carbons having a linear structure, wherein at least a part of the surface of the ultrafine fibrous carbons in at least a part of the ultrafine-fibrous-carbon aggregates is modified with a surfactant and/or at least a part of the surface of the ultrafine fibrous carbons in at least a part of the ultrafine-fibrous-carbon aggregates is oxidatively treated, and, in the fiber length distribution of the ultrafine-fibrous-carbon aggregates, which is obtained by measuring the volume-based particle size distribution, a first peak exists at a fiber length of 15 μm or less and a second peak exists at a fiber length of more than 15 μm, and the ratio of the volume-based particle size distribution (%) of the first peak to the volume-based particle size distribution (%) of the second peak is 3/1 or more (embodiment 1).

The ultrafine fibrous carbons of the present invention has excellent water dispersibility and excellent mechanical strength due to a configuration where at least a part of the surface of the ultrafine fibrous carbons is modified with a surfactant, at least a part of the surface of the ultrafine fibrous carbons is oxidatively treated, or at least a part of the surface of the ultrafine fibrous carbons is modified with a surfactant and oxidatively treated, and, in the volume-based fiber length distribution of the ultrafine-fibrous-carbon aggregates, which is obtained by measuring the volume-based particle size distribution, a first peak exists at a fiber length of 15 μm or less, and a second peak exists at a fiber length of more than 15 μm, and the ratio of the volume-based particle size distribution (%) of the first peak to the volume-based particle size distribution (%) of the second peak is 3/1 or more.

Here, "in the volume-based fiber length distribution of the ultrafine-fibrous-carbon aggregates, which is obtained by measuring the volume-based particle size distribution, a first peak exists at a fiber length of 15 μm or less and a second peak exists at a fiber length of more than 15 μm, and the ratio of the volume-based particle size distribution (%) of the first peak to the volume-based particle size distribution (%) of the second peak is . . . " can be determined as follows. In a chart obtained by measuring the volume-based particle size distribution of the ultrafine-fibrous-carbon aggregates by means of a particle size distribution meter (the abscissa is the fiber length and the ordinate is the volume-based particle size distribution (%)), a point having a largest volume-based particle size distribution (%) out of points causing the gradient to greatly change in the region of a fiber length of 15 μm or less is designated as a first peak, a point having a largest volume-based particle size distribution (%) out of points causing the gradient to greatly change in the region of a fiber length of more than 15 μm is designated as a second peak, and the ratio (first peak/second peak) between the volume-based particle size distribution (%) of the first peak and the volume-based particle size distribution (%) of the second peak is determined.

Figure 41:
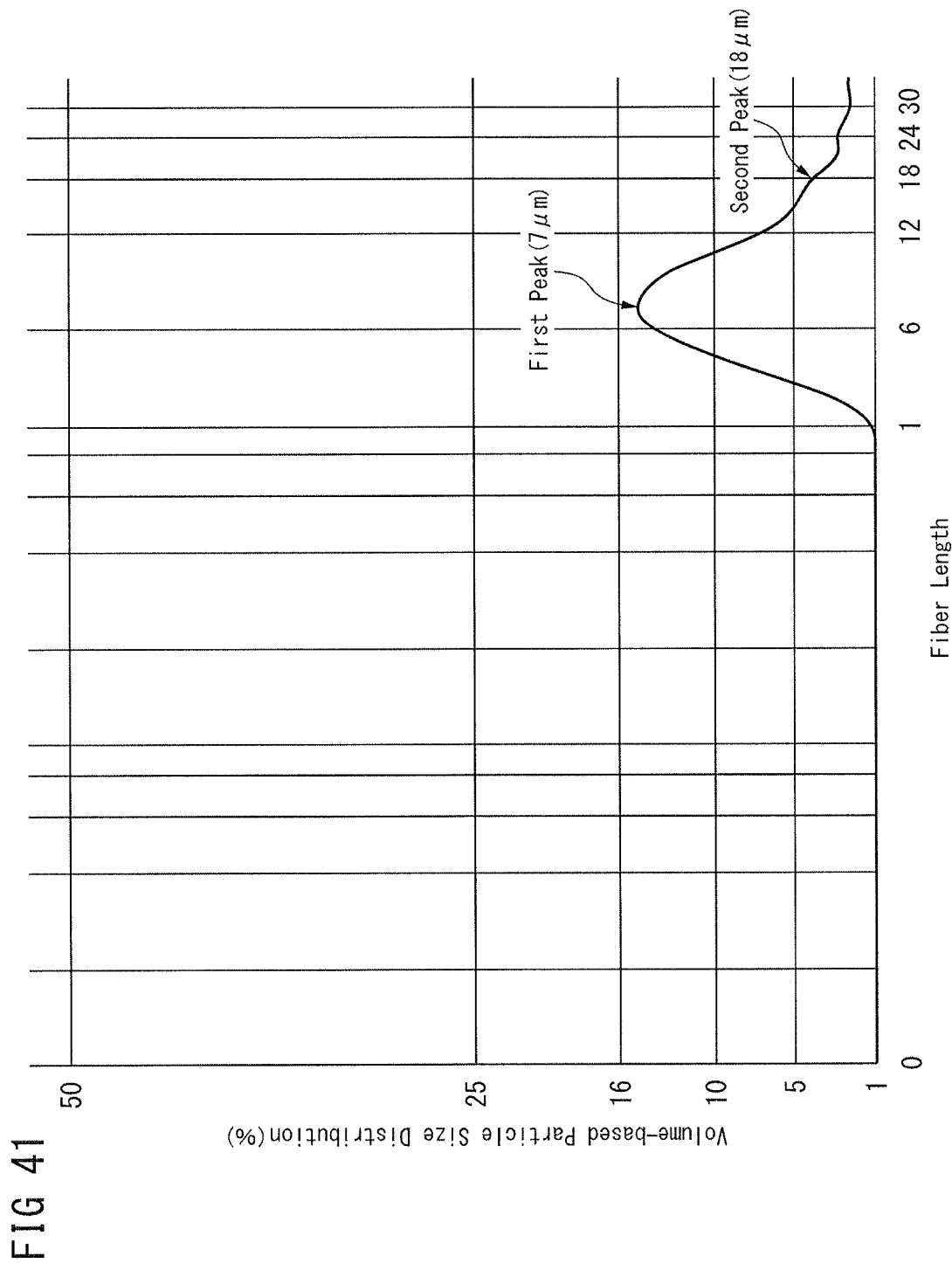
FIG. 41 is a view showing the results of the fiber length distribution of the ultrafine-fibrous-carbon aggregates obtained in Example D1.
Figure 42:
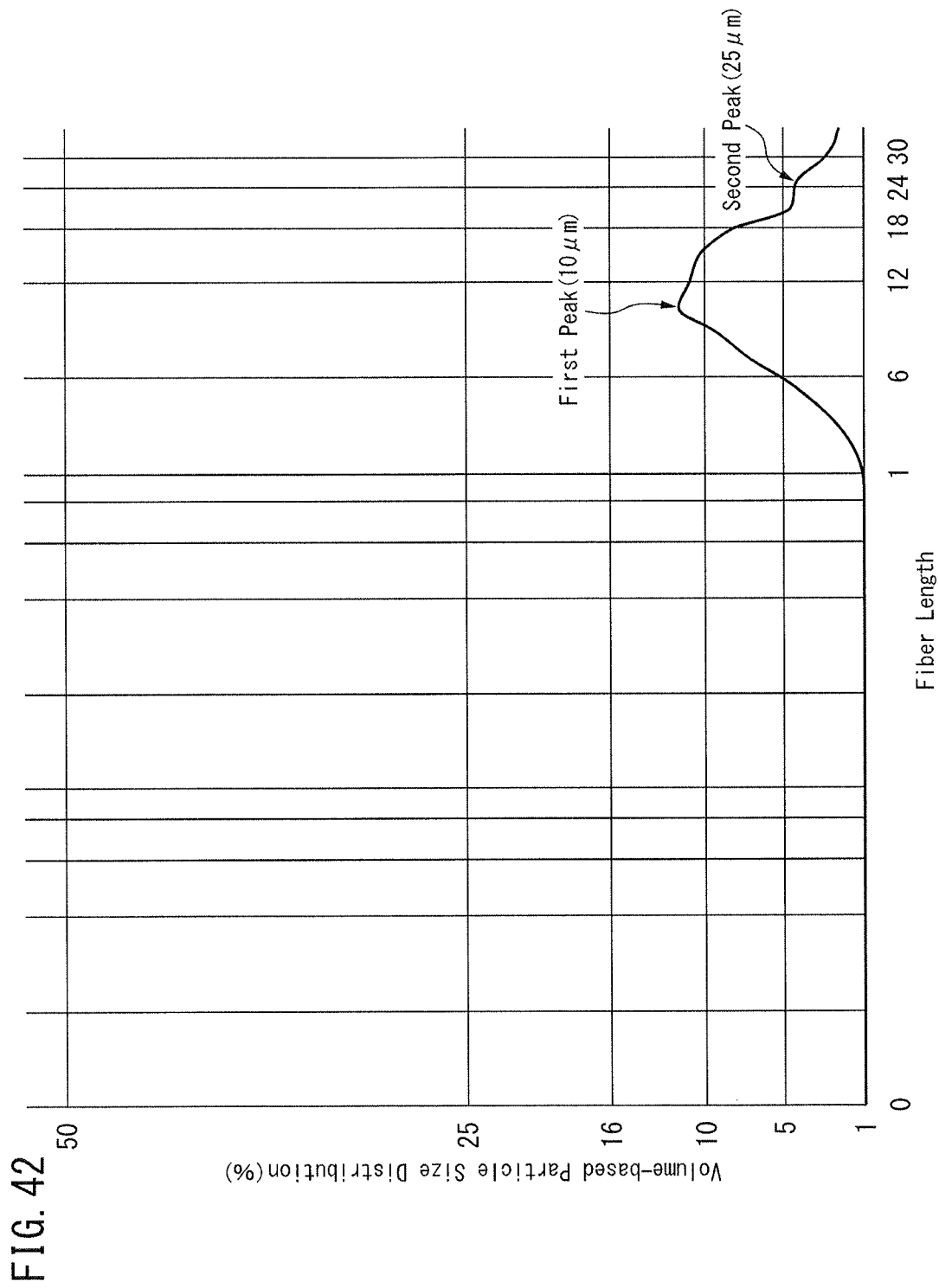
FIG. 42 is a view showing the results of the fiber length distribution of the ultrafine-fibrous-carbon aggregates obtained in Example D2.

The "point causing the gradient to greatly change" indicates, other than the maximum value, a point not showing a distinct maximum value but causing the gradient to greatly change around the point, for example, a second peak shown in FIG. 41 or 42.

In embodiment 1, the ultrafine-fibrous-carbon aggregates of the present invention are ultrafine-fibrous-carbon aggregates where the average fiber length of the ultrafine fibrous carbons in the ultrafine-fibrous-carbon aggregates is 25 μm or less (embodiment 2). According to embodiment 2, the water dispersibility and mechanical strength of the ultrafine-fibrous-carbon aggregates of the present invention are more improved.

In embodiment 1 or 2, the ultrafine-fibrous-carbon aggregates of the present invention are ultrafine-fibrous-carbon aggregates, which are formed through a treatment in an ultra-centrifugal mill (embodiment 3). According to embodiment 3, the water dispersibility and mechanical strength of the ultrafine-fibrous-carbon aggregates of the present invention are more improved.

In any one embodiment of embodiments 1 to 3, the ultrafine-fibrous-carbon aggregates of the present invention is ultrafine-fibrous-carbon aggregates where the aspect ratio of the ultrafine fibrous carbons in the ultrafine-fibrous-carbon aggregates is from 1 to 1,000 (embodiment 4).

The carbon-based electroconductive agent of the present invention is a carbon-based electroconductive agent containing the ultrafine-fibrous-carbon aggregates in any one embodiment of embodiments 1 to 4 (embodiment 5). According to embodiment 5, the carbon-based electroconductive agent of the present invention has excellent electrically conductivity, i.e., high electrical conductivity, and excellent mechanical strength.

The electrode material for a non-aqueous electrolyte secondary battery of the present invention is an electrode material for a non-aqueous electrolyte secondary battery, containing at least the carbon-based electroconductive agent of embodiment 5, an electrode active material, and a binder (embodiment 6). According to embodiment 6, the electrode material for a non-aqueous electrolyte secondary battery of the present invention has excellent electrically conductivity, i.e., high electrical conductivity, and excellent mechanical strength.

In embodiment 6, the electrode material for a non-aqueous electrolyte secondary battery of the present invention is an electrode material for a non-aqueous electrolyte secondary battery, which further contains water as a solvent (embodiment 7). According to embodiment 7, the water dispersibility of the ultrafine-fibrous-carbon aggregates is more improved, and the electrode material for a non-aqueous electrolyte secondary battery of the present invention has higher electrical conductivity and more excellent mechanical strength.

The electrode for a non-aqueous electrolyte secondary battery of the present invention is an electrode for a non-aqueous electrolyte secondary battery, having a collector and an active material layer on the collector, wherein the active material layer is composed of the electrode material for a non-aqueous electrolyte secondary battery of embodiment 6 or 7 (embodiment 8). According to embodiment 8, the electrode for a non-aqueous electrolyte secondary battery of the present invention has excellent electrically conductivity, i.e., high electrical conductivity, and excellent mechanical strength.

The non-aqueous electrolyte secondary battery of the present invention is a non-aqueous electrolyte secondary battery containing the electrode for a non-aqueous electrolyte secondary battery of embodiment 8 (embodiment 9). The water dispersibility and mechanical strength of the ultrafine-fibrous-carbon aggregates are improved and in turn, the non-aqueous electrolyte secondary battery of the present invention has excellent cycle characteristics and high capacity.

The ultrafine-fibrous-carbon aggregates of the present invention may be ultrafine-fibrous-carbon aggregates where at least two embodiments out of embodiments 1 to 4 are arbitrarily combined. The carbon-based electroconductive agent of the present invention may contain this ultrafine-fibrous-carbon aggregates, the electrode material for a non-aqueous electrolyte secondary battery of the present invention may contain this carbon electroconductive agent, the electrode for a non-aqueous electrolyte secondary battery of the present invention may contain this electrode material for a non-aqueous electrolyte secondary battery, and the non-aqueous electrolyte secondary battery of the present invention may contain this electrode for a non-aqueous electrolyte secondary battery.

The present invention is described in more detail below.

[Ultrafine-Fibrous-Carbon Aggregates]

The ultrafine-fibrous-carbon aggregates of the present invention is ultrafine-fibrous-carbon aggregates obtained by aggregating ultrafine fibrous carbons having a linear structure, wherein at least a part of the surface of the ultrafine fibrous carbons in at least a part of the ultrafine-fibrous-carbon aggregates is modified with a surfactant and/or at least a part of the surface of the ultrafine fibrous carbons in at least a part of the ultrafine-fibrous-carbon aggregates is oxidatively treated and in the fiber length distribution of the ultrafine-fibrous-carbon aggregates, which is obtained by measuring the volume-based particle size distribution and which has a first peak at a fiber length of 15 μm or less and a second peak at a fiber length of more than 15 μm, the ratio of the volume-based particle size distribution (%) of the first peak to the volume-based particle size distribution (%) of the second peak is 3/1 or more.

The linear structure as used herein means that the branching degree is 0.01 branch/μm or less. The branching indicates a granular part formed by bonding of ultrafine fibrous carbons to another ultrafine fibrous carbons at a position other than the terminal part and indicates that the primary axis of the ultrafine fibrous carbons is diverged in midstream and the primary axis of the ultrafine fibrous carbons has a branching secondary axis.

The ultrafine-fibrous-carbon aggregates of the present invention has excellent water dispersibility due to a configuration where a part or the entirety of the surface of the ultrafine fibrous carbons in at least a part of the ultrafine-fibrous-carbon aggregates is modified with a surfactant. In addition, the ultrafine fibrous carbons of the present invention has excellent water dispersibility due to a configuration where a part or the entirety of the surface of the ultrafine fibrous carbons is oxidatively treated. A part of the surface of the ultrafine fibrous carbons includes, for example, the surface at an edge of the ultrafine fibrous carbon. The water dispersibility means the degree of dispersion, i.e., dispersibility, of the ultrafine fibrous carbons in an aqueous solution or water (e.g., ion-exchanged water).

Modifying at least a part of the surface of the ultrafine fibrous carbons with a surfactant means to cause chemical modification, physical modification, or chemical modification and further physical modification, between the ultrafine fibrous carbons and a surfactant. Chemical modification means that the ultrafine fibrous carbons and a surfactant undergo a chemical reaction and are thereby chemically bonded, and means, for example, that a functional group of the ultrafine fibrous carbons and a functional group of the surfactant are covalently bonded. Physical modification means not chemical bonding but physical bonding and means, for example, that a surfactant is adsorbed or adhered to the ultrafine fibrous carbon.

The surfactant for modifying the ultrafine fibrous carbons includes, for example, an anionic surfactant (e.g., sodium carboxymethyl cellulose (CMC-Na), sodium fatty acid, sodium alkylbenzenesulfonate), a cationic surfactant (e.g., alkyltrimethylammonium salt, dialkyldimethylammonium salt), an amphoteric surfactant (e.g., alkyldimethylamine oxide, alkylcarboxybetaine), and a nonionic surfactant (e.g., polyoxyethylene alkyl ether, fatty acid diethanolamide), with sodium carboxymethyl cellulose (CMC-Na) being preferred.

The mass ratio between the ultrafine fibrous carbons and the surfactant for modifying the ultrafine fibrous carbons is not particularly limited as long as the object of the present invention is achieved and furthermore, the effects of the present invention are produced, but the mass ratio is preferably 5:6.

Specific examples of the oxidative treatment applied to at least a part of the surface of the ultrafine fibrous carbons include an oxidative treatment with peroxide ($H_2O_2$), an oxidative treatment with ozone, an oxidative treatment by UV irradiation, and an oxidative treatment in air. From the standpoint that an ionic carboxyl group is produced on the surface of the ultrafine fibrous carbons of the present invention by an oxidative treatment with peroxide ($H_2O_2$), an oxidative treatment with peroxide ($H_2O_2$) is preferred.

The ultrafine-fibrous-carbon aggregates of the present invention has excellent water dispersibility and excellent mechanical strength due to a configuration where, in the volume-based fiber length distribution of the ultrafine-fibrous-carbon aggregates, which is obtained by measuring the volume-based particle size distribution, a first peak exists at a fiber length of 15 μm or less and a second peak exists at a fiber length of more than 15 μm, and the ratio of the volume-based particle size distribution (%) of the first peak to the volume-based particle size distribution (%) of the second peak is 3/1 or more. The ultrafine fibrous carbons having a fiber length of 15 μm or less constituting the ultrafine-fibrous-carbon aggregates of the present invention mainly contributes to improvement of water dispersibility, and the ultrafine fibrous carbons having a fiber length of more than 15 μm constituting the ultrafine-fibrous-carbon aggregates of the present invention mainly contributes to improvement of mechanical strength (reinforcement effect).

Furthermore, in the present invention, the mechanical strength in the coating direction for coating the electrode material (MD direction) and/or the in-plane direction perpendicular to the coating direction (TD direction) is large by virtue of containing ultrafine fibrous carbons having a fiber length of 15 μm or less and ultrafine fibrous carbons having a fiber length of more than 15 μm, so that an excellent reinforcement effect can be provided.

In the ultrafine-fibrous-carbon aggregates of the present invention, the ratio of the volume-based particle size distribution (%) of the first peak at a fiber length of 15 μm or less to the volume-based particle size distribution (%) of the second peak at a fiber length of more than 15 μm is 3/1 or more, preferably 5/1 or more. Due to this preferred embodiment, the water dispersibility and mechanical strength can be more improved. If the ratio of the volume-based particle size distribution (%) of the first peak at a fiber length of 15 μm or less to the volume-based particle size distribution (%) of the second peak at a fiber length of more than 15 μm is less than 3/1, the water dispersibility and/or mechanical strength may not be improved.

The ultrafine-fibrous-carbon aggregates of the present invention preferably has a configuration where in the volume-based fiber length distribution of the ultrafine-fibrous-carbon aggregates, which is obtained by measuring the volume-based particle size distribution, the ratio of the ultrafine fibrous carbons having a fiber length of more than 15 μm to 50 μm is less than 50 vol % relative to the ultrafine fibrous carbon. The ratio may be more preferably less than 40 vol %, less than 30 vol %, less than 20 vol %, or less than 10 vol %. Within such a preferable range, the water dispersibility and mechanical strength can be further improved.

In the ultrafine-fibrous-carbon aggregates of the present invention, the average fiber length of the ultrafine fibrous carbons of the ultrafine-fibrous-carbon aggregates may be from 1 to 100 μm but is preferably 25 μm or less, more preferably 23 μm or less, still more preferably 20 μm or less, yet still more preferably 18 μm or less. Due to such a preferred embodiment, the water dispersibility and mechanical strength can be further improved. If the average fiber length of the ultrafine fibrous carbons exceeds 100 μm, the water dispersibility and mechanical strength of the ultrafine-fibrous-carbon aggregates of the present invention may be impaired. In the description of the present invention, the ultrafine fibrous carbons is sometimes referred to as CNF, and the ultrafine fibrous carbons having a short average fiber length, for example, ultrafine fibrous carbons having an average fiber length of 1 to 10 μm, is sometimes referred to as S-CNF.

The ultrafine-fibrous-carbon aggregates of the present invention are preferably formed through a treatment in an ultra-centrifugal mill. Due to a treatment in an ultra-centrifugal mill, the water dispersibility and mechanical strength of the ultrafine-fibrous-carbon aggregates of the present invention can be further improved. In an ultra-centrifugal mill, the ultrafine fibrous carbons of the present invention is instantly pulverized by a treatment in two steps, i.e., impact grinding and shearing. More specifically, the ultrafine fibrous carbons charged is blown by a centrifugal force of a rotor rotating at a high speed, thereby enabling the impact grinding, and furthermore, sheared by a ring-shaped screen on the outer periphery of the rotor. Through this treatment in an ultra-centrifugal mill, the ultrafine-fibrous-carbon aggregates of the present invention are formed. When the treatment in two steps of impact grinding and shearing is designated as one treatment, the ultrafine-fibrous-carbon aggregates of the present invention may be formed through any number of treatments in an ultra-centrifugal mill but is preferably formed through 1 to 10 treatments, more preferably formed through 1 treatment, still more preferably formed through 5 or more treatments.

The ultrafine-fibrous-carbon aggregates of the present invention is preferably formed by applying a graphitization treatment. The graphitization treatment may be applied before the treatment in an ultra-centrifugal mill or may be applied after the treatment in an ultra-centrifugal mill but is preferably applied after the treatment in an ultra-centrifugal mill. The graphitization treatment can be performed by a known method (for example, the method described in JP2012-36520A). The inert gas used for the graphitization treatment includes nitrogen, argon, etc., and the graphitization treatment temperature is preferably from 500 to 3,500° C., more preferably from 2,000 to 3,500° C., still more preferably from 2,600 to 3,000° C. The graphitization treatment time may be any time as long as the graphitization can be achieved, but the graphitization treatment time is preferably from 0.1 to 24 hours, more preferably from 0.2 to 10 hours, still more preferably from 0.5 to 8 hours. Incidentally, the oxygen concentration at the time of graphitization treatment is preferably 20 ppm by volume or less, more preferably 10 ppm by volume or less.

The ultrafine fibrous carbons of the present invention is preferably ultrafine fibrous carbons having an aspect ratio of 1 to 1,000, more preferably ultrafine fibrous carbons having an aspect ratio of 5 to 500, still more preferably ultrafine fibrous carbons having an aspect ratio of 10 to 100.

The ultrafine fibrous carbons constituting the ultrafine-fibrous-carbon aggregates of the present invention is not particularly limited as long as the object of the present invention is achieved and furthermore, the effects of the present invention are produced, but the ultrafine fibrous carbons is preferably easily-graphitizable carbon. The easily-graphitizable carbon is a raw carbon material in which a graphite structure having a three-dimensional lamination regularity is readily produced by heat treatment at a high temperature of 2,500° C. or more, and is also called soft carbon, etc. The easily-graphitizable carbon includes petroleum coke, coal pitch coke, polyvinyl chloride, 3,5-dimethylphenolformaldehyde resin, etc.

Above all, a compound capable of forming an optically anisotropic phase (liquid crystal phase) in a molten state, which is called a mesophase pitch, or a mixture thereof is preferred, because high crystallinity and high electrical conductivity are expected. The mesophase pitch includes, for example, a petroleum-based mesophase pitch obtained from a petroleum residue oil by a method based on hydrogenation and heat treatment or by a method based on hydrogenation, heat treatment and solvent extraction; a coal-based mesophase pitch obtained from a coal tar pitch by a method based on hydrogenation and heat treatment or by a method based on hydrogenation, heat treatment and solvent extraction; and a synthetic liquid crystal pitch obtained by polycondensation in the presence of a super strong acid (e.g., HF, BF3) by using, as a raw material, an aromatic hydrocarbon such as naphthalene, alkylnaphthalene and anthracene. Among these, a synthetic liquid crystal pitch is preferred in view of not containing impurities.

(Average Fiber Diameter)

The average fiber diameter of the ultrafine fibrous carbons constituting the ultrafine-fibrous-carbon aggregates of the present invention is preferably from more than 200 nm to 900 nm. This average fiber diameter is a value measured from a photographic view taken at a magnification of 2,000 times by a field emission scanning electron microscope. The average fiber diameter of the ultrafine fibrous carbons is preferably from more than 230 nm to 600 nm, more preferably from more than 250 nm to 500 nm, still more preferably from more than 250 nm to 400 nm.

(Average Interplanar Spacing)

The average interplanar spacing of the ultrafine fibrous carbons constituting the ultrafine-fibrous-carbon aggregates of the present invention is not particularly limited as long as the object of the present invention is achieved and furthermore, the effects of the present invention are produced, but the average interplanar spacing d(002) of (002) plane as measured by an X-ray diffraction method is preferably from 0.335 to 0.340 nm.

Figure 40:
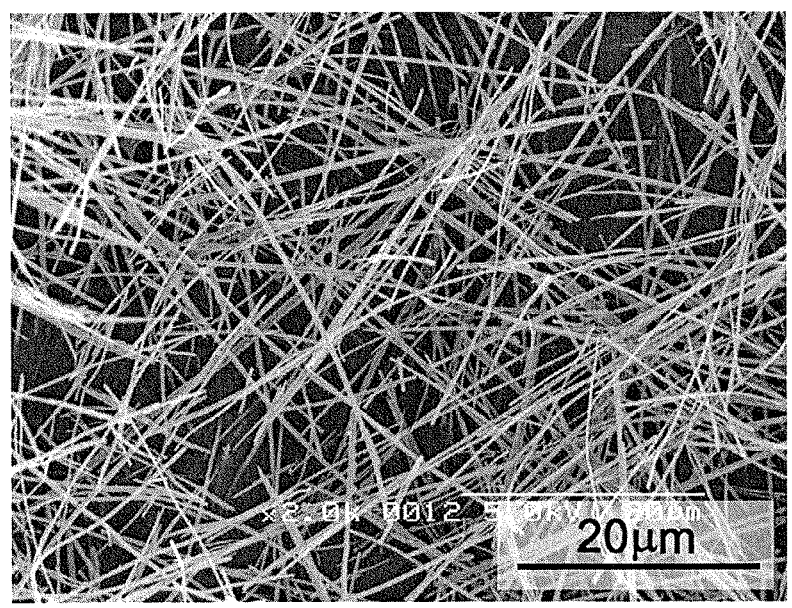
FIG. 40 is a scanning electron microscope image (2,000 times magnification) of the ultrafine fibrous carbons used in Examples D1 and D2 and Comparative Examples D1 and D2 (CNF).

Here, FIG. 40 shows a scanning electron micrograph (2,000 times magnification) of a representative ultrafine fibrous carbons constituting the ultrafine-fibrous-carbon aggregates of the present invention. As evident from FIG. 40, it is confirmed that the ultrafine fibrous carbons has a linear structure and the average fiber length is from 1 to 100 μm.

The ultrafine fibrous carbons (CNF or S-CNF) constituting the ultrafine-fibrous-carbon aggregates of the present invention are produced by a known production method. For example, the ultrafine fibrous carbons (CNF or S-CNF) can be produced by the production method described in JP2010-13742A, JP2010-31439A, etc. Then, the ultrafine-fibrous-carbon aggregates of the present invention are formed by aggregating the ultrafine fibrous carbons produced above.

[Electroconductive Agent]

The carbon-based electroconductive agent of the present invention is a carbon-based electroconductive agent containing the ultrafine-fibrous-carbon aggregates of the present invention. The carbon-based electroconductive agent of the present invention has excellent electrical conductivity, i.e., high electrical conductivity, and excellent mechanical strength by virtue of containing the ultrafine-fibrous-carbon aggregates of the present invention. The carbon-based electroconductive agent of the present invention contains the ultrafine-fibrous-carbon aggregates of the present invention and as long as the electrical conductivity can be enhanced, may further contain a material other than the ultrafine-fibrous-carbon aggregates of the present invention, for example, a carbon-based material.

[Electrode Material for Non-Aqueous Electrolyte Secondary Battery]

The electrode material for a non-aqueous electrolyte secondary battery of the present invention is an electrode material for a non-aqueous electrolyte secondary battery, containing at least the carbon-based electroconductive agent of the present invention, an electrode active material, and a binder. The electrode material for a non-aqueous electrolyte secondary battery of the present invention has excellent electrical conductivity, i.e., high electrical conductivity, and excellent mechanical strength by virtue of containing the carbon-based electroconductive agent of the present invention.

The electrode material for a non-aqueous electrolyte secondary battery of the present invention preferably further contains water as a solvent. Water as the solvent includes, for example, ion-exchanged water. By further containing water as a solvent, the water dispersibility of the ultrafine-fibrous-carbon aggregates of the present invention is more improved, and the electrode material for a non-aqueous electrolyte secondary battery of the present invention has higher electrical conductivity.

The electrode active material (positive electrode active material and negative electrode active material) contained in the electrode material for a non-aqueous electrolyte secondary battery of the present invention is described below.

(Positive Electrode Active Material)

As the positive electrode active material contained in the electrode material for a non-aqueous electrolyte secondary battery of the present invention, any one member or two or more members appropriately selected from the materials conventionally known as the positive electrode active material in a non-aqueous electrolyte secondary battery may be used. For example, in the case of a lithium ion secondary battery, a lithium-containing metal oxide capable of storing/releasing lithium ion is suitable. The lithium-containing metal oxide includes a composite oxide containing lithium and at least one element selected from the group consisting of Co, Mg, Mn, Ni, Fe, Al, Mo, V, W, Ti, etc.

Specifically, the composite oxide includes at least one member selected from the group consisting of $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, $Li_xMn_cFe_{2-c}O_4$ (wherein x=from 0.02 to 1.2, a=from 0.1 to 0.9, b=from 0.8 to 0.98, c=from 1.6 to 1.96, and z=from 2.01 to 2.3), etc. Preferable lithium-containing metal oxides include at least one member selected from the group consisting of $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (where x, a, b and z are the same as above). Incidentally, the value of x is a value before start of charging/discharging and is increased/decreased by charging/discharging.

As for the positive electrode active material above, one material may be used alone, or two or more materials may be used in combination. The average particle diameter of the positive electrode active material is 10 μm or less. If the average particle diameter exceeds 10 μm, the efficiency of charge/discharge reaction under a large current decreases.

The average particle diameter is preferably from 0.05 μm (50 nm) to 7 μm, more preferably from 1 to 7 μm.

(Negative Electrode Active Material)

As the negative electrode active material contained in the electrode material for a non-aqueous electrolyte secondary battery of the present invention, one member or two or more members selected from the materials conventionally known as the negative electrode active material in a non-aqueous electrolyte secondary battery may be used. For example, in the case of a lithium ion secondary battery, a carbon material capable of storing/releasing lithium ion, either Si or Sn, an alloy or oxide containing at least either one thereof, etc. may be used. Among these, a carbon material is preferred.

Representative examples of the carbon material include natural graphite, artificial graphite produced by heat-treating petroleum-based and coal-based cokes, hard carbon in which a resin is carbonized, and a mesophase pitch-based carbon material. In the case of using natural graphite or artificial graphite, from the standpoint of increasing the battery capacity, those having a graphite structure in which the interplanar spacing d(002) of (002) plane is from 0.335 to 0.337 nm as measured by powder X-ray diffraction are preferred.

The natural graphite means a graphitic material naturally produced as an ore. The natural graphite is classified, by its appearance and nature, into two types, i.e., scaly graphite having a high degree of crystallization and amorphous graphite having a low degree of crystallization. The scaly graphite is further classified into flaky graphite taking on a leaf-like appearance and scaly graphite taking on a block-like appearance. The natural graphite working out to a graphitic material is not particularly limited in its locality, nature, and kind. In addition, natural graphite or a particle produced using natural graphite as a raw material may be heat-treated before use.

The artificial graphite means graphite produced by a wide range of artificial techniques or a graphitic material close to a perfect graphite crystal. Representative examples thereof include those produced through a calcination step at approximately from 500 to 1,000° C. and a graphitization step at 2,000° C. or more by using, as a raw material, tar or coke obtained from a residue, etc. after coal carbonization or crude oil distillation. In addition, Kish graphite obtained by reprecipitating carbon from molten iron is also a kind of artificial graphite.

Other than the carbon material, when an alloy containing at least either one of Si and Sn is used as the negative electrode active material, this is effective in that the electric capacity can be reduced, compared with a case of using Si or Sn as an elemental substance or using an oxide thereof. Particularly an Si-based alloy is preferred.

The Si-based alloy includes, for example, an alloy of Si and at least one element selected from the group consisting of B, Mg, Ca, Ti, Fe, Co, Mo, Cr, V, W, Ni, Mn, Zn, Cu, etc. Specifically, the alloy includes at least one member selected from the group consisting of $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu5Si$, $FeSi_2$, $MnSi_2$, $VSi_2$, $WSi_2$, $ZnSi_2$, etc.

In the present invention, as the negative electrode active material, one of the above-described materials may be used alone, or two or more thereof may be used in combination. The average particle diameter of the negative electrode active material is 10 μm or less. If the average particle diameter exceeds 10 μm, the efficiency of charge/discharge reaction decreases under a large current. The average particle diameter is preferably from 0.1 to 10 μm, more preferably from 1 to 7 μm.

(Binder)

As for the binder contained in the non-aqueous electrolyte secondary battery of the present invention, a binder enabling electrode molding and having sufficient electrochemical stability can be suitably used. As such a binder, one or more members selected from the group consisting of polyvinyl alcohol, polyacrylic acid, carboxymethyl cellulose, polytetrafluoroethylene (PTFE), polyvinylidene fluoride (PVDF), synthetic butadiene rubber (SBR), a fluoroolefin copolymer crosslinked polymer, polyimide, petroleum pitch, coal pitch, a phenol resin, etc. are preferably used, and polyvinylidene fluoride (PVDF) is more preferred.

The form at the time of use as a binder is not particularly limited and may be a solid form or a liquid form (e.g., emulsion form), and the form can be appropriately selected by taking into account, for example, the production method (in particular, whether dry kneading or wet kneading) of electrode and the solubility in electrolytic solution.

The solvent for dissolving the binder is not particularly limited as long as it dissolves the binder. Specifically, the solvent includes, for example, one or more kinds of solvents selected from the group consisting of N-methylpyrrolidone (NMP), dimethylacetamide (DMAc), dimethylformamide (DMF), dimethylsulfoxide (DMSO), etc. Particularly NMP or DMAc is preferred.

[Electrode for Non-Aqueous Electrolyte Secondary Battery]

The electrode for a non-aqueous electrolyte secondary battery of the present invention is an electrode for a non-aqueous electrolyte secondary battery, having a collector and an active material layer on the collector, wherein the active material layer is composed of the electrode material for a non-aqueous electrolyte secondary battery of the present invention. The electrode for a non-aqueous electrolyte secondary battery of the present invention is a positive electrode when having a positive electrode active material layer on the collector and is a negative electrode when having a negative electrode active material layer on the collector. The electrode for a non-aqueous electrolyte secondary battery of the present invention has excellent electrical conductivity, i.e., high electrical conductivity, and excellent mechanical strength by virtue of containing, as an active material layer, the electrode material for a non-aqueous electrolyte secondary battery of the present invention. The ultrafine-fibrous-carbon aggregates of the present invention has excellent water dispersibility, and therefore the electrode material for a non-aqueous electrolyte secondary battery of the present invention is easily formed into a paste when slurried, so that the electrode for a non-aqueous electrolyte secondary battery of the present invention can be easily produced.

As the method for manufacturing the electrode of a non-aqueous electrolyte secondary battery of the present invention, the following two techniques are employed in general. One method is a method where an electrode active material, an electroconductive agent and a binder are mixed/kneaded and shaped into a film by extrusion molding, and the obtained film is rolled, stretched and then laminated together with a collector. Another method is a method where an electrode active material, an electroconductive agent, a binder and a solvent for dissolving the binder are mixed to prepare a slurry and the slurry is coated on a substrate and after removing the solvent, pressed.

In the present invention, either method may be used, but since the latter method is preferred, the latter method is described in detail below.

In the manufacture of the electrode for a non-aqueous electrolyte secondary battery of the present invention, the ratio of the electroconductive agent of the present invention added in the slurry is 10 mass % or less relative to the electrode material for a non-aqueous electrolyte secondary battery of the present invention, which is composed of the electrode active material, the electroconductive agent and the binder. The adding ratio is preferably 7 mass % or less, more preferably 5 mass % or less. If the ratio of the electroconductive agent added exceeds 10 mass %, when fabricating a cell having any capacity, the amount of the active material in the electrode is reduced, leading to difficulty of application to power source usage where high importance is attached to the energy density.

In the present invention, the ratio of the binder added is from 1 to 25 mass % relative to the electrode material composed of the electrode active material, the electroconductive agent and the binder. The adding ratio is preferably from 3 to 20 mass %, more preferably from 5 to 20 mass %. If the amount of the binder is less than 1 mass %, generation of cracking or separation of the electrode from the collector may occur. If the amount of the binder exceeds 25 mass %, when fabricating a cell having any capacity, the amount of the active material in the electrode is reduced, leading to difficulty of application to power source usage where high importance is attached to the energy density.

At the time of manufacture of the electrode, because of poor dispersion state in the slurry, it is sometimes difficult to ensure fluidity suitable for coating. In such a case, a slurrying aid may be used. The slurrying aid includes, for example, one or more members selected from the group consisting of polyvinylpyrrolidone, carboxymethyl cellulose, polyvinyl acetate, polyvinyl alcohol, etc. Particularly use of polyvinylpyrrolidone is preferred. By adding the above-described slurrying aid, sufficient fluidity can be ensured even with a relatively small amount of a solvent, and the dispersibility of pulverized active carbon is also dramatically enhanced. In addition, generation of cracking after the removal of solvent can be reduced.

The solid content concentration in the slurry (the ratio of the total weight of the slurry components other than the solvent to the total mass of the slurry) is preferably from 10 to 50 mass %, more preferably from 15 to 40 mass %. If the solid content concentration exceeds 50 mass %, it may be difficult to manufacture a uniform slurry. If this value is less than 10 mass %, the slurry viscosity may be decreased too much, resulting in uneven thickness of the electrode.

For coating the slurry, for example, an appropriate coating method such as doctor blade may be employed. After the coating, the solvent is removed by a treatment, for example, at 60 to 150° C., preferably from 75 to 85° C., for preferably from 60 to 180 minutes. Thereafter, the coated material after the removal of solvent is pressed, whereby an active material layer can be produced.

In the electrode for a non-aqueous electrolyte secondary battery of the present invention, the thickness of the active material layer is suitably from 5 to 300 μm. If the thickness of the active material layer is less than 5 μm, when fabricating a cell having any capacity, a separator or a collector needs to be used in a large amount, leading to a decrease in the volume occupancy of the active material layer in the cell, and not only this is disadvantageous in view of energy density but also the usage is considerably limited. In particular, although output characteristics (including low-temperature characteristics) are important, application to power source usage where high importance is attached to energy density becomes difficult.

On the other hand, production of an electrode where the electrode thickness exceeds 300 μm is relatively difficult due to problem of crack generation. Therefore, the electrode thickness is in general preferably 300 μm or less in view of stable production of the electrode. In order to more stably produce the electrode, the electrode thickness is more preferably 200 μm or less and for the purpose of elevating the productivity of electrode or the output characteristics of capacitor, the electrode thickness is still more preferably from 10 to 100 μm.

The electrode for a non-aqueous electrolyte secondary battery according to the present invention, which is manufactured as above, preferably has no anisotropy of mechanical strength (electrode strength) in view of reinforcement effect. In the electrode having no anisotropy of mechanical strength (electrode strength), from which the collector is removed, i.e., in the electrode material for a non-aqueous electrolyte secondary battery of the present invention, the ratio $\sigma M/\sigma T$ between the tensile strength $\sigma M$ in the coating direction for coating the electrode material and the in-plane tensile strength $\sigma_T$ in the direction perpendicular to the direction of the coating direction is preferably 1.6 or less. The ratio $\sigma M/\sigma T$ is more preferably 1.2 or less, still more preferably from 0.9 to 1.1.

The electrode for a non-aqueous electrolyte secondary battery of the present invention, which is manufactured as above, preferably has anisotropy of mechanical strength (electrode strength) in view of reinforcement effect. In the electrode having anisotropy of mechanical strength (electrode strength), from which the collector is removed, i.e., in the electrode material for a non-aqueous electrolyte secondary battery of the present invention, the ratio $\sigma M/\sigma T$ between the tensile strength $\sigma M$ in the coating direction for coating the electrode material and the in-plane tensile strength $\sigma_T$ in the direction perpendicular to the direction of the coating direction is preferably more than 1.6. The ratio $\sigma M/\sigma T$ is more preferably 1.7 or more, still more preferably 1.8 or more.

The collector of the electrode for a non-aqueous electrolyte secondary battery of the present invention may be formed of any electrically conductive material. Accordingly, the collector can be formed of, for example, a metal material such as aluminum, nickel, iron, stainless steel, titanium and copper, particularly aluminum, stainless steel or copper.

[Non-Aqueous Electrolyte Secondary Battery]

The non-aqueous electrolyte secondary battery of the present invention is a non-aqueous secondary battery containing the electrode for a non-aqueous electrolyte secondary battery of the present invention. The non-aqueous electrolyte secondary battery of the present invention has excellent cycle characteristics and high capacity by virtue of containing the electrode for a non-aqueous electrolyte secondary battery of the present invention.

The non-aqueous electrolyte secondary battery of the present invention includes, for example, a lithium ion secondary battery, a lithium battery, and a lithium ion polymer battery but is preferably a lithium ion secondary battery. In the non-aqueous electrolyte secondary battery of the present invention, a positive electrode obtained by forming a positive electrode active material layer on a surface of a collector, an electrolyte layer containing an electrolyte, and the negative electrode for a non-aqueous electrolyte secondary battery of the present invention may be stacked such that the positive electrode active material layer and the negative electrode active material layer of the negative electrode of the present invention face each other and the electrolyte layer is inserted between the positive electrode active material layer and the negative electrode active material according to the present invention.

Alternatively, in the non-aqueous electrolyte secondary battery of the present invention, the positive electrode for a non-aqueous electrolyte secondary battery of the present invention, an electrolyte layer containing an electrolyte, and a negative electrode obtained by forming a negative electrode active material layer on a surface of a collector may be stacked such that the positive electrode active material layer of the positive electrode of the present invention and the negative electrode active material layer of the negative electrode face each other and the electrolyte layer is inserted between the positive electrode active material layer of the positive electrode of the present invention and the negative electrode active material layer. Furthermore, in the non-aqueous electrolyte secondary battery of the present invention, the positive electrode for a non-aqueous electrolyte secondary battery of the present invention, an electrolyte layer containing an electrolyte, and the negative electrode for a non-aqueous electrolyte secondary battery of the present invention may be stacked such that the positive electrode active material layer of the positive electrode of the present invention and the negative electrode active material layer of the negative electrode of the present invention face each other and the electrolyte layer is inserted between the positive electrode active material of the positive electrode of the present invention and the negative electrode active material layer of the negative electrode of the present invention.

The electrolyte layer for the non-aqueous electrolyte secondary battery of the present invention is not limited as long as the object and effects of the present invention are not impaired. Accordingly, as the electrolyte layer, for example, a liquid electrolyte, i.e., a solution prepared, for example, by dissolving a lithium salt in an organic solvent, may be used. However, in the case of using such a liquid electrolyte, a separator composed of a porous layer is preferably used in general so as to prevent direct contact between the positive electrode active material layer and the negative electrode active material layer.

As the organic solvent for the liquid electrolyte, for example, ethylene carbonate (EC), diethyl carbonate (DEC), propylene carbonate (PC), dimethyl carbonate (DMC), and ethyl methyl carbonate (EMC) may be used. One of these organic solvents may be used alone, or two or more thereof may be used in combination. As the lithium salt for the liquid electrolyte, for example, $LiPF_6$, $LiClO_4$, $LiN(CF_3SO_2)_2$, and $LiBF_4$ can be used. One of these lithium salts may be used alone, or two or more thereof may be used in combination.

Incidentally, a solid electrolyte may also be used for the electrolyte layer and in this case, a separate spacer can be omitted.

EXAMPLES

The present invention is described more specifically below by referring to Examples, but the present invention is not limited thereto.
<First Aspect of the Present Invention>
Various measurements and analyses in Examples were performed according to the following methods.
(1) Measurements of Fiber Diameter and Fiber Length of Precursor Molded Body and Ultrafine Fibrous Carbons and Confirmation of Shape of Other Carbon-Based Electroconductive Agents Observation and photographing were performed using a scanning electron microscope (S-2400, manufactured by Hitachi, Ltd.). As for the average fiber diameter of the ultrafine fibrous carbon, etc., the fiber diameter was measured at 20 portions randomly selected on the obtained electron micrograph, and the average value of all measurement results (n=20) was defined as the average fiber diameter. The average fiber length was calculated in the same manner.
(2) X-Ray Diffraction Measurement of Ultrafine Fibrous Carbon In the X-ray diffraction measurement, the lattice spacing (d002) and the crystallite size (Lc002) were measured in conformity with JIS R7651 Method by using RINT-2100, manufactured by Rigaku Corporation.
(3) Tensile Test of Electrode Material The electrode was cut into a width of 1 cm and evaluated for the mechanical strength by performing a tensile test by a universal tensile tester (INSTRON 5500R, manufactured by Instron Japan Co., Ltd.). Test conditions were a grip length of 5 cm and a tensile speed of 1 mm/min, and evaluation was performed by comparing the stress applied at 0.2% (0.1 mm) elongation. In performing the tensile test of each electrode, the test was performed in each of the coating direction (MD) when coating the slurry at the time of manufacture of the electrode and the in-plane direction perpendicular to the coating direction (TD direction) (n=5), and the tensile strength $\sigma_M$ in the MD direction and the tensile strength $\sigma_T$ in the TD direction were determined by taking an average value of all results.
<Production of Ultrafine Fibrous Carbon>

90 Parts by mass of high-density polyethylene (HI-ZEX (registered trademark) 5000SR, produced by Prime Polymer Co., Ltd.; melt viscosity at 350° C. and 600 $s^{-1}$: 14 Pa·s) as a thermoplastic resin and 10 parts by mass of synthetic mesophase pitch AR•MPH (produced by Mitsubishi Gas Chemical Company, Inc.) as a thermoplastic carbon precursor were melt kneaded by a same-direction twin-screw extruder ("TEM-26SS", manufactured by Toshiba Machine Co., Ltd., barrel temperature: 310° C., under nitrogen stream) to prepare a resin composition.

The resin composition above was spun from a spinneret at 390° C. by a cylinder-type single-hole spinning machine to make a precursor molded body (a sea-island type composite fiber containing the thermoplastic carbon precursor as an island component). The fiber diameter of the precursor molded body was 300 μm. Subsequently, the precursor molded body was held at 215° C. for 3 hours in air by a hot-air drier to obtain a stabilized precursor molded body.

In a vacuum gas displacement furnace, the stabilized precursor molded body was then subjected to nitrogen purging, depressurization to 1 kPa and temperature elevation to 500° C. at a temperature rise rate of 5° C./min in the depressurized state and held at 500° C. for 1 hour to remove the thermoplastic resin and form a fibrous carbon precursor. The fibrous carbon precursor was added to ion-exchanged water and pulverized by means of a mixer for 2 minutes to manufacture a preliminary dispersion liquid having dispersed therein ultrafine fibrous carbons precursor at a concentration of 0.1 wt %. The preliminary dispersion liquid was treated using a wet jet mill (Star Burst Labo HJP-17007, manufactured by Sugino Machine Limited, chamber used: single nozzle chamber) under the conditions of a nozzle diameter of 0.17 mm and a treatment pressure of 100 MPa and by repeating the treatment 10 times, a dispersion liquid of a fibrous carbon precursor was manufactured. The obtained solvent liquid was filtered to manufacture a nonwoven fabric having dispersed therein a fibrous carbon precursor.

Figure 10:
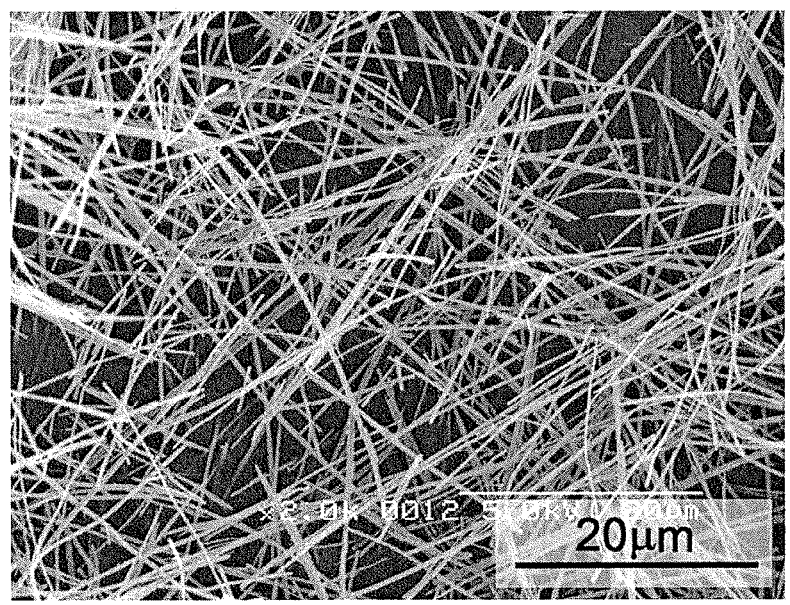
FIG. 10 is a scanning electron microscope image (2,000 times magnification) of the ultrafine fibrous carbons used in Reference Example A1, Example A3 and Example A4 (CNF).

The nonwoven fabric having dispersed therein a fibrous carbon precursor was subjected to temperature elevation from room temperature to 3,000° C. over 3 hours in an argon gas atmosphere to manufacture ultrafine fibrous carbons. The average fiber diameter of the obtained ultrafine fibrous carbons was 300 nm, the average fiber length was 16 µm, and a branching structure was not observed, in other words, a linear structure was confirmed. In addition, the average interplanar spacing d002 of (002) plane as measured by an X-ray diffraction method was 0.3375 nm. FIG. 10 shows a scanning electron micrograph (2,000 times magnification) of the ultrafine fibrous carbons (CNF) produced.

Reference Example A1

<Manufacture of Electrode Active Material Layer>

A slurry was manufactured by using 4 parts by mass of the ultrafine fibrous carbons (carbon-based electroconductive agent) (CNF) produced as above, 81 parts by mass of a negative electrode active material (artificial graphite; MCMB, produced by Osaka Gas Chemicals Co., Ltd.), 15 parts by mass of polyvinylidene fluoride (produced by Kureha Corporation) as a binder, and N-methylpyrrolidone as a solution. The manufactured slurry was coated on a glass plate and dried and thereafter, the electrode active material layer was separated from the glass substrate and roll-pressed (50 kg/cm², 5 cm/min) to manufacture an electrode active material layer.

<Tensile Test of Evaluated Electrode Material and Results>

Figure 2:
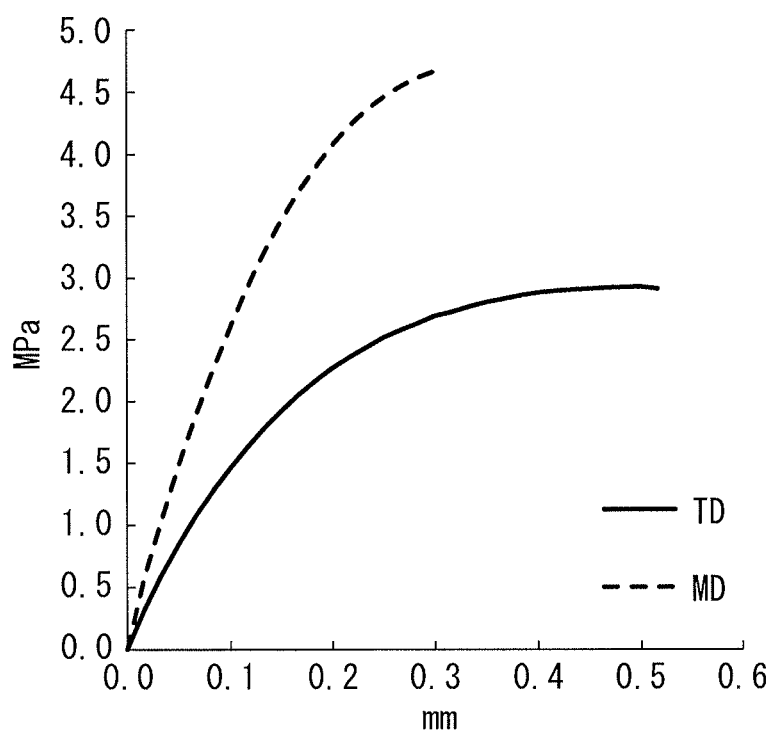
FIG. 2 is a stress-strain curve showing the tensile test results of the electrode active material layer for evaluation manufactured in Reference Example A1 (CNF).

The tensile strength of the electrode active material layer manufactured as above was evaluated and found to be 2.6 MPa in the MD direction and 1.5 MPa in the TD direction, and thus, $\sigma_M/\sigma_T$=1.7, revealing a reinforcement effect having anisotropy. FIG. 2 shows a stress-strain curve obtained as a result of the tensile test.

In the ultrafine fibrous carbons used in Reference Example A1, the ratio of the fiber length to the fiber diameter is large. Therefore, the ultrafine fibrous carbons tend to be aligned in the MD direction at the time of coating of the slurry, and a large reinforcement effect was exhibited in the MD direction.

Example A2

<Manufacture of Electrode Active Material Layer>

Figure 11:
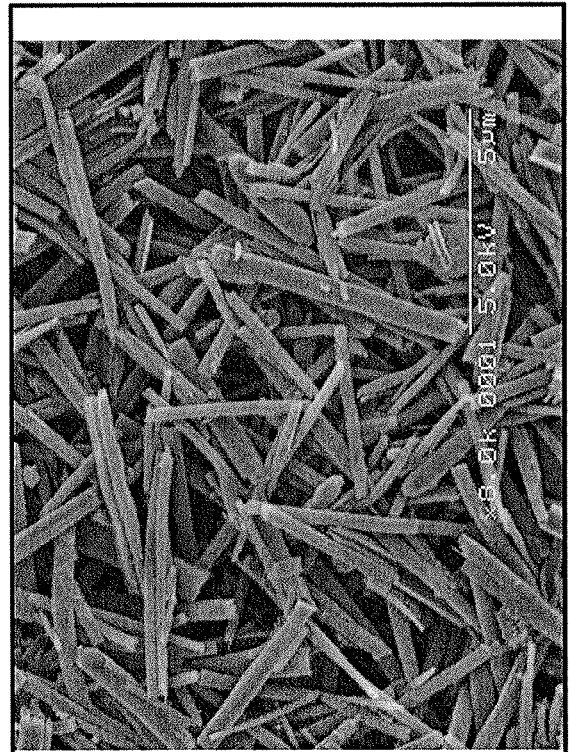
FIG. 11 is a scanning electron microscope image ((a) 2,000 times or (b) 8,000 times magnification) of the ultrafine fibrous carbons used in Example A2 and Example A3 (S-CNF).
Figure 11:
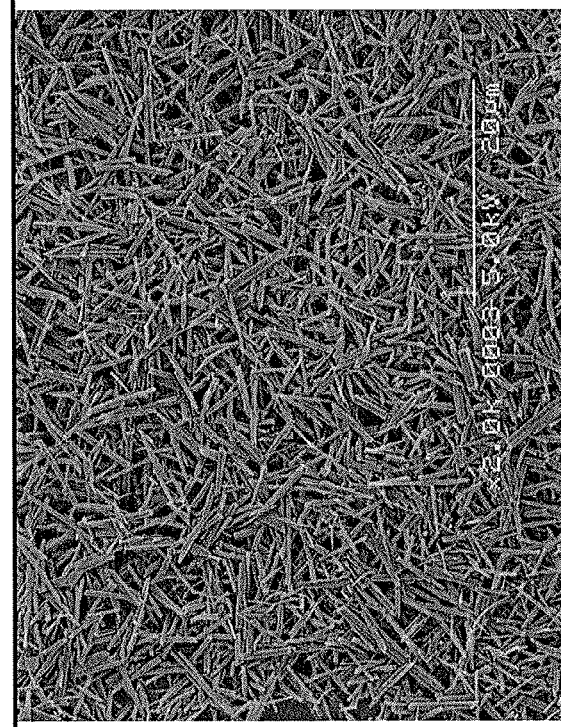

An electrode active material layer was manufactured by performing the operation in the same manner as in Reference Example A1, except that the ultrafine fibrous carbons used in Reference Example A1 was pulverized (Star Burst, manufactured by Sugino Machine Limited) and used as ultrafine fibrous carbons having an average fiber length of 5 µm. FIG. 11 shows a scanning electron micrograph ((a) 2,000 times or (b) 8,000 times magnification) of the ultrafine fibrous carbons having an average fiber length of 5 µm (S-CNF).

<Tensile Test of Evaluated Electrode Active Material Layer and Results>

Figure 3:
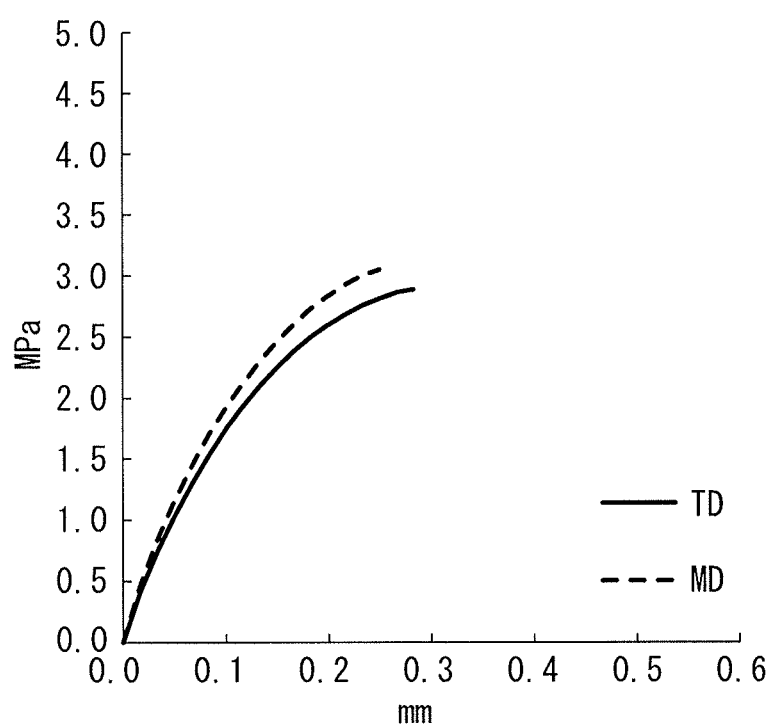
FIG. 3 is a stress-strain curve showing the tensile test results of the electrode active material layer for evaluation manufactured in Example A2 (S-CNF).

The mechanical strength was evaluated by a tensile test and found to be 1.9 MPa in the MD direction and 1.7 MPa in the TD direction, and thus, $\sigma_M/\sigma_T$=1.1, revealing a reinforcement effect having no anisotropy. FIG. 3 shows a stress-strain curve obtained as a result of the tensile test.

In the ultrafine fibrous carbons used in Example A2, the fiber length is shorter than that of the ultrafine fibrous carbons of Reference Example A1 and in turn, the ratio of the fiber length to the fiber diameter is relatively small. Therefore, the ultrafine fibrous carbons are less likely to be aligned in the slurry coating direction and there is little anisotropy in the tensile strength. As a result, a reinforcement effect was exhibited not only in the MD direction but also in the TD direction.

Example A3

<Manufacture of Electrode Active Material Layer>

Figure 13:
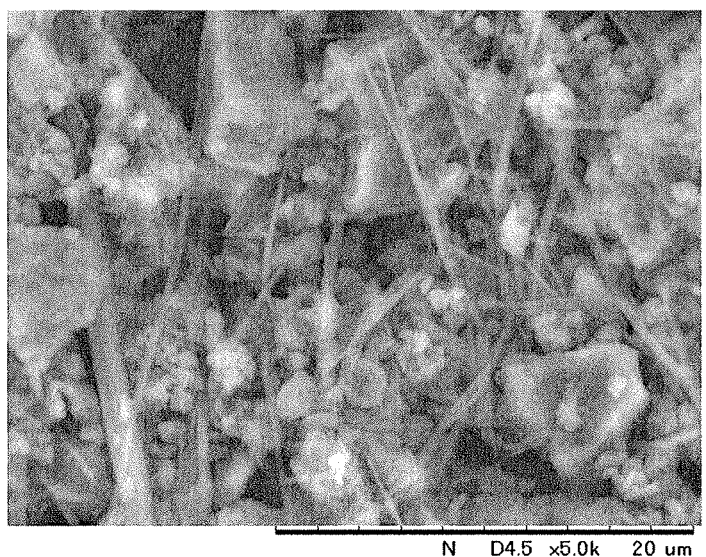
FIG. 13 is a scanning electron microscope image ((a) 5,000 times or (b) 8,000 times magnification) of the electrode active material layer manufactured in Example A3 (CNF/S-CNF).
Figure 13:
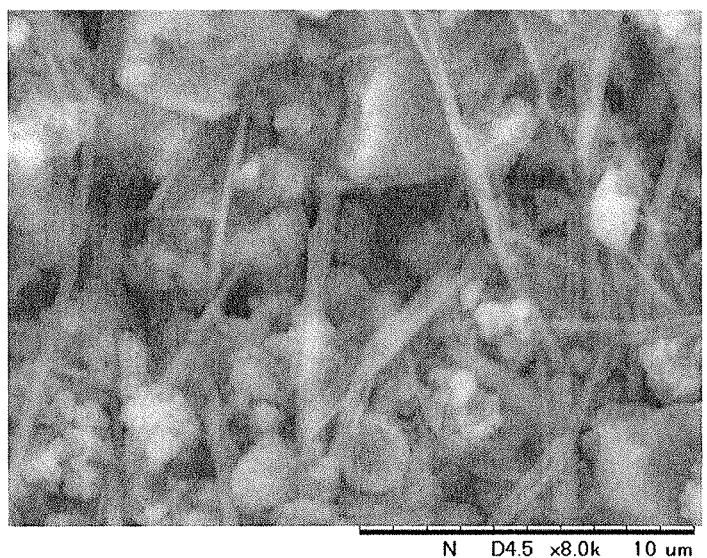

An electrode active material layer was manufactured by performing the operation in the same manner as in Reference Example A1, except that 2 parts by mass of the ultrafine fibrous carbons used in Reference Example A1 and 2 parts by mass of the ultrafine fibrous carbons used in Example A2 were used as the carbon-based electroconductive agent. FIG. 13 shows a scanning electron micrograph ((a) 5,000 times or (b) 8,000 times magnification) of the electrode active material layer manufactured. As evident from FIG. 13, it was confirmed that both the ultrafine fibrous carbons (CNF) used in Reference Example A1 and the ultrafine fibrous carbons (S-CNF) used in Example A2 are present.

<Tensile Test of Evaluated Electrode Active Material Layer and Results>

Figure 4:
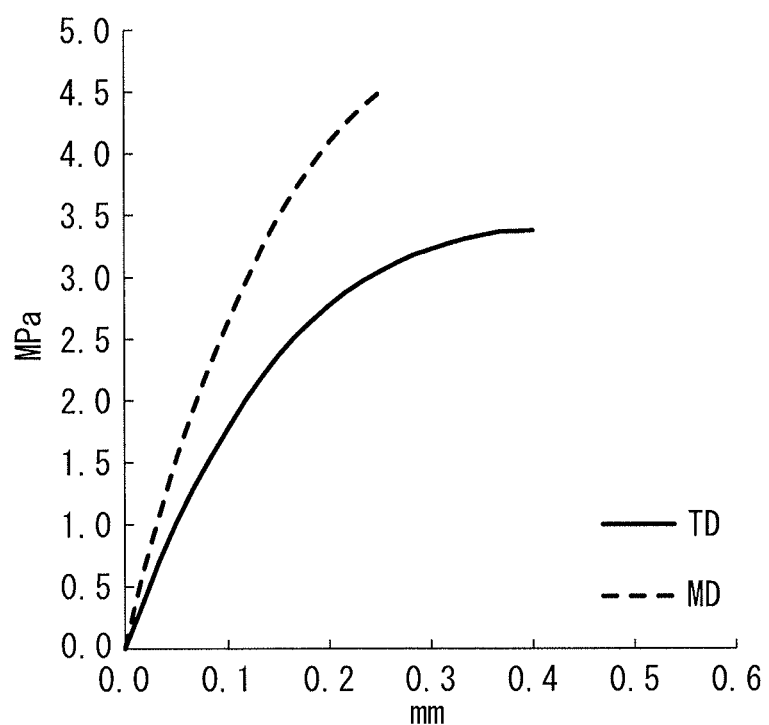
FIG. 4 is a stress-strain curve showing the tensile test results of the electrode active material layer for evaluation manufactured in Example A3 (CNF/S-CNF).

The mechanical strength was evaluated by a tensile test and found to be 2.6 MPa in the MD direction and 1.8 MPa in the TD direction, and thus, $\sigma_M/\sigma_T$=1.5, revealing a reinforcement effect having little anisotropy. FIG. 4 shows a stress-strain curve obtained as a result of the tensile test.

A reinforcement effect was exhibited in both the MD and TD directions by combining the ultrafine fibrous carbons used in Reference Example A1, which tends to be aligned in the MD direction at the time of coating of the slurry, with the ultrafine fibrous carbons used in Example A2, which is less likely to be aligned in the MD direction.

Example A4

<Manufacture of Electrode Active Material Layer>

Figure 12:
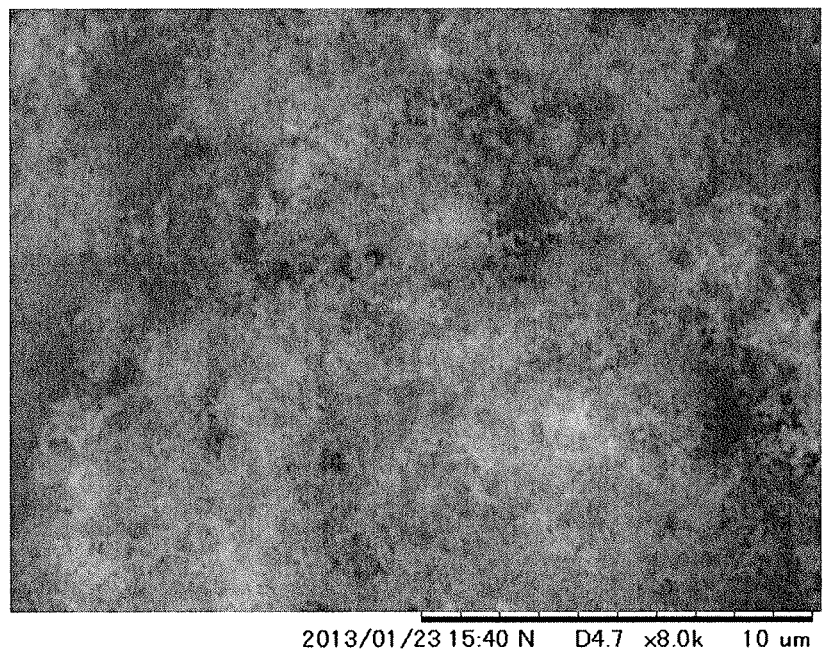
FIG. 12 is a scanning electron microscope image (8,000 times magnification) of acetylene black used in Example A4 (AB).
Figure 14:
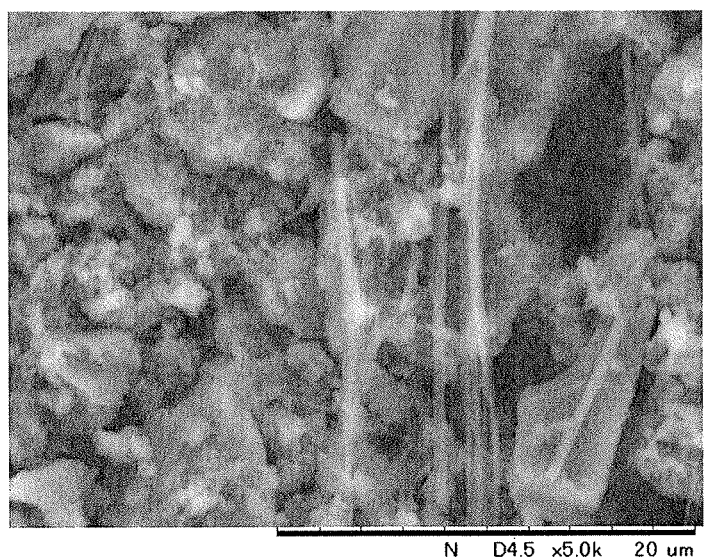
FIG. 14 is a scanning electron microscope image ((a) 5,000 times or (b) 8,000 times magnification) of the electrode active material layer manufactured in Example A4 (CNF/AB).
Figure 14:
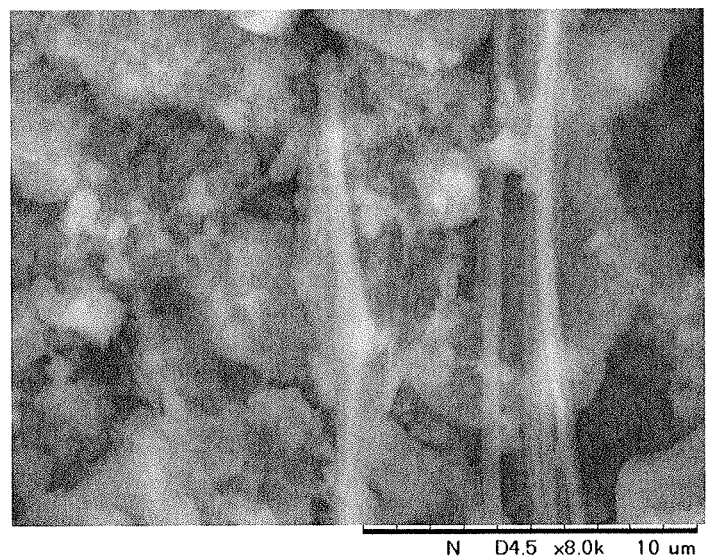

An electrode active material layer was manufactured by performing the operation in the same manner as in Reference Example A1, except that 2 parts by mass of the ultrafine fibrous carbons used in Reference Example A1 and 2 parts by mass of acetylene black (AB) (DENKA BLACK, produced by Denki Kagaku Kogyo Kabushiki Kaisha) were used as the carbon-based electroconductive agent. FIG. 12 shows a scanning electron micrograph (8,000 times magnification) of acetylene black (AB) used. In addition, FIG. 14 shows a scanning electron micrograph ((a) 5,000 times or (b) 8,000 times magnification) of the electrode active material layer manufactured. As evident from FIG. 14, it was confirmed that both the ultrafine fibrous carbons (CNF) used in Reference Example A1 and acetylene black (AB) are present.

<Tensile Test of Evaluated Electrode Active Material Layer and Results>

Figure 5:
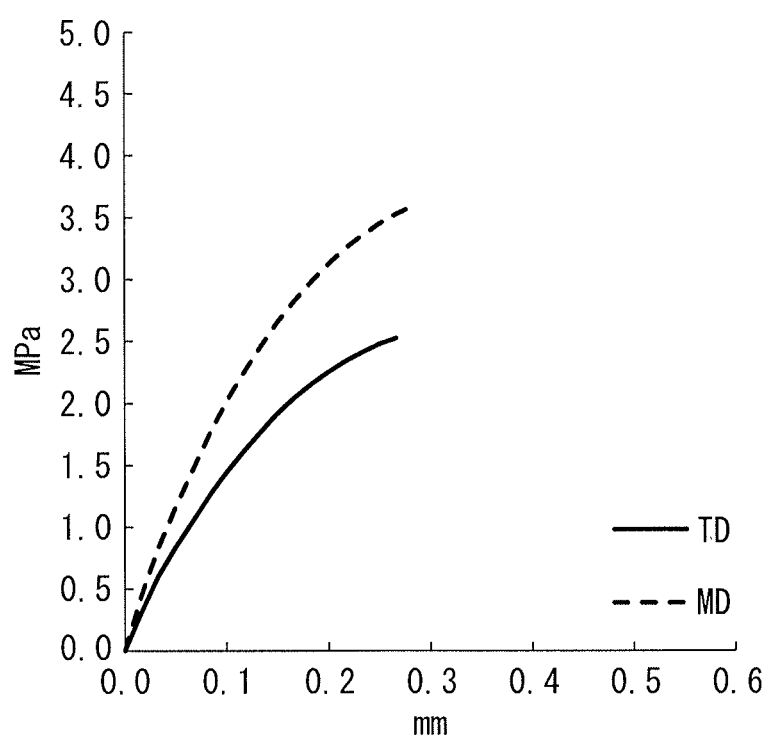
FIG. 5 is a stress-strain curve showing the tensile test results of the electrode active material layer for evaluation manufactured in Example A4 (CNF/AB).

The mechanical strength was evaluated by a tensile test and found to be 2.0 MPa in the MD direction and 1.4 MPa in the TD direction, and thus, $\sigma_M/\sigma_T$=1.4, revealing a reinforcement effect having little anisotropy. FIG. 5 shows a stress-strain curve obtained as a result of the tensile test.

Since the ultrafine fibrous carbons used in Reference Example A1 is used, the ultrafine fibrous carbons tends to be aligned in the MD direction at the time of coating of the slurry, and a large reinforcement effect was exhibited in the MD direction.

Comparative Example A1

<Manufacture of Electrode Active Material Layer>

An electrode active material layer was manufactured by performing the operation in the same manner as in Reference Example A1, except that a vapor grown carbon fiber (carbon fiber having a branching structure) (VGCF) was used in place of the ultrafine fibrous carbons used in Reference Example A1.

<Tensile Test of Evaluated Electrode Active Material Layer and Results>

Figure 6:
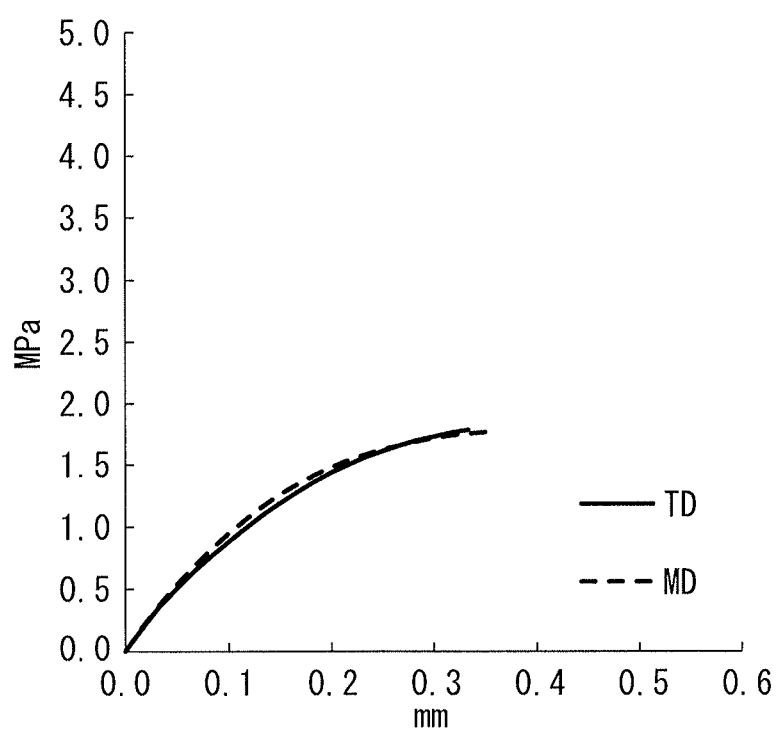
FIG. 6 is a tress-strain curve showing the tensile test results of the electrode active material layer for evaluation manufactured in Comparative Example A1 (VGCF).

The mechanical strength was evaluated by a tensile test and found to be 0.96 MPa in the MD direction and 0.90 MPa in the TD direction, revealing a poor reinforcement effect irrespective of the MD direction or the TD direction. FIG. 6 shows a stress-strain curve obtained as a result of the tensile test.

Comparative Example A2

<Manufacture of Electrode Active Material Layer>

An electrode active material layer was manufactured by performing the operation in the same manner as in Reference Example A1, except that acetylene black (AB) (DENKA BLACK, produced by Denki Kagaku Kogyo Kabushiki Kaisha) was used in place of the ultrafine fibrous carbons used in Reference Example A1.

<Tensile Test of Evaluated Electrode Active Material Layer and Results>

Figure 7:
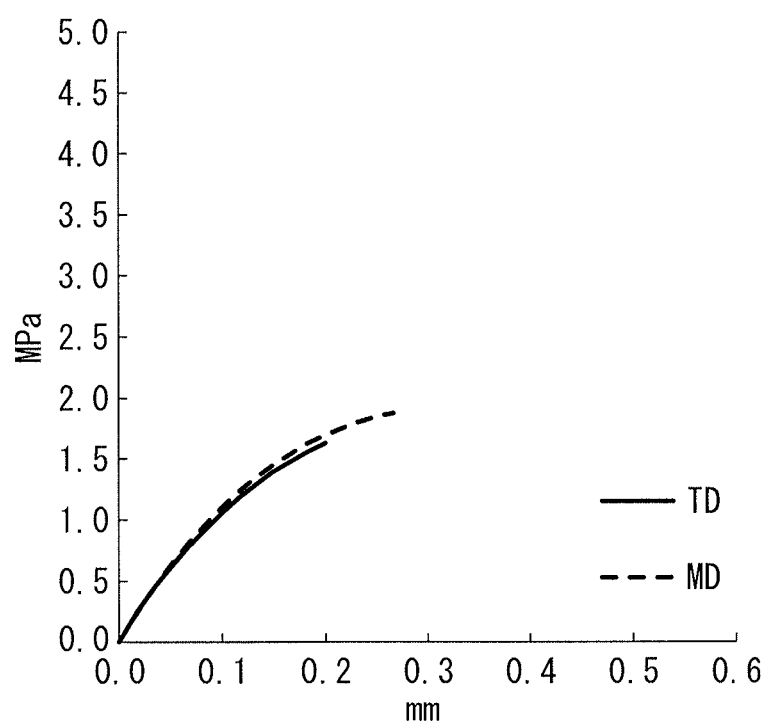
FIG. 7 is a stress-strain curve showing the tensile test results of the electrode active material layer for evaluation manufactured in Comparative Example A2 (AB).

The mechanical strength was evaluated by a tensile test and found to be 1.1 MPa in the MD direction and 1.1 MPa in the TD direction, revealing a poor reinforcement effect irrespective of the direction. FIG. 7 shows a stress-strain curve obtained as a result of the tensile test.

Figure 8:
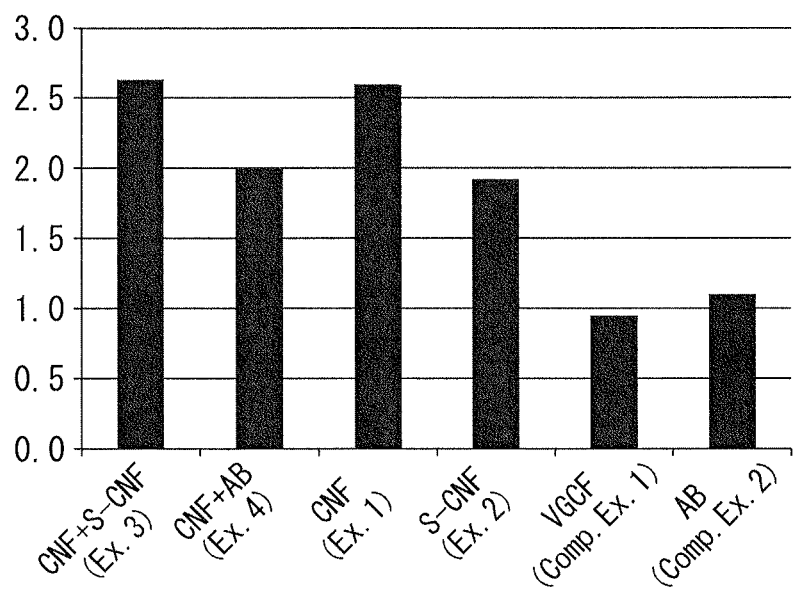
FIG. 8 is a view showing the results of the stress (MPa) in the MD direction (the coating direction for coating the electrode material (slurry) at the time of manufacture of the electrode) applied at 0.2% (0.1 mm) elongation of the electrode material layers manufactured in Reference Example A1, Examples A2 to A4 and Comparative Examples A1 and A2.

FIGS. 7 and 8 show the results (MD direction and TD direction) of the stress (MPa) applied at 0.2% (0.1 mm) elongation of the electrode material layers manufactured in Reference Example A1, Examples A2 to A4 and Comparative Examples A1 and A2. In addition, specific values (MD direction and TD direction) of the stress (MPa) applied at 0.2% (0.1 mm) elongation of the electrode material layers manufactured in Reference Example A1, Examples A2 to A4 and Comparative Examples A1 and A2 are shown in Table 1 below.

TABLE 1

Table A1:

| | Electroconductive agent (mass %) | | | | Stress at 0.2% (0.1 mm) Elongation (MPa) | | |
|---|---|---|---|---|---|---|---|
| | CNF | S-CNF | AB | VGCF | TD | MD | MD/TD |
| Reference Example A1 | 4 | | | | 1.5 | 2.6 | 1.7 |
| Example A2 | | 4 | | | 1.7 | 1.9 | 1.1 |
| Example A3 | 2 | 2 | | | 1.8 | 2.6 | 1.4 |
| Example A4 | 2 | | 2 | | 1.4 | 2.0 | 1.4 |
| Comparative Example A1 | | | | 4 | 0.9 | 0.96 | 1.1 |
| Comparative Example A2 | | | 4 | | 1.1 | 1.1 | 1.0 |

Since the electrode for a non-electrolyte secondary battery according to the present invention is composed of the electrode active material layer according to the present invention and a collector, the mechanical strength of the electrode for a non-electrolyte secondary battery according to the present invention is understood to produce the same effect as the mechanical strength based on the results obtained with the electrode material for a non-electrolyte secondary battery according to the present invention.

Figure 9:
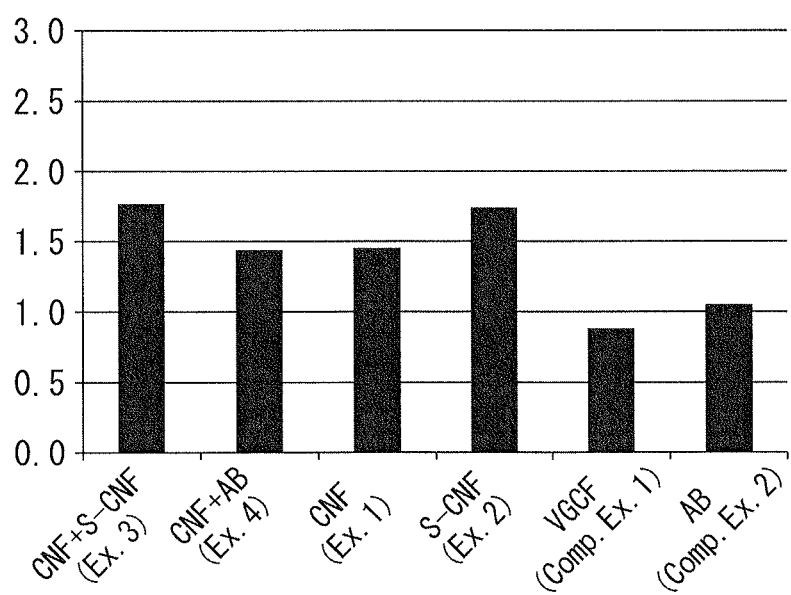
FIG. 9 is a view showing the results of the stress (MPa) in the TD direction (the in-plane direction perpendicular to the coating direction for coating the electrode material (slurry) at the time of manufacture of the electrode) applied at 0.2% (0.1 mm) elongation of the electrode material layers manufactured in Reference Example A1, Examples A2 to A4 and Comparative Examples A1 and A2.

The results in the MD direction (the coating direction for coating the electrode material (slurry) at the time of manufacture of the electrode) of the stress (MPa) applied at 0.2% (0.1 mm) elongation of the electrode material layers manufactured in Reference Example A1, Examples A2 to A4 and Comparative Examples A1 and A2 are shown together in FIG. 8. In addition, the results in the TD direction (the in-plane direction perpendicular to the coating direction for coating the electrode material (slurry) at the time of manufacture of the electrode) of the stress (MPa) applied at 0.2% (0.1 mm) elongation of the electrode material layers manufactured in Reference Example A1, Examples A2 to A4 and Comparative Examples A1 and A2 are shown together in FIG. 9.

Example A5

<Manufacture of Negative Electrode>

A slurry was manufactured by using 2 parts by mass of the ultrafine fibrous carbons (S-CNF) having an average fiber length of 5 μm produced in Example A2, 91 parts by mass of a negative electrode active material (scaly graphite; trade name: MAGD, produced by Hitachi Chemical Company, Ltd.), 7 parts by mass of polyvinylidene fluoride (produced by Kureha Corporation) as a binder, and N-methylpyrrolidone as a solution. The manufactured slurry was coated, dried and roll-pressed to manufacture a negative electrode. The electrode thickness was 75 μm, and the electrode density was 1.5 g/cm$^3$.

The tensile strength of the negative electrode manufactured as above was evaluated and found to be 1.5 MPa in the MD direction and 1.4 MPa in the TD direction, and thus, $\sigma_M/\sigma_T$=1.1, revealing a reinforcement effect having little anisotropy.

<Manufacture of Positive Electrode>

A slurry was manufactured by using 89 parts by mass of lithium cobaltate (LiCoO$_2$, produced by Nippon Chemical Industrial Co., Ltd.), 6 parts by mass of polyvinylidene fluoride as a binder, acetylene black (trade name: DENKA BLACK, produced by Denki Kagaku Kogyo Kabushiki Kaisha) as an electrically conductive material, and N-methylpyrrolidone as a solution. The manufactured slurry was coated, dried and roll-pressed to manufacture a positive electrode. The electrode thickness was 82 μm, and the electrode density was 3.0 g/cm$^3$.

<Fabrication of Cell>

A single-layer laminate cell was fabricated by using the positive and negative electrodes prepared as above and a porous polyethylene film for the separator and injecting an electrolytic solution composed of an ethylene carbonate/ethyl methyl carbonate mixed solution (3/7 by mass, produced by Kishida Chemical Co., Ltd.) containing LiPF$_6$ at a concentration of 1 mol/L, into a cell.

<Evaluation of Cycle Characteristics>

The battery performance of the lithium ion secondary battery manufactured by the procedure above was evaluated as follows.

[Charge/Discharge Conditions]

Using the cell fabricated as above, a charge/discharge test was performed by a charging/discharging device. The charge conditions were 0.2 C constant-current charge until 4.2 V, then constant-voltage charge (0.02 C cut-off) and after a pause for 10 minutes, switchover to discharge. The discharge conditions were 0.2 C constant-current discharge until 2.75 V.

As a result of evaluation, the capacity maintenance ratio at 50th cycle was 92.0%, revealing good cycle characteristics.

Example A6

An electrode and a lithium ion secondary battery were produced in the same manner as in Example A5, except that a mixture of the ultrafine fibrous carbons (CNF) manufactured above and S-CNF (mass ratio: 1:1) was used in place of S-CNF of Example A5.

The tensile strength of the negative electrode manufactured as above was evaluated and found to be 1.8 MPa in the MD direction and 1.4 MPa in the TD direction, and thus, $\sigma_M/\sigma_T=1.3$, revealing a reinforcement effect having little anisotropy.

The cycle characteristics of the battery manufactured as above was evaluated, as a result, the capacity maintenance ratio at 50th cycle was 92.5%, revealing good cycle characteristics.

Example A7

An electrode and a lithium ion secondary battery were produced in the same manner as in Example A5, except that a mixture of the ultrafine fibrous carbons (CNF) manufactured above and acetylene black (AB) (DENKA BLACK, produced by Denki Kagaku Kogyo Kabushiki Kaisha) (mass ratio: 1:1) was used in place of S-CNF of Example A5.

The tensile strength of the negative electrode manufactured as above was evaluated and found to be 1.5 MPa in the MD direction and 1.2 MPa in the TD direction, and thus, $\sigma_M/\sigma_T=1.3$, revealing a reinforcement effect having little anisotropy.

The cycle characteristics of the battery manufactured as above was evaluated, as a result, the capacity maintenance ratio at 50th cycle was 91.5%, revealing good cycle characteristics.

Comparative Example A3

An electrode and a lithium ion secondary battery were produced in the same manner as in Example A5, except that a vapor grown carbon fiber (carbon fiber having a branching structure) was used in place of S-CNF of Example A5.

The cycle characteristics of the battery manufactured as above was evaluated, as a result, the capacity maintenance ratio at 50th cycle was 90.7%, revealing poor cycle characteristics.

Comparative Example A4

An electrode and a lithium ion secondary battery were produced in the same manner as in Example A5, except that acetylene black (AB) (DENKA BLACK, produced by Denki Kagaku Kogyo Kabushiki Kaisha) was used in place of S-CNF of Example A5.

The cycle characteristics of the battery manufactured as above was evaluated, as a result, the capacity maintenance ratio at 50th cycle was 89.5%, revealing poor cycle characteristics.

The results of Examples A5 to A7 and Comparative Examples A3 and A4 are shown together in Table A1 below.

TABLE 2

Table A2:

| | Electroconductive agent (mass %) | | | | Stress at 0.2% (0.1 mm) Elongation (MPa) | | | Capacity Maintenance Ratio (%) |
|---|---|---|---|---|---|---|---|---|
| | CNF | S-CNF | AB | VGCF | TD | MD | MD/TD | |
| Example A5 | | 2 | | | 1.4 | 1.5 | 1.1 | 92.0 |
| Example A6 | 1 | 1 | | | 1.4 | 1.8 | 1.3 | 92.5 |
| Example A7 | 1 | | 1 | | 1.2 | 1.5 | 1.3 | 91.5 |
| Comparative Example A3 | | | | 4 | 0.90 | 0.96 | 1.1 | 90.7 |
| Comparative Example A4 | | | 4 | | 1.1 | 1.1 | 1.0 | 89.5 |

<Second Aspect of the Present Invention>

The second aspect of the present invention is described more specifically below by referring to Examples, but the present invention is not limited thereto.

Various measurements in Examples were performed according to the following methods.

The measurements of fiber diameter and fiber length of the ultrafine fibrous carbons and the X-ray diffraction measurement of ultrafine fibrous carbons were performed in the same manner as above.

Example B1

Example B1-1

<Production of Ultrafine Fibrous Carbon>

90 Parts by mass of high-density polyethylene (HI-ZEX (registered trademark) 5000SR, produced by Prime Polymer Co., Ltd.; melt viscosity at 350° C. and 600 $s^{-1}$: 14 Pa·s) as a thermoplastic resin and 10 parts by mass of synthetic mesophase pitch AR•MPH (produced by Mitsubishi Gas Chemical Company, Inc.) as a thermoplastic carbon precursor were melt kneaded by a same-direction twin-screw extruder ("TEM-26SS", manufactured by Toshiba Machine Co., Ltd., barrel temperature: 310° C., under nitrogen stream) to prepare a resin composition.

The resin composition above was spun from a spinneret at 390° C. by a cylinder-type single-hole spinning machine to make a precursor molded body (a sea-island type composite fiber containing the thermoplastic carbon precursor as an island component). The fiber diameter of the precursor molded body was 300 μm. Subsequently, the precursor molded body was held at 215° C. for 3 hours in air by a hot-air drier to obtain a stabilized precursor molded body.

In a vacuum gas displacement furnace, the stabilized precursor molded body was then subjected to nitrogen purging, depressurization to 1 kPa and temperature elevation to 500° C. at a temperature rise rate of 5° C./min in the depressurized state and held at 500° C. for 1 hour to remove the thermoplastic resin and form a fibrous carbon precursor. The fibrous carbon precursor was added to ion-exchanged water and pulverized by means of a mixer for 2 minutes to disperse the fibrous carbon precursor at a concentration of 0.1 mass %.

Figure 16:
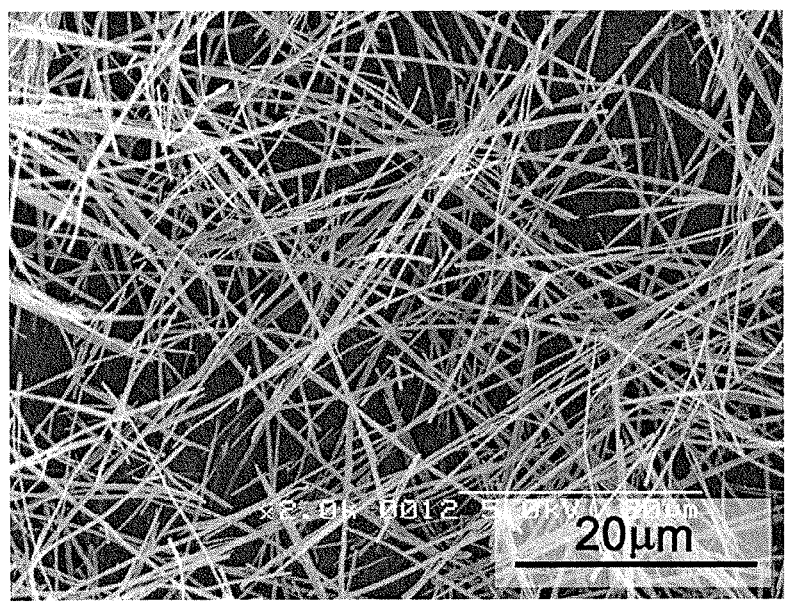
FIG. 16 is a scanning electron microscope image (2,000 times magnification) of the ultrafine fibrous carbons used in Example B1-1, Example B1-2 and Comparative Example B1-1 (CNF).

The dispersed fibrous carbon precursor was subjected to temperature elevation from room temperature to 3,000° C. over 3 hours in an argon gas atmosphere to manufacture ultrafine fibrous carbons. The average fiber diameter of the obtained ultrafine fibrous carbons was 300 nm, the average fiber length was 16 μm, and a branching structure was not observed, in other words, a linear structure was confirmed. In addition, the average interplanar spacing d002 of (002) plane as measured by an X-ray diffraction method was 0.3375 nm. FIG. 16 shows a scanning electron micrograph (2,000 times magnification) of the ultrafine fibrous carbons (CNF) produced.

<Wet Compounding>

1 Part by mass of the ultrafine fibrous carbons obtained above and 1 part by mass of acetylene black (DENKA BLACK 75% pressed product, produced by Denki Kagaku Kogyo Kabushiki Kaisha) were pulverized using an ethanol solution by means of a wet pulverizer (THINKY MIXER ARV-310, manufactured by Thinky Corporation) to obtain Composite 1-1 (20 g).

Example B1-2

<Production of Ultrafine Fibrous Carbon>

Ultrafine fibrous carbons was obtained by exactly the same production method as the production method of ultrafine fibrous carbons described in Example B1-1.

<Dry Compounding>

1 Part by mass of the ultrafine fibrous carbons produced as above and 1 part by mass of acetylene black (DENKA BLACK 75% pressed product, produced by Denki Kagaku Kogyo Kabushiki Kaisha) were pulverized by means of a dry jet mill (A-O Jet Mill, manufactured by Seishin Enterprise Co., Ltd.) to obtain Composite 1-2 (20 g).

Example B1-3

<Production of Ultrafine Fibrous Carbon>

Ultrafine fibrous carbons was obtained by exactly the same production method as the production method of ultrafine fibrous carbons described in Example B1-1.

<Compounding by Mechanical Milling>

1 Part by mass of the ultrafine fibrous carbons produced as above and 1 part by mass of acetylene black (DENKA BLACK 75% pressed product, produced by Denki Kagaku Kogyo Kabushiki Kaisha) were pulverized by means of a planetary ball mill apparatus (apparatus: P-7, manufactured by Fritsch Japan Co., Ltd., ball used: zirconia-made ball of 10 mm in diameter) to obtain Composite 1-3 (20 g).

Comparative Example B1-1

Ultrafine fibrous carbons was obtained (20 g) by exactly the same production method as the production method of ultrafine fibrous carbons described in Example B1-1.

Comparative Example B1-2

20 g of acetylene black (DENKA BLACK 75% pressed product, produced by Denki Kagaku Kogyo Kabushiki Kaisha) was prepared.

Example B2

Example B2-1

Figure 17:
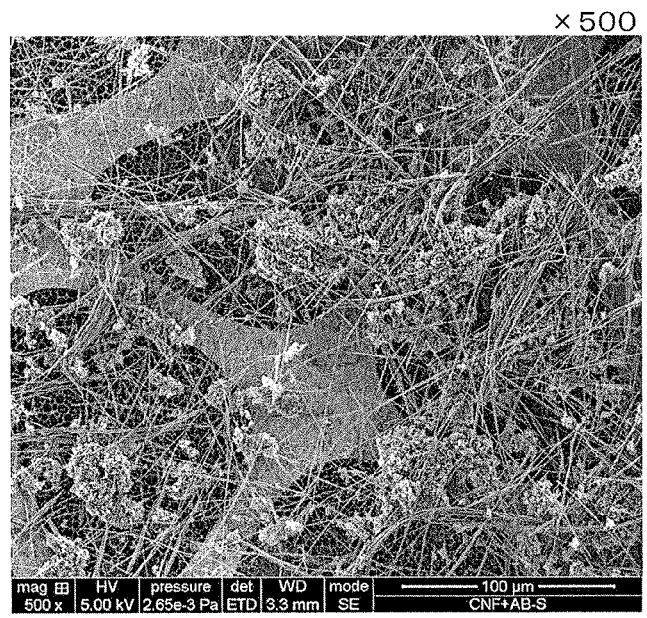
FIG. 17 is a photograph showing the observation results of a scanning electron microscope image (500 times magnification) of Composite 1-1 obtained in Example B1-1.
Figure 18:
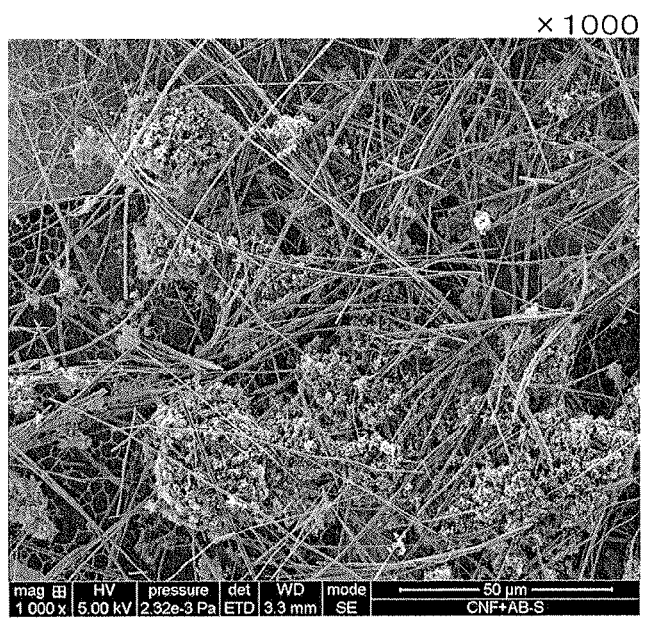
FIG. 18 is a photograph showing the observation results of a scanning electron microscope image (1,000 times magnification) of Composite 1-1 obtained in Example B1-1.

Observation and photographing of Composite 1-1 obtained in Example B1-1 were performed using a scanning electron microscope (S-2400, manufactured by Hitachi, Ltd.). FIG. 17 (photographing magnification ×500 times) and FIG. 18 (photographing magnification ×1,000 times) show the photographic results of photographing. As evident from FIGS. 17 and 18, although aggregated acetylene black is observed in parts, the shape of the ultrafine fibrous carbons is not changed, and the ultrafine fibrous carbons and acetylene black are dispersed together and present in such a manner that they are integrally attached to each other.

Example B2-2

Figure 19:
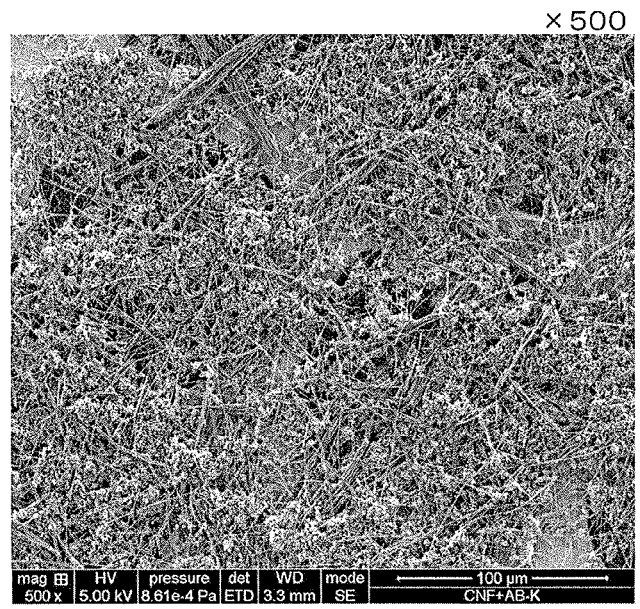
FIG. 19 is a photograph showing the observation results of a scanning electron microscope image (500 times magnification) of Composite 1-2 obtained in Example B1-2.
Figure 20:
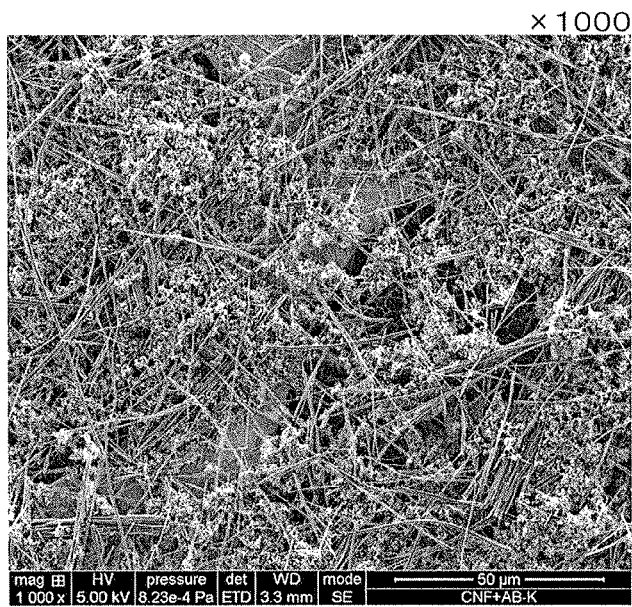
FIG. 20 is a photograph showing the observation results of a scanning electron microscope image (1,000 times magnification) of Composite 1-2 obtained in Example B1-2.

Observation and photographing of Composite 1-2 obtained in Example B1-2 were performed using a scanning electron microscope (S-2400, manufactured by Hitachi, Ltd.), similarly to Example B2-1. FIG. 19 (photographing magnification ×500 times) and FIG. 20 (photographing magnification ×1,000 times) show the photographic results of photographing. As evident from FIGS. 19 and 20, the shape of the ultrafine fibrous carbons is not changed, and the ultrafine fibrous carbons and acetylene black are uniformly mixed in such a manner that acetylene black is hybridized around the ultrafine fibrous carbon. It was confirmed that the ultrafine fibrous carbons and acetylene black are integrally attached to each other and uniformly mixed with each other.

Example B3

Example B3-1

Figure 21:
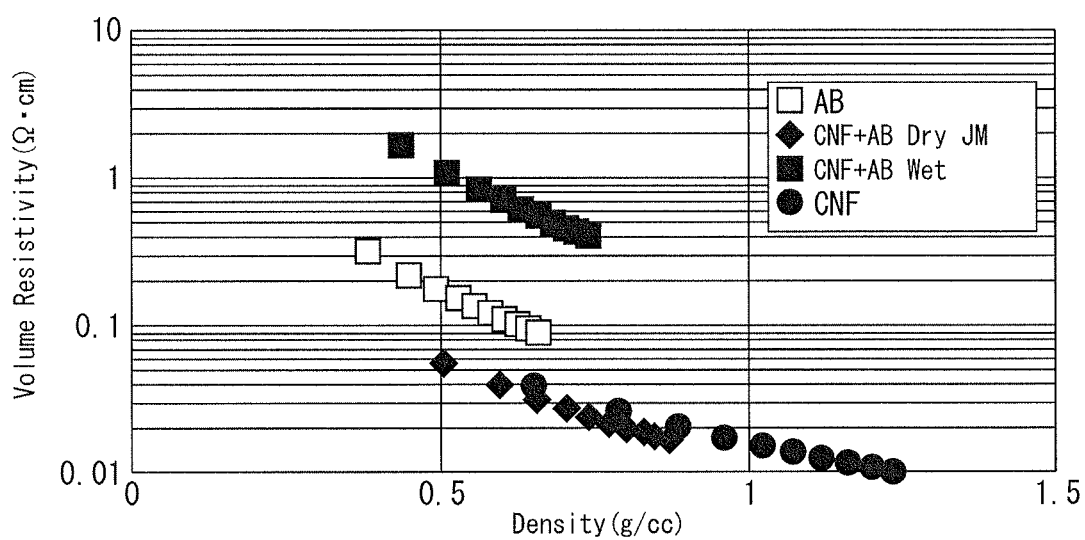
FIG. 21 is a view showing the results of the relationship between the density and the volume resistivity, obtained by performing Example B3 and Comparative Example B2.

The relationship between density and volume resistivity was examined using Composite 1-1 obtained in Example B1-1. In order to examine the relationship between density and volume resistivity, the density and the volume resistivity were measured using a four probe method (Loresta-GP, manufactured by Mitsubishi Chemical Analytech Co., Ltd.). A powder sample of Composite 1-1 was charged into Loresta-GP, and the volume resistivity was measured while decreasing the density value by crushing the powder from above at ordinary temperature to apply a pressure. FIG. 21 shows the measurement results. For example, when the density is 0.58 g/cc, the volume resistivity of Composite 1-1 was 0.7 Ω·cm.

Example B3-2

The relationship between density and volume resistivity was examined by exactly the same method as the method described in Example B3-1, except that Composite 1-1 obtained in Example B1-2 was used. FIG. 21 shows the measurement results. For example, when the density is 0.58 g/cc, the volume resistivity of Composite 1-2 was 0.05 Ω·cm.

Comparative Example B2-1

The relationship between density and volume resistivity was examined by exactly the same method as the method described in Example B3-1, except that the ultrafine fibrous carbons obtained in Comparative Example B1-1 was used. FIG. 21 shows the measurement results. For example, when the density is 0.58 g/cc, the volume resistivity of the ultrafine fibrous carbons (CNF) was 0.05 Ω·cm.

Comparative Example B2-2

The relationship between density and volume resistivity was examined by exactly the same method as the method described in Example B3-1, except that acetylene black prepared in Comparative Example B1-2 was used. FIG. 21 shows the measurement results. FIG. 21 shows the measurement results. For example, when the density is 0.58 g/cc, the volume resistivity of acetylene black was 0.12 Ω·cm.

<Relationship Between Density and Volume Resistivity>

Referring to FIG. 21, the volume resistivity of Composite 1-1 obtained in Example B1-1 showed a higher resistivity than the volume resistivity of acetylene black prepared in Comparative Example B1-2 but was at a practically problem-free level. The volume resistivity of Composite 1-2 obtained in Example B1-2 was substantially identical to or better than the volume resistivity of the ultrafine fibrous carbons obtained in Comparative Example B1-1 and showed a lower resistivity than the volume resistivity of acetylene black prepared in Comparative Example B1-2. From these, it can be understood that Composite 1-1 and Composite 1-2 have excellent electrical conductivity while maintaining excellent mechanical strength attributable to the ultrafine fibrous carbons (reinforcement effect).

Example B3-2

Evaluation of discharge rate characteristics was performed using Composite 1-2 obtained in Example B1-2.

<Production of Positive Electrode>

A slurry was manufactured by using 2 parts by mass of Composite 1-2 as an electroconductive agent, 91 parts by mass of carbon-coated LiFePO$_4$ (SLFP-ESO1, produced by Hohsen Corp.) as a positive electrode active material, 7 parts by mass of polyvinylidene fluoride as a binder, and N-methylpyrrolidone as a solution. The manufactured slurry was coated on an aluminum foil, dried and roll-pressed to manufacture a positive electrode. The electrode thickness was 35 μm, and the electrode density was 2.5 g/cm$^3$.

<Fabrication of Cell>

A half-cell for battery evaluation was fabricated by arranging the positive electrode manufactured as above to face a metallic lithium through a polyethylene porous separator and injecting an electrolytic solution composed of an ethylene carbonate/ethyl methyl carbonate mixed solution (3/7 by mass, produced by Kishida Chemical Co., Ltd.) containing LiPF$_6$ at a concentration of 1 mol/L, into a 2032 coin cell.

<Evaluation of Discharge Rate Characteristics>

Using the cell fabricated as above, a charge/discharge test was performed by a charging/discharging device. The charge conditions were 0.2 C constant-current charge until 4.0 V, then constant-voltage charge (0.01 C cut-off) and after a pause for 10 minutes, switchover to discharge. The discharge conditions were constant-current discharge at each discharge rate by setting the lower limit voltage to 2.5 V. The discharge rate was stepwise increased in order of 0.2 C→0.5 C→1.0 C→2.0 C→3.0 C→5.0 C.

Figure 22:
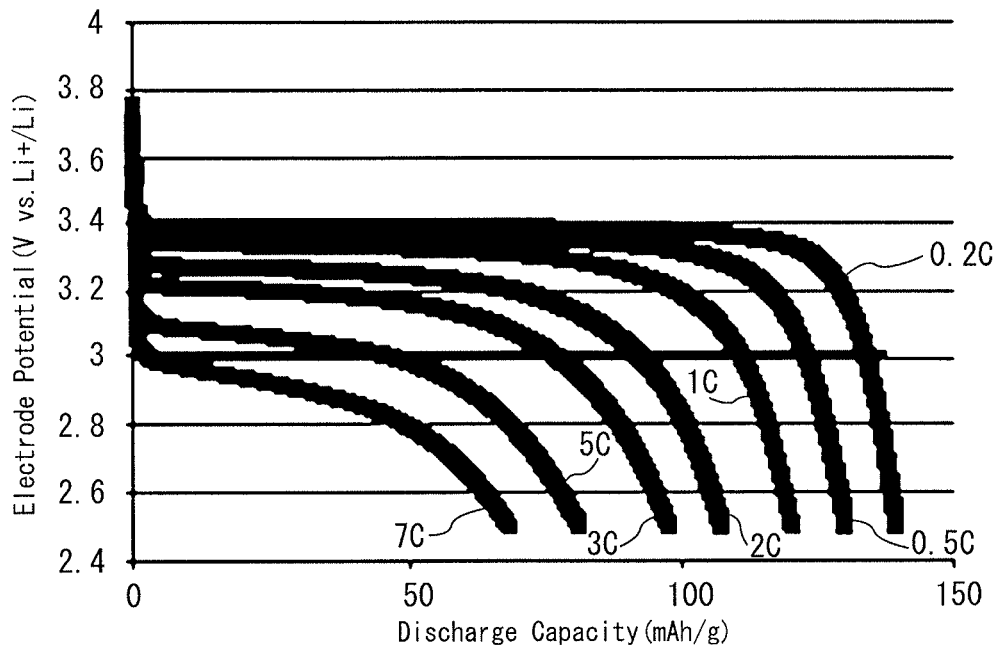
FIG. 22 is a chart of discharge rate characteristics of the cell manufactured in Example B3-2 (CNF/AB).

FIG. 22 shows a chart of the discharge rate characteristics measured. In addition, the capacity maintenance ratio at a cut-off electrode potential of 3 V (the 0.2 C discharge capacity is assumed to be 100%) is shown in Table B1 below.

Example B3-3

Evaluation of rate characteristics was performed in the same manner as in Example 3-2, except that Composite 1-3 obtained in Example B1-3 was used as the electroconductive agent.

Figure 23:
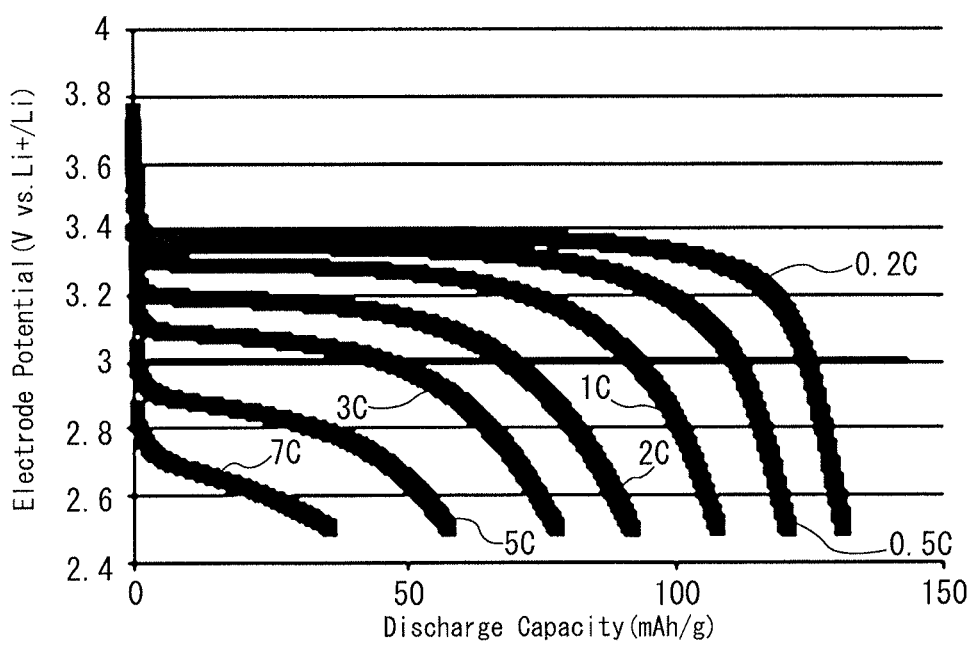
FIG. 23 is a chart of discharge rate characteristics of the cell manufactured in Example B3-3 (CNF/AB (ball mill)).

FIG. 23 shows a chart of the discharge rate characteristics measured. In addition, the capacity maintenance ratio at a cut-off electrode potential of 3 V (the 0.2 C discharge capacity is assumed to be 100%) is shown in Table B1 below.

Comparative Example B3-1

Evaluation of rate characteristics was performed in the same manner as in Example 3-2, except that the ultrafine fibrous carbons (CNF) obtained in Comparative Example B1-1 was used as the electroconductive agent.

Figure 24:
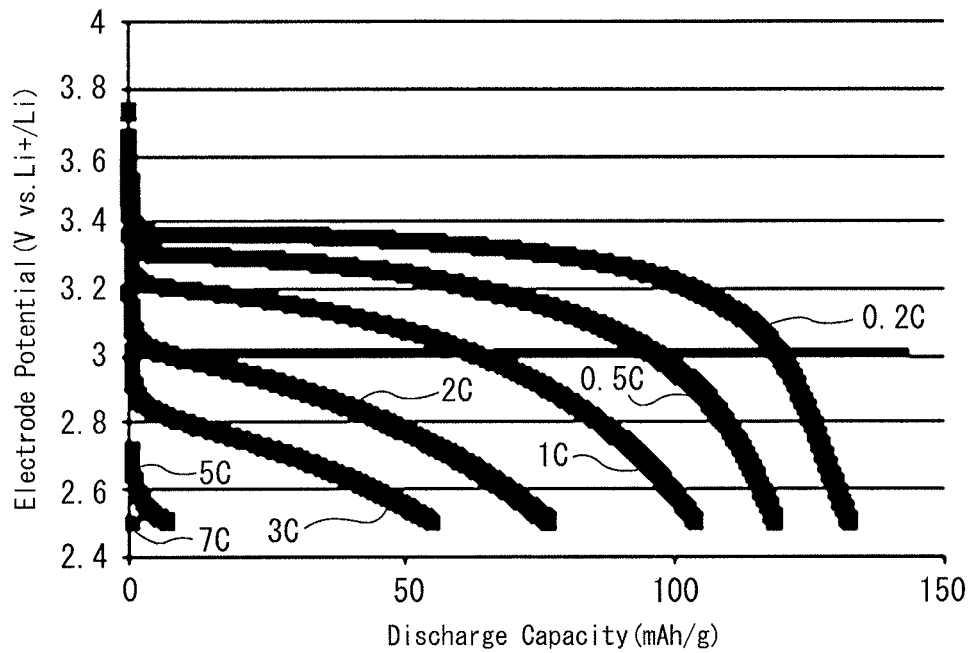
FIG. 24 is a chart of discharge rate characteristics of the cell manufactured in Comparative Example B3-1 (CNF).

FIG. 24 shows a chart of the discharge rate characteristics measured. In addition, the capacity maintenance ratio at a cut-off electrode potential of 3 V (the 0.2 C discharge capacity is assumed to be 100%) is shown in Table B1 below.

Comparative Example B3-2

Evaluation of rate characteristics was performed in the same manner as in Example 3-2, except that acetylene black used in Comparative Example B1-2 was used as the electroconductive agent.

Figure 25:
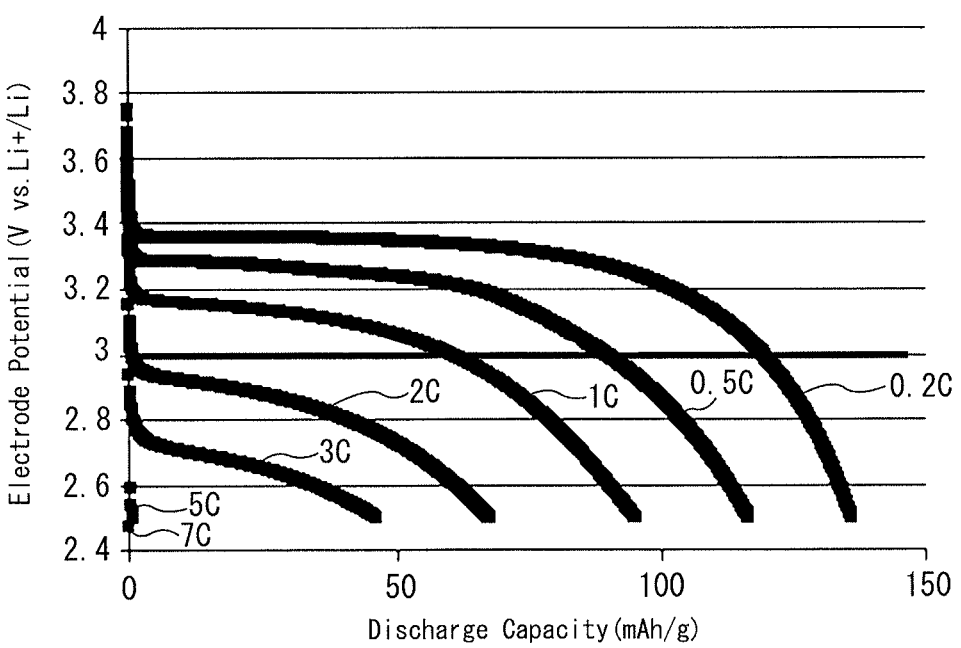
FIG. 25 is a chart of discharge rate characteristics of the cell manufactured in Comparative Example B3-2 (AB).

FIG. 25 shows a chart of the discharge rate characteristics measured. In addition, the capacity maintenance ratio at a cut-off electrode potential of 3 V (the 0.2 C discharge capacity is assumed to be 100%) is shown in Table B1 below.

TABLE 3

| Table B1: Capacity Maintenance Ratio at 3 V Cut-Off | | | | | | |
|---|---|---|---|---|---|---|
| | Electroconductive agent | 0.5 C | 1 C | 2 C | 3 C | 5 C |
| Example B3-2 | CNF/AB (dry JM) | 92% | 83% | 69% | 58% | 36% |
| Example B3-3 | CNF/AB (ball mill) | 89% | 74% | 56% | 37% | 0% |
| Comparative Example B3-1 | CNF | 81% | 53% | 7% | 0% | 0% |
| Comparative Example B3-2 | AB | 75% | 51% | 1% | 0% | 0% |

<Third Aspect of the Present Invention>

The present invention is described more specifically below by referring to Examples, but the present invention is not limited thereto.

In Examples, the measurements of fiber diameter and fiber length of the ultrafine fibrous carbons and the X-ray diffraction measurement of ultrafine fibrous carbons were performed according to the following methods.

The measurements of fiber diameter and fiber length of the ultrafine fibrous carbons and the X-ray diffraction measurement of ultrafine fibrous carbons were performed in the same manner as above.

Example C1

<Production of Ultrafine Fibrous Carbons (Carbon-Based Electroconductive Agent)>

90 Parts by mass of high-density polyethylene (HI-ZEX (registered trademark) 5000SR, produced by Prime Polymer Co., Ltd.; melt viscosity at 350° C. and 600 s$^{-1}$: 14 Pa·s) as a thermoplastic resin and 10 parts by mass of synthetic mesophase pitch AR•MPH (produced by Mitsubishi Gas Chemical Company, Inc.) as a thermoplastic carbon precursor were melt kneaded by a same-direction twin-screw extruder ("TEM-26SS", manufactured by Toshiba Machine Co., Ltd., barrel temperature: 310° C., under nitrogen stream) to prepare a resin composition.

The resin composition above was spun from a spinneret at 390° C. by a cylinder-type single-hole spinning machine to make a precursor molded body (a sea-island type composite fiber containing the thermoplastic carbon precursor as an island component). The fiber diameter of the precursor molded body was 300 μm. Subsequently, the precursor molded body was held at 215° C. for 3 hours in air by a hot-air drier to obtain a stabilized precursor molded body.

In a vacuum gas displacement furnace, the stabilized precursor molded body was then subjected to nitrogen purging, depressurization to 1 kPa and temperature elevation to 500° C. at a temperature rise rate of 5° C./min in the depressurized state and held at 500° C. for 1 hour to remove the thermoplastic resin and form a fibrous carbon precursor. The fibrous carbon precursor was added to ion-exchanged water and pulverized by means of a mixer for 2 minutes to disperse the fibrous carbon precursor at a concentration of 0.1 mass %.

Figure 27:
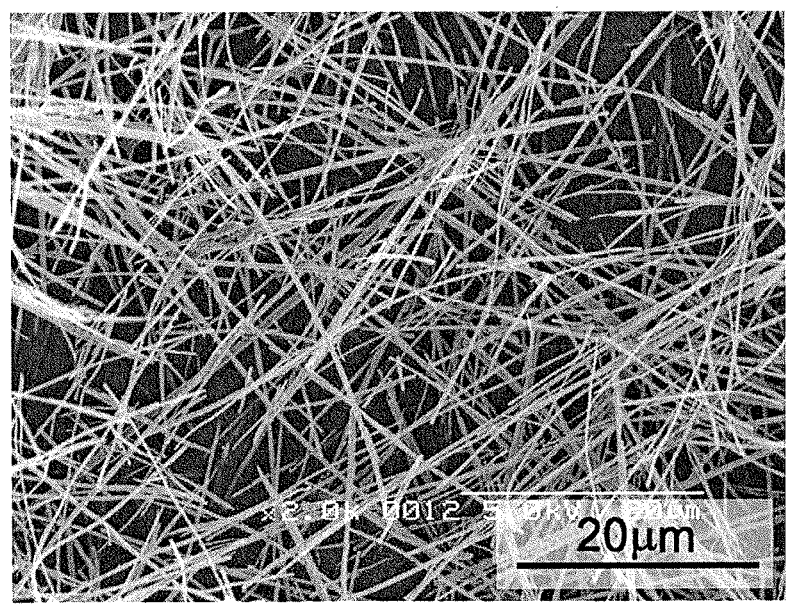
FIG. 27 is a scanning electron microscope image (2,000 times magnification) of the ultrafine fibrous carbons used in Example C1 and Comparative Example C1 (CNF).

The dispersed fibrous carbon precursor was graphitized by elevating the temperature from room temperature to 3,000° C. over 3 hours in an argon gas atmosphere, then naturally cooled to room temperature, and disintegrated by a dry jet mill apparatus (A-O Jet Mill, manufactured by Seishin Enterprise Co., Ltd.) to produce ultrafine fibrous carbons. The average fiber diameter of the obtained ultrafine fibrous carbons was 300 nm, the average fiber length was 16 μm, and a branching structure was not observed, in other words, a linear structure was confirmed. In addition, the average interplanar spacing d002 of (002) plane as measured by an X-ray diffraction method was 0.3375 nm. FIG. 27 shows a scanning electron micrograph (2,000 times magnification) of the ultrafine fibrous carbons (CNF) produced.

<Manufacture of Slurry>

A slurry was manufactured by using 5 parts by mass of the ultrafine fibrous carbons (carbon-based electroconductive agent) produced as above, 5 parts by mass of styrene butadiene rubber (SBR, produced by Zeon Corporation) as a binder, 6 parts by mass of sodium carboxymethyl cellulose (CMC-Na) having an etherification degree of 0.8 and a weight average molecular weight of 300,000 as a surfactant, and 500 parts by mass of ion-exchanged water as a solvent and mixing these by ultrasonic vibration.

<Evaluation of Water Dispersibility>

Evaluation of water dispersibility was performed with an eye by using the slurry manufactured above. As for the evaluation method of water dispersibility, the slurry was checked with an eye and when the slurry was smooth and an agglomerate of ultrafine-fibrous-carbon aggregates was not present in the slurry, the water dispersibility of the ultrafine-fibrous-carbon aggregates was judged as good. On the other hand, when a visually confirmable agglomerate of ultrafine-fibrous-carbon aggregates was present in the slurry, the water dispersibility of the ultrafine-fibrous-carbon aggregates was judged as poor.

<Manufacture of Electrode>

2 Parts by mass of the ultrafine fibrous carbons (carbon-based electroconductive agent) produced as above, 1.5 parts by mass of styrene butadiene rubber (SBR, produced by Zeon Corporation) as a binder, 1.5 parts by mass of sodium carboxymethyl cellulose (CMC-Na) having an etherification degree of 0.8 and a weight average molecular weight of 300,000 as a surfactant, 95 parts by mass of graphite (NICABEADS, Type: P25B-XB, Nippon Carbon Co.) as a negative electrode active material, and 100 parts by mass of ion-exchanged water were mixed to prepare an electrode-forming slurry. The prepared electrode-forming slurry was coated on a copper foil by a doctor blade, and the coated electrode-forming slurry was dried in a hot-air drier at 105° C. to manufacture an electrode sheet.

<Evaluation of Dispersibility in Electrode>

The surface of the electrode sheet manufactured above was observed by a scanning electron microscope, and the presence or absence of agglomeration of the ultrafine fibrous carbons was checked. When an agglomerate was present, the dispersibility in the electrode was judged as poor.

Example C2

<Production of Ultrafine Fibrous Carbons (Carbon-Based Electroconductive Agent)>

Ultrafine fibrous carbons having an average fiber length of 5 μm was obtained by producing ultrafine fibrous carbons (carbon-based electroconductive agent) by exactly the same method as in Example C1, except that disintegration was performed not by a dry jet mill apparatus but by a wet pulverizer (Star Burst, manufactured by Sugino Machine Limited).

<Manufacture of Slurry>

A slurry manufactured by exactly the same method as the method for manufacture of slurry described in Example C1 was obtained by using the ultrafine fibrous carbons produced as above.

<Evaluation of Water Dispersibility>

Evaluation of water dispersibility was performed in the same manner as in Example C1 by using the slurry manufactured above.

Example C3

<Production of Ultrafine Fibrous Carbons (Carbon-Based Electroconductive Agent)>

Ultrafine fibrous carbons having an average fiber length of 16 μm was obtained by producing ultrafine fibrous carbons (carbon-based electroconductive agent) by exactly the same method as in Example C1, except that disintegration by a dry jet mill apparatus was not performed.

<Manufacture of Slurry>

A slurry manufactured by exactly the same method as the method for manufacture of slurry described in Example C1 was obtained by using the ultrafine fibrous carbons produced as above.

<Evaluation of Water Dispersibility>

Evaluation of water dispersibility was performed in the same manner as in Example C1 by using the slurry manufactured above.

Comparative Example C1

<Production of Ultrafine Fibrous Carbons (Carbon-Based Electroconductive Agent)>

Ultrafine fibrous carbons (carbon-based electroconductive agent) was produced by exactly the same method as in Example C1.

<Manufacture of Slurry>

A slurry manufactured by exactly the same method as the method for manufacture of slurry described in Example C1, except for not using 6 parts by mass of sodium carboxymethyl cellulose (CMC-Na) having an etherification degree of 0.8 and a weight average molecular weight of 300,000 as a surfactant was obtained by using the ultrafine fibrous carbons produced as above.

<Evaluation of Water Dispersibility>

Evaluation of water dispersibility was performed in the same manner as in Example C1 by using the slurry manufactured above.

Example C4

<Production of Ultrafine Fibrous Carbons (Carbon-Based Electroconductive Agent)>

Ultrafine fibrous carbons (carbon-based electroconductive agent) was produced by exactly the same method as in Example C1.

<Production of Surfactant-Modified Ultrafine-Fibrous-Carbon Fibers>

2 Parts by mass of the ultrafine fibrous carbons (carbon-based electroconductive agent) above was added to and dispersed in 500 parts by mass of N-methylpyrrolidone (best quality, produced by Wako Pure Chemical Industries, Ltd.) under stirring. To this dispersion liquid, a solution of 1.5 parts by mass of sodium carboxymethyl cellulose (CMC-Na) having an etherification degree of 0.8 and a weight average molecular weight of 300,000 dissolved in 500 parts by mass of ion-exchanged water was added to prepare a mixed solution. The resulting mixed solution was heated and concentrated to prepare a surfactant-modified ultrafine-fibrous-carbon fibers.

<Manufacture of Slurry>

A slurry was manufactured to have the same composition as the slurry described in Example C1 by using the surfactant-modified ultrafine-fibrous-carbon fibers produced as above.

<Evaluation of Water Dispersibility>

Evaluation of water dispersibility was performed in the same manner as in Example C1 by using the slurry manufactured above.

<Manufacture of Electrode>

A slurry was prepared to afford the same electrode composition as in Example C1 by using the surfactant-modified ultrafine-fibrous-carbon fibers produced as above, and an electrode was manufactured in the same manner as in Example C1.

<Evaluation of Dispersibility in Electrode>

The surface of the electrode sheet manufactured above was observed by a scanning electron microscope, and the presence or absence of agglomeration of the ultrafine fibrous carbons was checked. When an agglomerate was present, the dispersibility in the electrode was judged as poor.

Example C5

<Production of Ultrafine Fibrous Carbons (Carbon-Based Electroconductive Agent)>

Ultrafine fibrous carbons (carbon-based electroconductive agent) was produced by exactly the same method as in Example C1.

<Production of Oxidatively-Treated Ultrafine-Fibrous-Carbon Fibers>

5 g of the ultrafine fibrous carbons (carbon-based electroconductive agent) above was added to a mixed solution (mixed acid) of 50 ml of concentrated nitric acid (60 to 61%, special grade chemical, produced by Wako Pure Chemical Industries, Ltd.) and 150 ml of concentrated sulfuric acid (95.0+%, special grade chemical, produced by Wako Pure Chemical Industries, Ltd.) under stirring. After mixing for 3 hours at room temperature, a solid material was collected by filtration, the solid material was then washed with ion-exchanged water until the washing became neutral, and the solid material was dried to prepare an oxidatively-treated ultrafine fibrous carbon.

<Evaluation of Graphite Structure of Oxidatively-Treated Ultrafine Fibrous Carbon>

The graphite structure of the oxidatively-treated ultrafine fibrous carbons produced as above was evaluated by comparing the interplanar spacing d(002) of (002) plane and the crystallite size Lc(002) of the graphite structure measured by powder X-ray diffraction, with d(002), i.e., 0.3372 nm, and Lc(002), i.e., 47.9 nm, of the ultrafine fibrous carbons that was not oxidatively treated.

<Evaluation of Residual Chemicals in Oxidatively-Treated Ultrafine Fibrous Carbon>

The oxidatively-treated ultrafine fibrous carbons produced as above was subjected to temperature elevation from 25° C. to 500° C. at 10° C./min in a nitrogen atmosphere, and the mass decrease ratio at 25° C. relative to the mass at 25° C. was measured, whereby the residual amount of chemicals, etc. contained in the oxidatively-treated ultrafine fibrous carbons was measured. If the mass decrease ratio is large, when used for a non-aqueous electrolyte secondary battery, reduction in the battery capacity due to a side reaction is disadvantageously caused.

<Manufacture of Slurry>

A slurry manufactured by exactly the same method as the method for manufacture of slurry described in Example C1 was obtained by using the oxidatively-treated ultrafine fibrous carbons produced as above.

<Evaluation of Water Dispersibility>

Evaluation of water dispersibility was performed in the same manner as in Example C1 by using the slurry manufactured above.

<Manufacture of Electrode>

A slurry was prepared to afford the same electrode composition as in Example C1 by using the oxidatively-treated ultrafine-fibrous-carbon fibers produced as above, and an electrode was manufactured in the same manner as in Example C1.

<Evaluation of Dispersibility in Electrode>

The surface of the electrode sheet manufactured above was observed by a scanning electron microscope, and the presence or absence of agglomeration of the ultrafine fibrous carbons was checked. When an agglomerate was present, the dispersibility in the electrode was judged as poor.

Example C6

<Production of Ultrafine Fibrous Carbons (Carbon-Based Electroconductive Agent)>

Ultrafine fibrous carbons (carbon-based electroconductive agent) was produced by exactly the same method as in Example C1.

<Production of Oxidatively-Treated Ultrafine-Fibrous-Carbon Fibers>

5 g of the ultrafine fibrous carbons (carbon-based electroconductive agent) above was added to 200 ml of aqueous hydrogen peroxide (30.0 to 35.5%, special grade chemical, produced by Wako Pure Chemical Industries, Ltd.) under stirring. After mixing for 3 hours at room temperature, a solid material was collected by filtration, and the solid material was washed with ion-exchanged water and then dried to prepare an oxidatively-treated ultrafine fibrous carbon.

<Evaluation of Graphite Structure of Oxidatively-Treated Ultrafine Fibrous Carbon>

The graphite structure of the oxidatively-treated ultrafine fibrous carbons produced as above was evaluated by comparing the interplanar spacing d(002) of (002) plane and the crystallite size Lc(002) of the graphite structure measured by powder X-ray diffraction, with d(002), i.e., 0.3372 nm, and Lc(002), i.e., 47.9 nm, of the ultrafine fibrous carbons that was not oxidatively treated.

<Evaluation of Residual Chemicals in Oxidatively-Treated Ultrafine Fibrous Carbon>

The oxidatively-treated ultrafine fibrous carbons produced as above was subjected to temperature elevation from 25° C. to 500° C. at 10° C./min in a nitrogen atmosphere, and the mass decrease ratio at 25° C. relative to the mass at 25° C. was measured, whereby the residual amount of chemicals, etc. contained in the oxidatively-treated ultrafine fibrous carbons was measured. If the mass decrease ratio is large, when used for a non-aqueous electrolyte secondary battery, reduction in the battery capacity due to a side reaction is disadvantageously caused.

<Manufacture of Slurry>

A slurry manufactured by exactly the same method as the method for manufacture of slurry described in Example C1 was obtained by using the oxidatively-treated ultrafine fibrous carbons produced as above.

<Evaluation of Water Dispersibility>

Evaluation of water dispersibility was performed in the same manner as in Example C1 by using the slurry manufactured above.

<Manufacture of Electrode>

A slurry was prepared to afford the same electrode composition as in Example C1 by using the oxidatively-treated ultrafine fibrous carbons produced as above, and an electrode was manufactured in the same manner as in Example C1.

<Evaluation of Dispersibility in Electrode>

The surface of the electrode sheet manufactured above was observed by a scanning electron microscope, and the presence or absence of agglomeration of the ultrafine fibrous carbons was checked. When an agglomerate was present, the dispersibility in the electrode was judged as poor.

[Evaluation Results and Discussion of Water Dispersibility]

Figure 28:
FIG. 28 is a view showing the water dispersibility of the ultrafine-fibrous-carbon aggregates in the slurry obtained in Example C1.

FIG. 28 shows the results of evaluation of water dispersibility using the slurry manufactured in Example C1. As evident from FIG. 28, the slurry manufactured in Example C1 was formed as a smooth slurry, and the water dispersibility of the ultrafine-fibrous-carbon aggregates was good.

Figure 29:
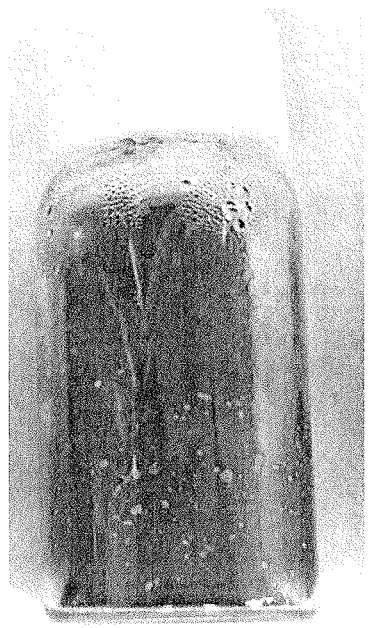
FIG. 29 is a view showing the water dispersibility of the ultrafine-fibrous-carbon aggregates in the slurry obtained in Example C2.

FIG. 29 shows the results of evaluation of water dispersibility using the slurry manufactured in Example C2. As evident from FIG. 29, the slurry manufactured in Example C2 was formed as a smooth slurry, and the water dispersibility of the ultrafine-fibrous-carbon aggregates was good.

Figure 30:
FIG. 30 is a view showing the water dispersibility of the ultrafine-fibrous-carbon aggregates in the slurry obtained in Example C3.

FIG. 30 shows the results of evaluation of water dispersibility using the slurry manufactured in Example C3. As shown in FIG. 30, a small agglomerate of the ultrafine fibrous carbons was observed here and there in the slurry manufactured in Example C3. This agglomerate is considered to be generated because since the production was not passed through a disintegration step, the ultrafine fibrous carbons were not disintegrated and bundled ultrafine fibrous carbons were formed.

Incidentally, the water dispersibility of the ultrafine-fibrous-carbon aggregates in the slurry manufactured in Example C3 was not better than the water dispersibility of the ultrafine-fibrous-carbon aggregates in the slurry manufactured in Examples C1 and C2, but the water dispersibility of the ultrafine-fibrous-carbon aggregates in the slurry manufactured in Example C3 was not at a poor level but at a practically problem-free level.

Figure 31:
FIG. 31 is a view showing the water dispersibility of the ultrafine-fibrous-carbon aggregates in the slurry obtained in Comparative Example C1.

FIG. 31 shows the results of evaluation of water dispersibility using the slurry manufactured in Comparative Example C1. As shown in FIG. 31, the ultrafine fibrous carbons in the slurry manufactured in Comparative Example C1 were completely aggregated, and the water dispersibility of the ultrafine-fibrous-carbon aggregates was poor. This poor water dispersibility is considered to be caused because since only a surfactant was mixed at the time of slurry preparation, the ultrafine fibrous carbons were not modified with a surfactant and hydrophobicity of the ultrafine fibrous carbons was maintained.

Figure 32:
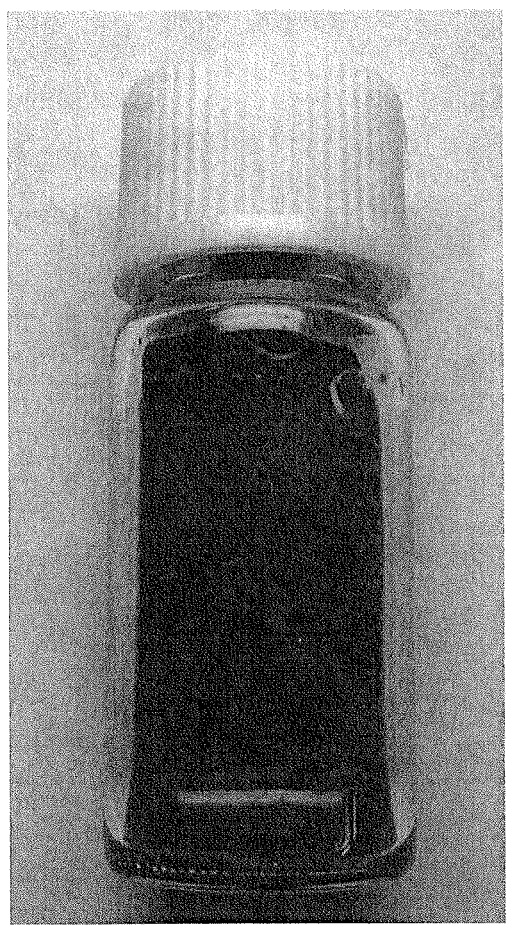
FIG. 32 is a view showing the water dispersibility of the ultrafine-fibrous-carbon aggregates in the slurry obtained in Example C4.

FIG. 32 shows the results of evaluation of water dispersibility using the slurry manufactured in Example C4. As evident from FIG. 32, the slurry manufactured in Example C4 was formed as a smooth slurry, and the water dispersibility of the ultrafine-fibrous-carbon aggregates was good.

Figure 33:
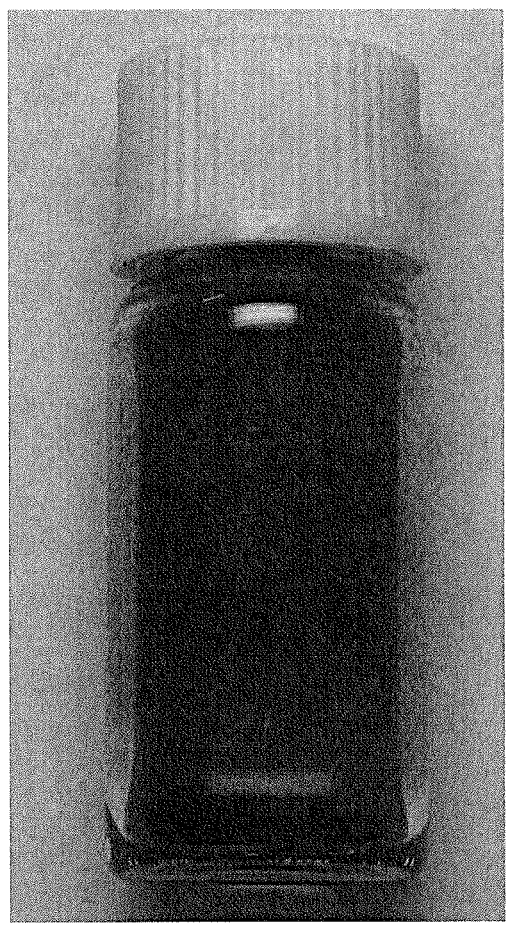
FIG. 33 is a view showing the water dispersibility of the ultrafine-fibrous-carbon aggregates in the slurry obtained in Example C5.

FIG. 33 shows the results of evaluation of water dispersibility using the slurry manufactured in Example C5. As evident from FIG. 33, the slurry manufactured in Example C5 was formed as a smooth slurry, and the water dispersibility of the ultrafine-fibrous-carbon aggregates was good.

Figure 34:
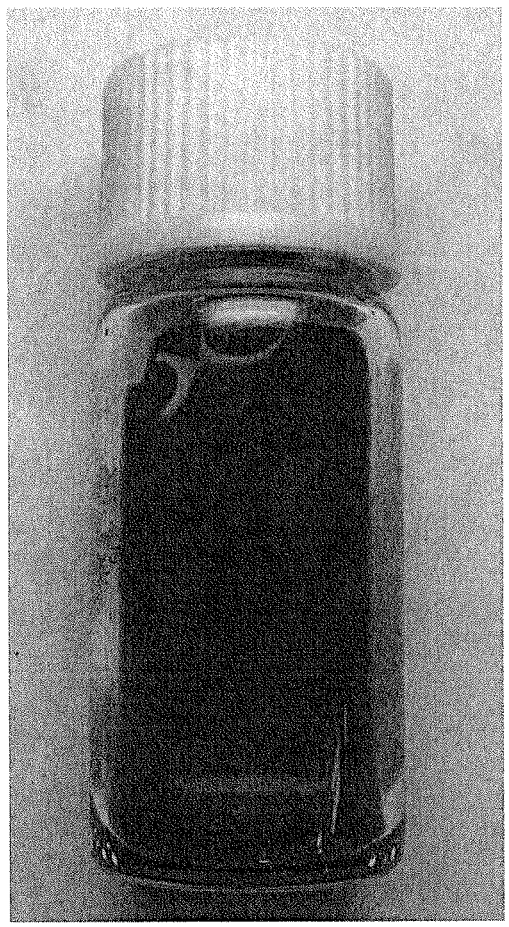
FIG. 34 is a view showing the water dispersibility of the ultrafine-fibrous-carbon aggregates in the slurry obtained in Example C6.

FIG. 34 shows the results of evaluation of water dispersibility using the slurry manufactured in Example C6. As evident from FIG. 34, the slurry manufactured in Example C6 was formed as a smooth slurry, and the water dispersibility of the ultrafine-fibrous-carbon aggregates was good.

[Evaluation of Graphite Structure of Oxidatively-Treated Ultrafine Fibrous Carbon]

In the evaluation of the graphite structure of the oxidatively-treated ultrafine fibrous carbons manufactured in Example C5, the interplanar spacing d(002) was 0.3377 nm, and the crystallite size Lc(002) was 21.3 nm, indicating that compared with the ultrafine fibrous carbons not subjected to an oxidative treatment, the interplanar spacing was increased and the crystallite size was decreased. This change was at a practically problem-free level but was not preferred.

Likewise, in Example C6, d(002) was 0.3373 nm and Lc(002) was 47.7 nm. Compared with the ultrafine fibrous carbons not subjected to an oxidative treatment, the interplanar spacing was increased and the crystallite size was decreased, but the change was small and absolutely not a problem in practice.

[Evaluation of Residual Chemicals in Oxidatively-Treated Ultrafine Fibrous Carbon]

Relative to the mass decrease ratio of the ultrafine fibrous carbons not subjected to an oxidative treatment, which was 0.6%, the mass decrease ratio in Example C6 was 1.3% and substantially not changed, whereas the mass decrease ratio in Example C5 was 7.5% and large, and it was confirmed that in Example C5, when used for a non-aqueous electrolyte secondary battery, reduction in the battery capacity due to a side reaction is disadvantageously caused.

[Evaluation of Dispersibility in Electrode]

Figure 35:
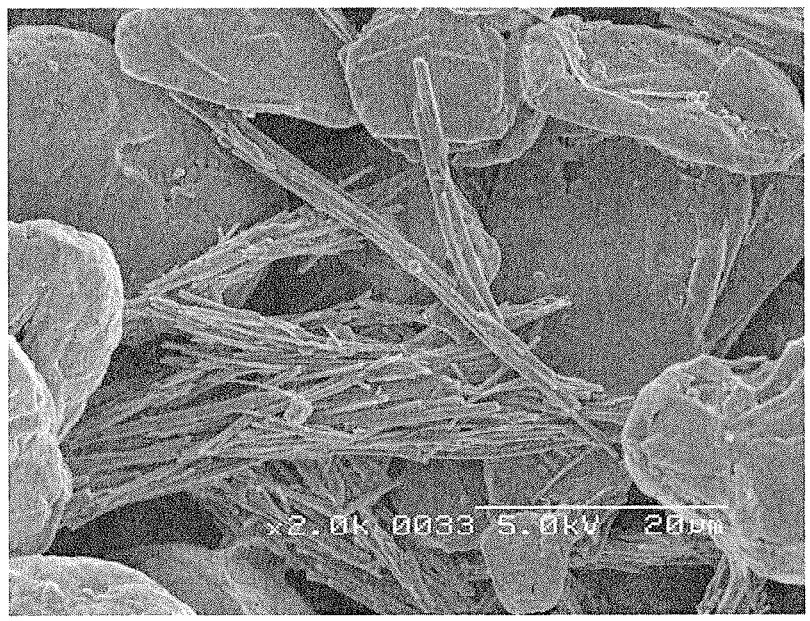
FIG. 35 is a view showing the water dispersibility of the ultrafine-fibrous-carbon aggregates in the electrode obtained in Example C1.

FIG. 35 shows the results of evaluation of dispersibility in electrode, using the electrode manufactured in Example C1. As evident from FIG. 35, an agglomerate of ultrafine-fibrous-carbon aggregates was observed in the electrode manufactured in Example C1, and it was confirmed that the dispersibility in electrode was insufficient. That is, the dispersibility was good in the evaluation results of water dispersibility using a slurry, and the dispersibility may be good from a macroscopic perspective, but an agglomerate was formed from a microscopic perspective and this is not good for the object of the present invention.

Figure 36:
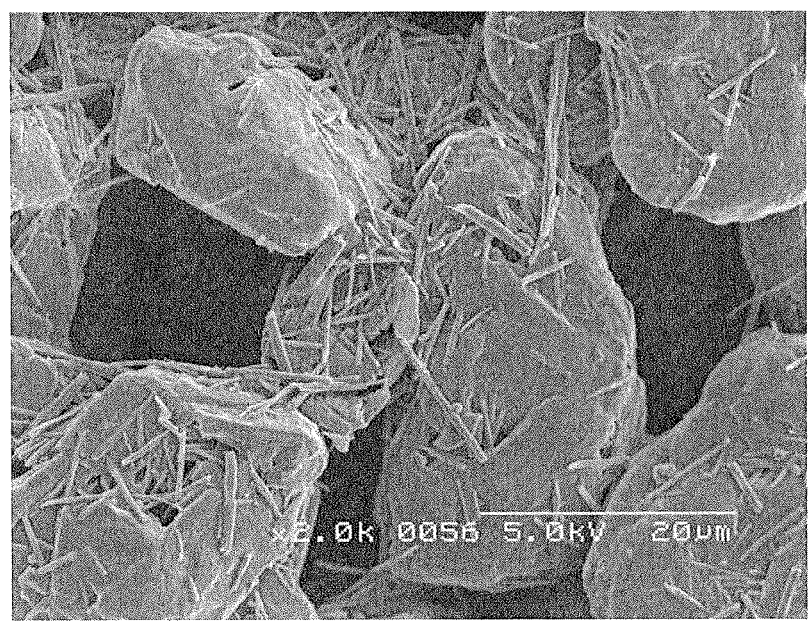
FIG. 36 is a view showing the water dispersibility of the ultrafine-fibrous-carbon aggregates in the electrode obtained in Example C4.

FIG. 36 shows the results of evaluation of dispersibility in electrode, using the electrode manufactured in Example C4. As evident from FIG. 36, the ultrafine-fibrous-carbon aggregates were dispersed in the electrode manufactured in Example C4 and thus, the evaluation of dispersibility in electrode was good.

Figure 37:
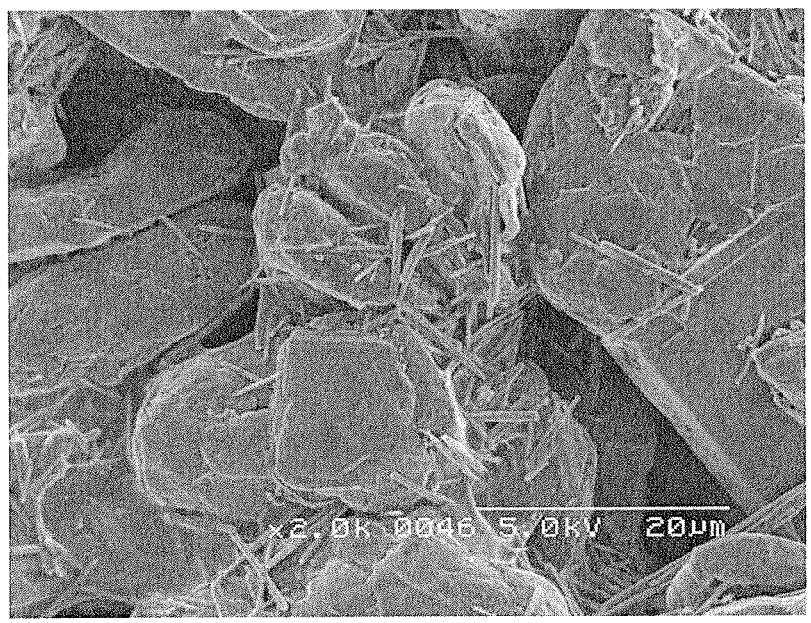
FIG. 37 is a view showing the water dispersibility of the ultrafine-fibrous-carbon aggregates in the electrode obtained in Example C5.

FIG. 37 shows the results of evaluation of dispersibility in electrode, using the electrode manufactured in Example C5. As evident from FIG. 37, the ultrafine-fibrous-carbon aggregates were dispersed in the electrode manufactured in Example C5 and thus, the evaluation of dispersibility in electrode was good.

Figure 38:
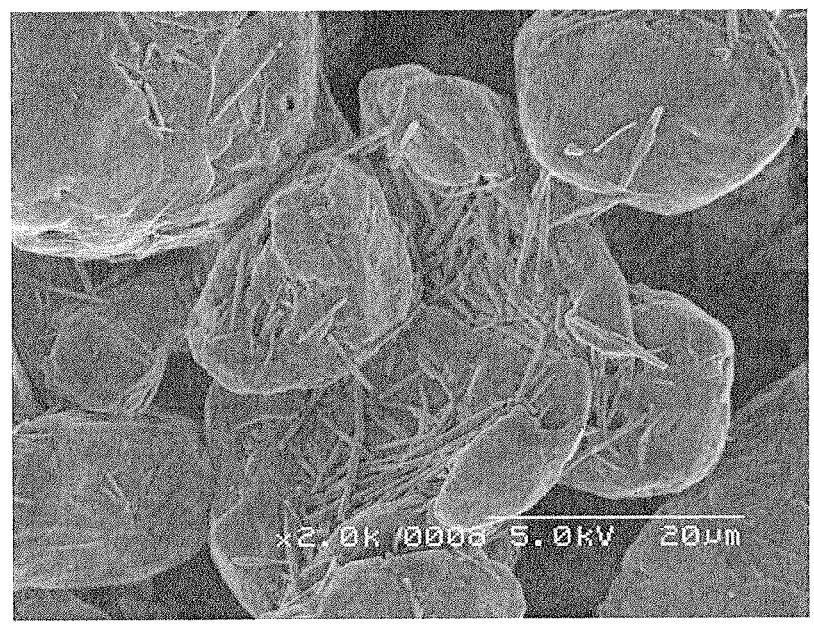
FIG. 38 is a view showing the water dispersibility of the ultrafine-fibrous-carbon aggregates in the electrode obtained in Example C6.
Figure 39:
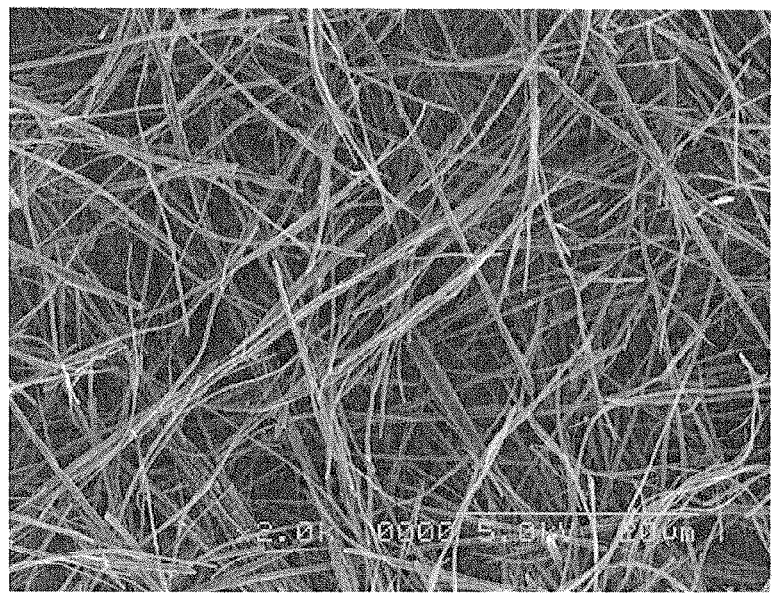
FIG. 39 is a scanning electron microscope image (2,000 times magnification) of ultrafine fibrous carbons.

FIG. 38 shows the results of evaluation of dispersibility in electrode, using the electrode manufactured in Example C6. As evident from FIG. 38, the ultrafine-fibrous-carbon aggregates was dispersed in the electrode manufactured in Example C6 and thus, the evaluation of dispersibility in electrode was good.

TABLE 4

Table C1

| | Treatment Method | | | Evaluative Judgment | | | |
| | | | | Evaluation of Water Dispersibility | | Evaluation of Graphite Structure of Oxidatively-Treated Ultrafine Fibrous Carbon | Evaluation of Residual Chemicals in Oxidatively-Treated Ultrafine Fibrous Carbon | Evaluation of Dispersibility in Electrode |
| | Disintegration Method | Modification Method with Surfactant | Oxidative Treatment | Judgment | Slurry Composition | | | |
|---|---|---|---|---|---|---|---|---|
| Ex. C1 | dry jet mill | mixing in electrode-forming solution | — | AA | CMC + SBR | — | — | A |
| Ex. C2 | wet grinding | mixing in electrode-forming solution | — | AA | CMC + SBR | — | — | — |
| Ex. C3 | none | mixing in electrode-forming solution | — | A | CMC + SBR | — | — | — |
| Comp. Ex. C1 | dry jet mill | mixing in electrode-forming solution | — | C | SBR | — | — | — |
| Ex. C4 | dry jet mill | modification in advance (CMC/NMP) | — | AA | CMC + SBR | — | — | AA |
| Ex. C5 | dry jet mill | mixing in electrode-forming solution | treatment with mixed acid | AA | CMC + SBR | A | C | AA |
| Ex. C6 | dry jet mill | mixing in electrode-forming solution | treatment with $H_2O_2$ | AA | CMC + SBR | AA | AA | AA |

AA: Good,
A: Fair,
C: Bad

<Fourth Aspect of the Present Invention>

The present invention is described more specifically below by referring to Examples, but the present invention is not limited thereto.

In Examples, the measurements of fiber diameter and fiber length of the ultrafine fibrous carbons and the X-ray diffraction measurement of ultrafine fibrous carbons were performed according to the following methods.

The measurements of fiber diameter and fiber length of the ultrafine fibrous carbons and the X-ray diffraction measurement of ultrafine fibrous carbons were performed in the same manner as above.

Example D1

<Production of Ultrafine Fibrous Carbon>

90 Parts by mass of high-density polyethylene (HI-ZEX (registered trademark) 5000SR, produced by Prime Polymer Co., Ltd.; melt viscosity at 350° C. and 600 $s^{-1}$: 14 Pa·s) as a thermoplastic resin and 10 parts by mass of synthetic mesophase pitch AR•MPH (produced by Mitsubishi Gas Chemical Company, Inc.) as a thermoplastic carbon precursor were melt kneaded by a same-direction twin-screw extruder ("TEM-26SS", manufactured by Toshiba Machine Co., Ltd., barrel temperature: 310° C., under nitrogen stream) to prepare a resin composition.

The resin composition above was spun from a spinneret at 390° C. by a cylinder-type single-hole spinning machine to make a precursor molded body (a sea-island type composite fiber containing the thermoplastic carbon precursor as an island component). The fiber diameter of the precursor molded body was 300 μm. Subsequently, the precursor molded body was held at 215° C. for 3 hours in air by a hot-air drier to obtain a stabilized precursor molded body.

In a vacuum gas displacement furnace, the stabilized precursor molded body was then subjected to nitrogen purging, depressurization to 1 kPa and temperature elevation to 500° C. at a temperature rise rate of 5° C./min in the depressurized state and held at 500° C. for 1 hour to remove the thermoplastic resin and form a fibrous carbon precursor. The fibrous carbon precursor was added to ion-exchanged water and pulverized by means of a mixer for 2 minutes to disperse the fibrous carbon precursor at a concentration of 0.1 mass %. This 0.1 mass % dispersion liquid was dried in a drier at 100° C. to produce ultrafine fibrous carbons. The average fiber diameter of the obtained ultrafine fibrous carbons was 300 nm, and a branching structure was not observed, in other words, a linear structure was confirmed. When the particle size distribution of the ultrafine fibrous carbons was measured by particle size distribution measurement, the average fiber length was 20 µm. In addition, the average interplanar spacing d002 of (002) plane as measured by an X-ray diffraction method was 0.3375 nm. FIG. 40 shows a scanning electron micrograph (2,000 times magnification) of the ultrafine fibrous carbons (CNF) produced.

<Production of Ultrafine-Fibrous-Carbon Aggregates>

The ultrafine fibrous carbons produced above was continuously treated five times by an ultra-centrifugal mill (ZM100, manufactured by Retsch; rotor with 24 blades, pore size of screen: 0.08 mm, rotation speed: 18,000 rpm), then graphitized by elevating the temperature from room temperature to 3,000° C. over 3 hours in an argon gas atmosphere, and naturally cooled to room temperature, thereby aggregating a plurality of ultrafine fibrous carbons to produce ultrafine-fibrous-carbon aggregates.

<Measurement of Fiber Length Distribution of Ultrafine-Fibrous-Carbon Aggregates>

The volume-based fiber length distribution of the ultrafine-fibrous-carbon aggregates was determined by measuring the volume-based particle size distribution (%) of the ultrafine-fibrous-carbon aggregates produced above by means of a particle size distribution meter (Particle Image Analyzer, IF-200nano, manufactured by JASCO International Co., Ltd., solvent: ethanol, carbon fiber concentration: 0.05%).

<Manufacture of Slurry>

A slurry was manufactured by using 5 parts by mass of the ultrafine fibrous carbons (carbon-based electroconductive agent) produced above, 5 parts by mass of styrene butadiene rubber (SBR, produced by Zeon Corporation) as a binder, 6 parts by mass of sodium carboxymethyl cellulose (CMC-Na) having an etherification degree of 0.8 and a weight average molecular weight of 300,000 as a surfactant, and 5 parts by mass of ion-exchanged water as a solvent and mixing these by ultrasonic vibration.

<Evaluation of Water Dispersibility>

Evaluation of water dispersibility was performed with an eye by using the slurry manufactured above. As for the evaluation method of water dispersibility, the slurry was checked with an eye and when the slurry was smooth and an agglomerate of ultrafine-fibrous-carbon aggregates was not present in the slurry, the water dispersibility of the ultrafine-fibrous-carbon aggregates was judged as good. On the other hand, when a visually confirmable agglomerate of ultrafine-fibrous-carbon aggregates was present in the slurry, the water dispersibility of the ultrafine-fibrous-carbon aggregates was judged as poor. The criteria for evaluation of water dispersibility were as follows.

(Criteria for Evaluation of Water Dispersibility)
AA: Water dispersibility was very good.
A: Water dispersibility was good.
B: Water dispersibility was slightly poor.
C: Water dispersibility was poor.
CC: Water dispersibility was very poor.

Example D2

<Production of Ultrafine Fibrous Carbon>

Ultrafine fibrous carbons was produced by exactly the same production method as the production method described in Example D1.

<Production of Ultrafine-Fibrous-Carbon Aggregates (Carbon-Based Electroconductive Agent)>

Ultrafine-fibrous-carbon aggregates (carbon-based electroconductive agent) was produced by exactly the same production method as the production method described in Example D1, except that the number of treatments by an ultra-centrifugal mill was changed to 1.

<Measurement of Fiber Length Distribution of Ultrafine-Fibrous-Carbon Aggregates>

The fiber length distribution of the ultrafine-fibrous-carbon aggregates produced above was determined by exactly the same measurement method as the measurement method described in Example D1.

<Manufacture of Slurry>

A slurry was manufactured by exactly the same manufacturing method as the method for manufacture of slurry described in Example D1 by using the ultrafine-fibrous-carbon aggregates produced above.

<Evaluation of Water Dispersibility>

Evaluation of water dispersibility was performed by exactly the same evaluation method as the evaluation method described in Example D1 by using the slurry manufactured above.

Comparative Example D1

<Production of Ultrafine Fibrous Carbon>

Ultrafine fibrous carbons was produced by exactly the same production method as the production method described in Example D1.

<Production of Ultrafine-Fibrous-Carbon Aggregates (Carbon-Based Electroconductive Agent)>

Ultrafine-fibrous-carbon aggregates was produced by exactly the same method as the production method described in Example D1, except that the ultrafine fibrous carbons produced above was not treated by an ultra-centrifugal mill.

<Measurement of Fiber Length Distribution of Ultrafine-Fibrous-Carbon Aggregates>

The fiber length distribution of the ultrafine-fibrous-carbon aggregates produced above was determined by exactly the same measurement method as the measurement method described in Example D1.

<Manufacture of Slurry>

A slurry was manufactured by exactly the same manufacturing method as the method for manufacture of slurry described in Example D1 by using the ultrafine-fibrous-carbon aggregates produced above.

<Evaluation of Water Dispersibility>

Evaluation of water dispersibility was performed by exactly the same evaluation method as the evaluation method described in Example D1 by using the slurry manufactured above.

Comparative Example D2

<Production of Ultrafine-Fibrous-Carbon Mixture>

Ultrafine fibrous carbons produced by exactly the same method as the method described in Example D1 was pulverized by a wet pulverizer (Star Burst, manufactured by Sugino Machine Limited) to produce ultrafine fibrous carbons (S-CNF) having an average fiber length of 5 µm. This ultrafine fibrous carbons (S-CNF) having an average fiber length of 5 µm and ultrafine fibrous carbons (CNF) produced by exactly the same method as the method described in Example D1 were mixed in a mass ratio of 1:1 to produce ultrafine-fibrous-carbon mixture.

<Production of Ultrafine-Fibrous-Carbon Aggregates (Carbon-Based Electroconductive Agent)>

Ultrafine-fibrous-carbon aggregates were produced by aggregating a plurality of ultrafine-fibrous-carbon mixtures produced above.

<Measurement of Fiber Length Distribution of Ultrafine-Fibrous-Carbon Mixture>

The fiber length distribution of the ultrafine-fibrous-carbon mixture produced above was determined by exactly the same measurement method as the measurement method described in Example D1.

<Manufacture of Slurry>

A slurry was manufactured by exactly the same manufacturing method as the method for manufacture of slurry described in Example D1 by using the ultrafine-fibrous-carbon aggregates produced above.

<Evaluation of Water Dispersibility>

Evaluation of water dispersibility was performed by exactly the same evaluation method as the evaluation method described in Example D1 by using the slurry manufactured above.

[Results and Discussion of Fiber Length Distribution]

FIG. 41 shows the results of fiber length distribution of the ultrafine-fibrous-carbon aggregates produced in Example D1. Referring to FIG. 41, two peaks of a first peak and a second peak were present in the fiber length distribution of the ultrafine-fibrous-carbon aggregates produced in Example D1. The ratio of the volume-based particle size distribution (%) of the first peak at a fiber length of 7 μm to the volume-based particle size distribution (%) of the second peak at a fiber length of 18 μm was 5, and thus, the number of ultrafine fibrous carbons having a short fiber length was large (see, Table 1 below). In addition, the average value of fiber length of the ultrafine-fibrous-carbon aggregates produced in Example D1 was 17 μm, and the median value was 15 μm (see, Table 2 below).

Here, the average value is a value obtained adding the values of fiber length of all ultrafine fibrous carbons and dividing the resulting value by the number of ultrafine fibrous carbons. The median value is a value of fiber length, which lies right in the middle by number of ultrafine fibrous carbons when the ultrafine fibrous carbons are sorted from a shorter fiber length. In the case where the number of fiber lengths is even, the median value is the average value of two fiber length values of ultrafine fibrous carbons near the middle. As the variation in the fiber length of the ultrafine fibrous carbons is larger, the average value and the median value greatly differ and deviate from each other.

FIG. 42 shows the results of fiber length distribution of the ultrafine-fibrous-carbon aggregates produced in Example D2. Referring to FIG. 42, two peaks of a first peak and a second peak were present in the fiber length distribution of the ultrafine-fibrous-carbon aggregates produced in Example D2. The ratio of the volume-based particle size distribution (%) of the first peak at a fiber length of 10 μm to the volume-based particle size distribution (%) of the second peak at a fiber length of 25 μm was 3. That is, the volume ratio (%) of a short ultrafine fibrous carbons having a fiber length of 15 μm or less contained in the ultrafine-fibrous-carbon aggregates produced in Example D2 was slightly smaller than the volume ratio (%) of a short ultrafine fibrous carbons having a fiber length of 15 μm or less contained in the ultrafine-fibrous-carbon aggregates produced in Example D1 (see, Table 1 below). In addition, the average value of fiber length of the ultrafine-fibrous-carbon aggregates produced in Example D2 was 20 μm, and the median value was 17 μm (see, Table 2 below).

Figure 43:
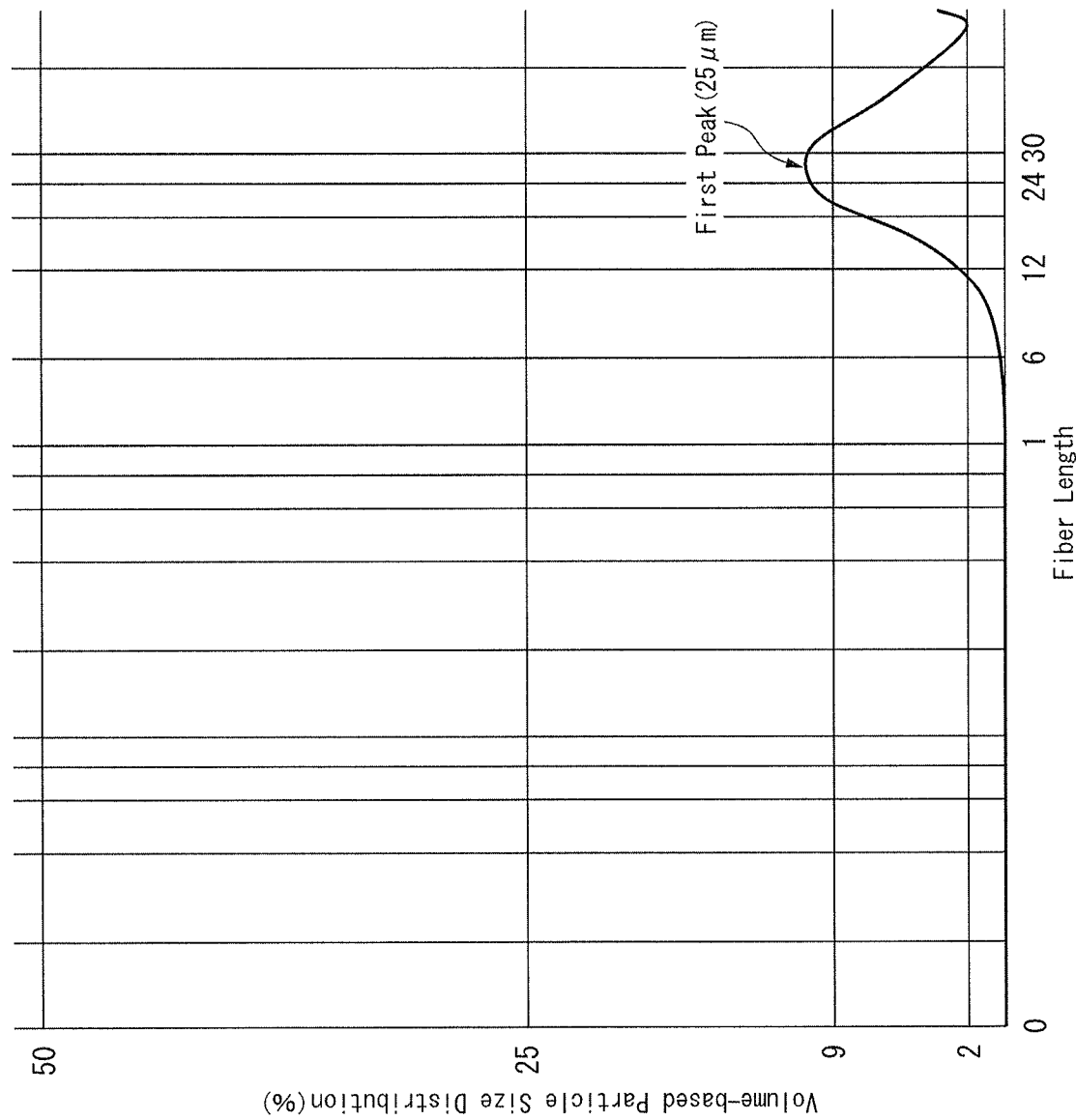
FIG. 43 is a view showing the results of the fiber length distribution of the ultrafine-fibrous-carbon aggregates obtained in Comparative Example D1.

FIG. 43 shows the results of fiber length distribution of the ultrafine-fibrous-carbon aggregates produced in Comparative Example D1. Referring to FIG. 43, one peak at a fiber length of 25 μm was present in the fiber length distribution of the ultrafine-fibrous-carbon aggregates produced in Comparative Example D1 (see, Table 1 below). In addition, the average value of fiber length of the ultrafine-fibrous-carbon aggregates produced in Comparative Example D1 was 24 μm, and the median value was 18 μm (see, Table 2 below).

FIG. 44 shows the results of fiber length distribution of the ultrafine-fibrous-carbon aggregates produced in Comparative Example D2. Referring to FIG. 44, two peaks were present in the fiber length distribution of the ultrafine-fibrous-carbon aggregates produced in Comparative Example D2. The ratio of the volume-based particle size distribution (%) of the peak at a fiber length of 3 μm to the volume-based particle size distribution (%) of the peak at a fiber length of 25 μm was 1. That is, it could be confirmed that the volume ratios of these two peaks are identical and the fiber length has a wide distribution (see, Table 1 below). In addition, the average value of fiber length of the ultrafine-fibrous-carbon aggregates produced in Comparative Example D2 was 14 μm, and the median value was 12 μm (see, Table 2 below).

[Evaluation Results and Discussion of Water Dispersibility]

The result of evaluation of water dispersibility using the slurry manufactured in Example D1 was, as shown in Table 1, rated very good and scored as AA. The slurry manufactured in Example D1 was formed as a smooth slurry, and thus, the water dispersibility of the ultrafine-fibrous-carbon aggregates was very good.

The result of evaluation of water dispersibility using the slurry manufactured in Example D2 was, as shown in Table 1, rated good and scored as A. An agglomerate of the ultrafine fibrous carbons was observed here and there in the slurry manufactured in Example D2. This is considered to occur because the volume ratio (%) of a long ultrafine fibrous carbons having a fiber length of more than 15 μm contained in the ultrafine-fibrous-carbon aggregates produced in Example D2 is slightly larger than the volume ratio (%) of a long ultrafine fibrous carbons having a fiber length of more than 15 μm contained in the ultrafine-fibrous-carbon aggregates produced in Example D1, and therefore an agglomerate of the ultrafine fibrous carbons is more likely to be formed in the ultrafine-fibrous-carbon aggregates produced in Example D2 than in the ultrafine-fibrous-carbon aggregates produced in Example D1. However, the slurry manufactured in Example D2 was formed as a relatively smooth slurry, and thus, the water dispersibility of the ultrafine-fibrous-carbon aggregates was good.

The result of evaluation of water dispersibility using the slurry manufactured in Comparative Example D1 was, as shown in Table 1, rated slightly poor and scored as B. In the slurry manufactured in Comparative Example D1, an agglomerate of the ultrafine fibrous carbons was observed. This is considered to occur because a bundled ultrafine fibrous carbons is formed due to a long ultrafine fibrous carbons having a fiber length of more than 15 μm contained in the ultrafine-fibrous-carbon aggregates produced in Comparative Example D1.

The result of evaluation of water dispersibility using the slurry manufactured in Comparative Example D2 was, as shown in Table 1, rated poor and scored as C. In the slurry manufactured in Comparative Example D2, an agglomerate of the ultrafine fibrous carbons was observed. This is considered to occur because since the volume ratio (%) of a long ultrafine fibrous carbons having a fiber length of more than 15 μm contained in the ultrafine-fibrous-carbon aggregates produced in Comparative Example D2 was 50 vol % or more relative to the volume ratio (%) of the entire ultrafine-fibrous-carbon aggregates, a bundled ultrafine fibrous carbons was formed.

TABLE 5

Table D1

| | Fiber Length of First Peak (μm) | Fiber Length of Second Peak (μm) | Volume-based Particle Size Distribution (%) of First Peak/Volume-based Particle Size Distribution (%) of Second Peak | Water Dispersibility |
|---|---|---|---|---|
| Example D1 | 7 | 18 | 5 | AA |
| Example D2 | 10 | 25 | 3 | A |
| Comparative Example D1 | 25 | — | — | B |
| Comparative Example D2 | 3 | 18 | 1 | C |

TABLE 6

Table D2

| | Average Value of Fiber Length (μm) | Median Value of Fiber Length (μm) | Standard Deviation |
|---|---|---|---|
| Example D1 | 17 | 15 | 7 |
| Example D2 | 20 | 17 | 11 |
| Comparative Example D1 | 24 | 18 | 20 |
| Comparative Example D2 | 14 | 12 | 7 |

The invention claimed is:

1. An electrode active material layer comprising at least an electrode active material, a carbon-based electroconductive agent and a binder,
   wherein said carbon-based electroconductive agent contains ultrafine fibrous carbons having a linear structure with a branching degree of 0.01 branch/μm or less and an average fiber diameter of more than 200 nm to 900 nm, and
   wherein the in-plane maximum tensile strength $\sigma_M$ of said electrode active material layer and the in-plane tensile strength $\sigma_T$ in the direction perpendicular to the direction of said maximum tensile strength $\sigma_M$ satisfy the following relationship (a):

$$\sigma_M/\sigma_T \leq 1.6 \tag{a}$$

2. The electrode active material layer according to claim 1, wherein said electrode active material layer comprises said carbon-based electroconductive agent in an amount of 10 mass % or less, based on the total mass of said electrode active material layer.

3. The electrode active material layer according to claim 1, wherein said electrode active material layer comprises the binder in an amount of 1 to 25 mass %, based on the total mass of said electrode active material layer.

4. The electrode active material layer according to claim 1, wherein the average fiber length of said ultrafine fibrous carbons is from 1 to 15 μm.

5. The electrode active material layer according to claim 1, wherein said ultrafine fibrous carbons contain ultrafine fibrous carbons having an average fiber length of 1 to 15 μm and ultrafine fibrous carbons having an average fiber length of more than 15 μm to 50 μm.

6. A non-aqueous electrolyte secondary battery comprising the electrode active material layer according to claim 1.

7. The electrode active material layer according to claim 1, wherein said electrode active material layer comprises a composite, where said ultrafine fibrous carbons and spherical carbon are integrally attached to each other and uniformly mixed with each other.

8. A non-aqueous electrolyte secondary battery comprising the electrode active material layer according to claim 7.

9. The electrode active material layer according to claim 1, wherein the electrode active material is a positive electrode active material comprising a lithium-containing metal oxide.

10. The electrode active material layer according to claim 1, wherein the electrode active material is a negative electrode active material comprising a carbon material capable of storing/releasing lithium ion, either Si or Sn, or an alloy or oxide containing at least either one thereof.

* * * * *